(12) United States Patent
Patel et al.

(10) Patent No.: US 10,846,589 B2
(45) Date of Patent: Nov. 24, 2020

(54) AUTOMATED COMPILATION OF PROBABILISTIC TASK DESCRIPTION INTO EXECUTABLE NEURAL NETWORK SPECIFICATION

(71) Applicant: WILLIAM MARSH RICE UNIVERSITY, Houston, TX (US)

(72) Inventors: Ankit B. Patel, Houston, TX (US); Richard G. Baraniuk, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 706 days.

(21) Appl. No.: 15/557,793

(22) PCT Filed: Mar. 11, 2016

(86) PCT No.: PCT/US2016/022127
§ 371 (c)(1),
(2) Date: Sep. 12, 2017

(87) PCT Pub. No.: WO2016/145379
PCT Pub. Date: Sep. 15, 2016

(65) Prior Publication Data
US 2018/0082172 A1 Mar. 22, 2018

Related U.S. Application Data

(60) Provisional application No. 62/131,872, filed on Mar. 12, 2015, provisional application No. 62/137,656, filed on Mar. 24, 2015.

(51) Int. Cl.
*G06N 3/08* (2006.01)
*G06N 3/04* (2006.01)
(Continued)

(52) U.S. Cl.
CPC .......... *G06N 3/0472* (2013.01); *G06N 3/08* (2013.01); *G06K 9/6256* (2013.01); *G10L 15/063* (2013.01); *G10L 15/16* (2013.01)

(58) Field of Classification Search
CPC .......................... G06N 3/0472; G06N 3/08
(Continued)

(56) References Cited

U.S. PATENT DOCUMENTS

| 6,745,169 B1 | 6/2004 | Schlang | |
| 2006/0200010 A1* | 9/2006 | Rosales | G06Q 50/24 |
| | | | 600/300 |

(Continued)

OTHER PUBLICATIONS

Salojarvi et al. "Inference with Discriminative Posterior." In: arXiv preprint. Jul. 22, 2008—Retrieved from <http://arxiv.org/pdf/0807.3470.pdf> (26 pages).

(Continued)

*Primary Examiner* — David R Vincent
(74) *Attorney, Agent, or Firm* — Kowert Hood Munyon Rankin & Goetzel PC

(57) ABSTRACT

A mechanism for compiling a generative description of an inference task into a neural network. First, an arbitrary generative probabilistic model from the exponential family is specified (or received). The model characterizes a conditional probability distribution for measurement data given a set of latent variables. A factor graph is generated for the generative probabilistic model. Each factor node of the factor graph is expanded into a corresponding sequence of arithmetic operations, based on a specified inference task and a kind of message passing algorithm. The factor graph and the sequences of arithmetic operations specify the structure of a neural network for performance of the inference task. A learning algorithm is executed, to determine values of parameters of the neural network. The neural (Continued)

Naive Bayes Classifier (GNBC)

Mixture Model (GMM)

Rendering Model (RM or GRM)

network is then ready for performing inference on operational measurements.

20 Claims, 18 Drawing Sheets

(51) Int. Cl.
*G10L 15/16* (2006.01)
*G06K 9/62* (2006.01)
*G10L 15/06* (2013.01)

(58) Field of Classification Search
USPC .................................................. 706/15, 45
See application file for complete search history.

(56) References Cited

U.S. PATENT DOCUMENTS

| | | | |
|---|---|---|---|
| 2007/0038653 | A1 | 2/2007 | Li |
| 2007/0297683 | A1* | 12/2007 | Luo .................. G06K 9/00664 382/224 |
| 2010/0076913 | A1 | 3/2010 | Yang |
| 2010/0262568 | A1* | 10/2010 | Schwaighofer ........ G06N 20/00 706/12 |
| 2012/0072215 | A1 | 3/2012 | Yu |
| 2012/0303562 | A1 | 11/2012 | Paguio |
| 2014/0095206 | A1 | 4/2014 | Fung et al. |
| 2014/0229158 | A1 | 8/2014 | Zweig et al. |

OTHER PUBLICATIONS

Heess et al. "Learning to Pass Expectation Propagation Messages." In: Advances in Neural Information Processing Systems (NIPS 2013). 2013—Retrieved from <http://papers.nips.cc/paper/5070-learning-to-pass-expectation-propagation-messages.pdf> (11 pages).

Seeger, Matthias—"Bayesian Modelling in Machine Learning: A tutorial review." In: No. 8, 9, 11 EPFL-REPORT-161462. Mar. 21, 2009 Retrieved from <https://www.cs.utah.edu/-piyush/teaching/bayes-review.pdf> (40 pages).

Nagi, Jawad et al.—"Max-pooling convolutional neural networks for vision-based hand gesture recognition." In: 2011 IEEE International Conference on Signal and Image Processing Applications (ICSJPA). Nov. 18, 2011 Retrieved from <http://people.idsia.ch/-ciresan/data/icsipa2011.pdf> (8 pages).

* cited by examiner

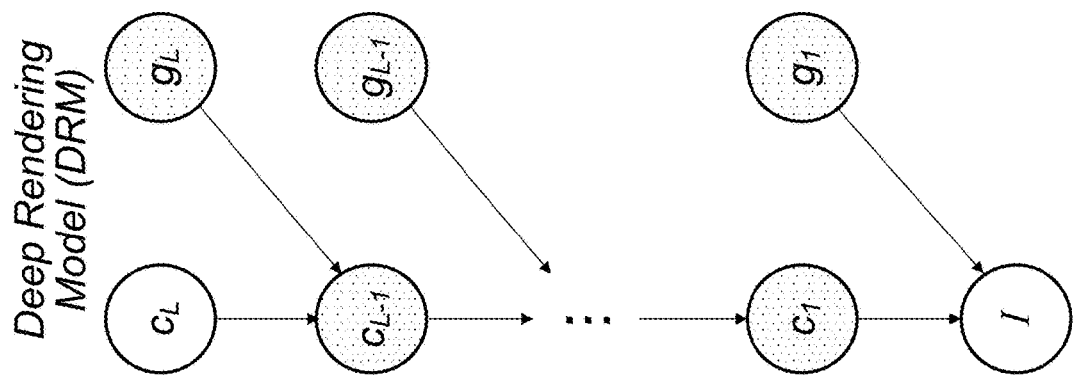
FIG. 1C
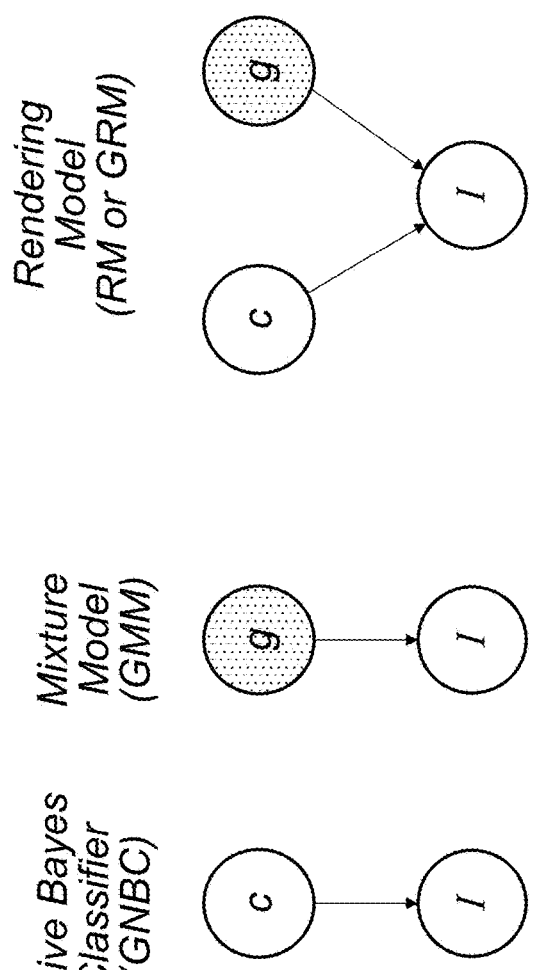
FIG. 1B
FIG. 1A

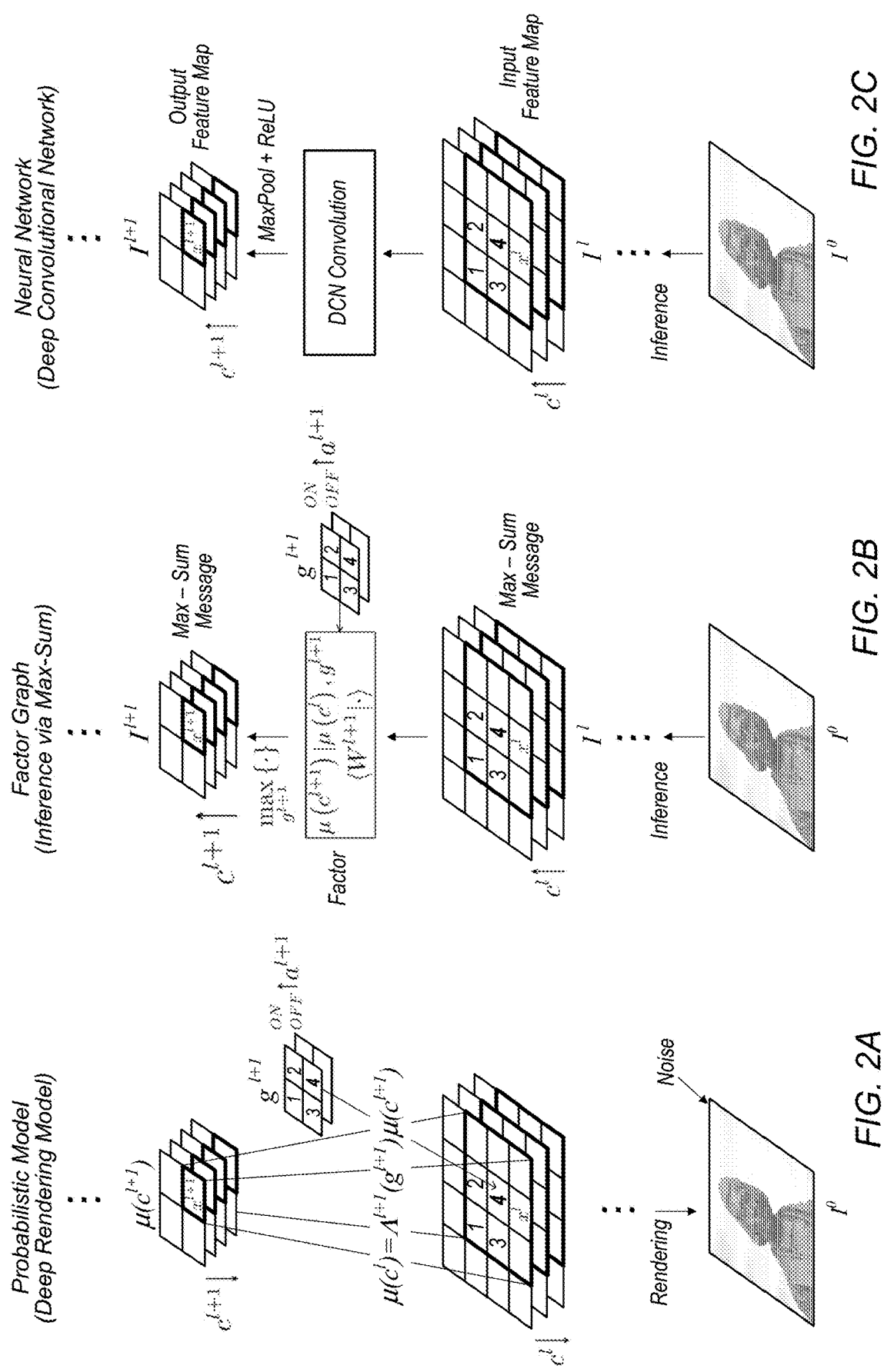

| Aspect | Neural Nets Perspective<br>Deep Convnets (DCNs) | Probabilistic Perspective<br>(Deep Rendering Model (DRM) |
|---|---|---|
| Model | Weight and biases of filters at a given layer. | Partial Rendering at a given abstraction level/scale. |
| | Number of Layers. | Number of Abstraction Levels. |
| | Number of Filters in a layer. | Number of Clusters/Classes at a given abstraction level. |
| | Implicit in network weights; can be computed by product of weights over all layers or by activity maximization. | Category prototypes are finely detailed versions of coarser-scale super-category prototypes. Fine details are modeled with affine nuisance transformations. |
| Inference | Forward propagation thru DCN. | Exact bottom-up inference via Max-Sum Message Passing (with Max-Product for Nuisance Factorization). |
| | Input and Output Feature Maps. | Probabilistic Max-Sum Messages (real-valued functions of variables nodes). |
| | Template matching at a given layer (convolutional, locally or fully connected). | Local computation at factor node (log-likelihood of measurements). |
| | Max-pooling over local pooling region. | Max-Marginalization over Latent Translational Nuisance transformations. |
| | Rectified linear Unit (ReLU). Sparsifies output activations. | Max-Marginalization over Latent Switching state of Renderer, Low prior probability of being ON. |
| Learning | Stochastic Gradient Descent. | Batch Discriminative EM Algorithm with Fine-to-Coarse E-step + Gradient M-step. No coarse-to-fine pass in E-step. |
| | N/A | Full EM Algorithm. |
| | Batch-Normalized SGD | Discriminative Approximation to Full EM (assumes Diagonal Pixel Covariance). |

FIG. 4 (i.e., Table 1)

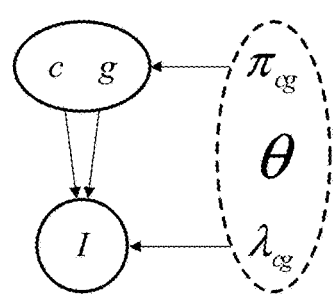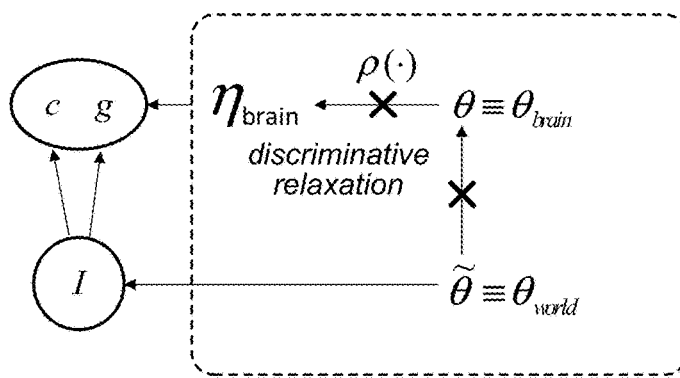
FIG. 5A              FIG. 5B

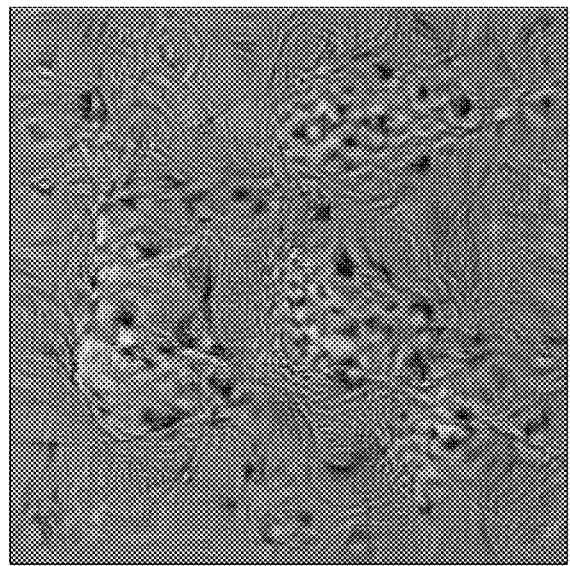
FIG. 6C *dalmation*
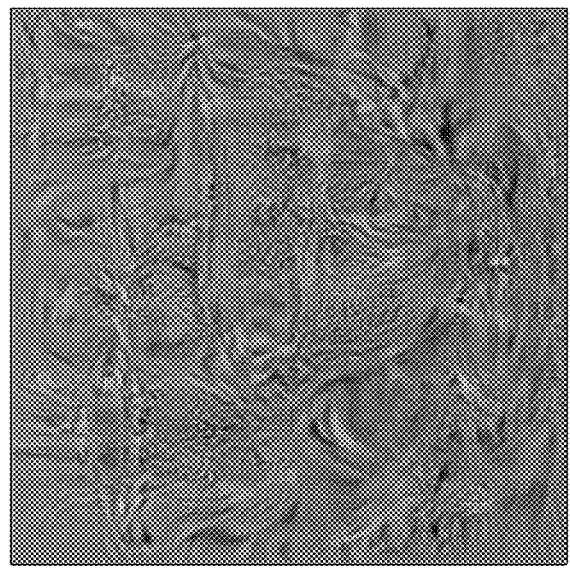
FIG. 6B *cup*
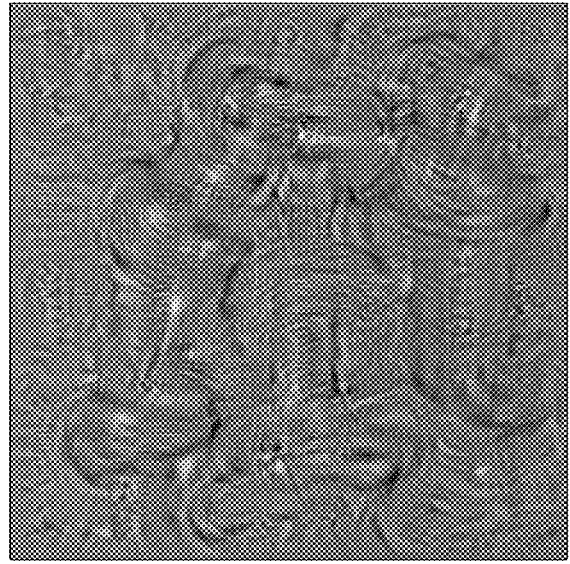
FIG. 6A *dumbbell*

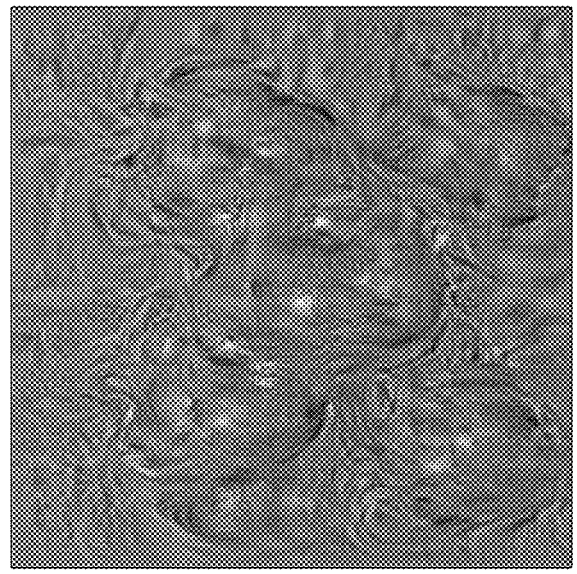
FIG. 6D *bellpepper*
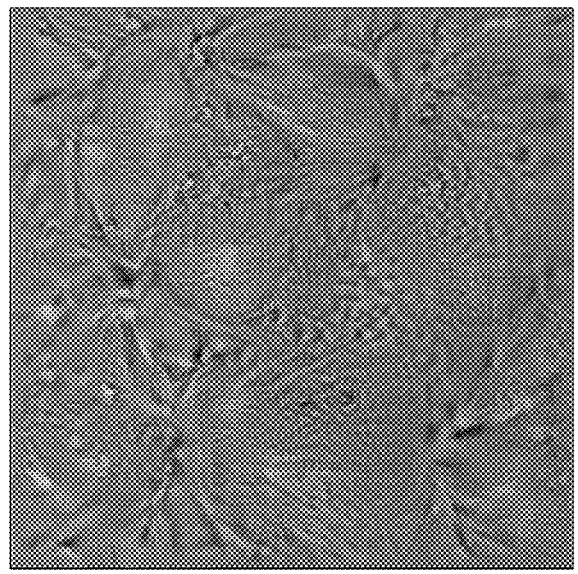
FIG. 6E *lemon*
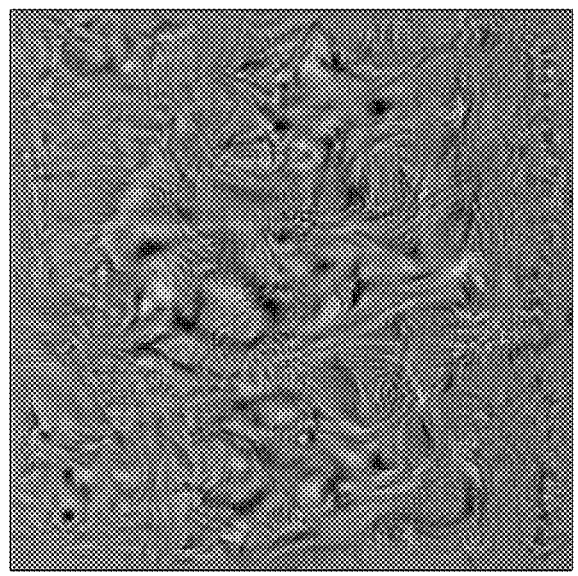
FIG. 6F *husky* kit fox computer keyboard washing machine limousine ostrich goose

| Area | Problem (DCN) | Proposed Solution (DRM) |
|---|---|---|
| Model | Rendering model applies nuisance transformations to extrinsic representation (2D images or feature maps). | Modify DRM so that rendering applies nuisance transformations to intrinsic representations (e.g. 3D geometry). |
| | Difficulty handing occlusion, clutter and classifying objects that are slender, transparent, metallic. | Modify DRM to include intrinsic computer-graphics-based representations, transformations and photorealistic rendering. |
| | Model is static and thus cannot learn from videos. | Incorporate time into DRM (Dynamic DRM). |
| Inference | Infers most probable global configuration (max-product), ignoring alternative hypotheses. | Use softer message-passing, i.e. higher temperature or sum-product, to encode uncertainty. |
| | No top-down inference/feedback is possible, so vision tasks involving lower-level variables (e.g. clutter, occlusion, segmentation) are difficult. | Compute contextual priors as top-down messages for low-level tasks. |
| Learning | Hard-EM Algorithm and its discriminative relaxation tend to confuse signal and noise. | Use Soft-EM or Variational Bayes-EM |
| | Nuisance variation makes learning intrinsic latent factors difficult. | Use Dynamic DRM with movies to learn that only a few nuisance parameters change per frame. |
| | Discriminative models cannot learn from unlabeled data. | Use DRM to do hybrid generative-discriminative learning that simultaneously incorporates labeled, unlabeled, and weakly labeled data. |

*FIG. 8*
*(Table 2)*

AUTOMATED COMPILATION OF PROBABILISTIC TASK DESCRIPTION INTO EXECUTABLE NEURAL NETWORK SPECIFICATION

PRIORITY CLAIM DATA

This application claims the benefit of priority to:

U.S. Provisional Application No. 62/131,872, filed on Mar. 12, 2015, titled "System for the Automated Construction and Manufacturing of Deep Neural Network Architectures for Solving Machine Learning Tasks", invented by Ankit B. Patel and Richard G. Baraniuk;

U.S. Provisional Application No. 62/137,656, filed on Mar. 24, 2015, titled "System for the Automated Construction and Manufacturing of Deep Neural Network Architectures for Solving Machine Learning Tasks", invented by Ankit B. Patel and Richard G. Baraniuk; and PCT Application No. 2016/022127, filed on Mar. 11, 2016, titled "Automated Compilation of Probabilistic Task Description into Executable Neural Network Specification", invented by Ankit B. Patel and Richard G. Baraniuk.

The above-identified Applications are hereby incorporated by reference in their entireties as though fully and completely set forth herein.

GOVERNMENT RIGHTS IN INVENTION

This invention was made with government support under:

Grant No. FA9550-14-1-0088 awarded by Air Force Office of Scientific Research (USAF/AFOSR);

Grant No. IIS1124535 awarded by the National Science Foundation;

Grant No. N00014-10-1-0989 awarded by the Office of Naval Research;

Grant No. N00014-11-1-0714 awarded by the Office of Naval Research;

Grant No. N00014-12-1-0579 awarded by the Office of Naval Research.

The government has certain rights in the invention.

FIELD OF THE INVENTION

The present invention relates to the field of machine learning, and more particularly, to a compilation procedure for converting a probabilistic description of an inference task into a neural network for realizing the inference task.

DESCRIPTION OF THE RELATED ART

Neural networks are practical instruments of the modern age, capable of solving a vast array of machine learning problems, often with superhuman performance. To name a few examples, a neural network may be used to: classify an image; identify an object that appears in an image; translate handwriting into text; translate a speech signal into text or phonemes; translate one language into another; diagnose a disease based on measured diagnostic features; identify a chemical (or chemicals) present in a sample based on a measurement of the sample's wavelength spectrum; identify the emotional state of a person from an image of the person's face or a sample of the person's speech.

A neural network may include an alternating sequence of linear processing layers and non-linear processing layers. Each linear processing layer (a) operates on inputs provided by a previous non-linear processing layer and (b) provides outputs to a next non-linear processing layer. Each non-linear processing layer (c) operates on input provided by a previous linear processing layer and (d) provides outputs to a next linear processing layer. Each unit in a linear processing layer may store a corresponding weight vector w that is used to compute a weighted sum of the inputs to the unit. Each unit in a non-linear processing layer may include a corresponding set of one or more parameters (e.g., a bias parameter) that is used to apply a non-linear function to the input (or inputs) supplied to the unit. (Any of a wide variety of non-linear functions may be used.)

One of the fundamental difficulties in neural network engineering is the task of translating the definition of a machine learning problem into a neural network structure for solving the problem. For example, if an engineer wants to design a neural network for converting images of handwriting into text, the engineer will need to decide on structural features of the neural network such as: a number of layers to use; the processing type (e.g., linear, max pooling, etc.) of each layer; the patterns of interconnectivity between layers; and the features to be associated with respective linear processing layers. An engineer may make such decisions based on ad hoc procedure, guided by intuition in combination with trial-and-error experiments. (As an example, for the task of locating a face within an image, the engineer may guess that an initial hidden layer should be configured to locate edges in the image, while another hidden layer should be configured to detect a combination of edges that form the outline of an eye.) This procedure is labor intensive and inhibits the proliferation of neural network solutions. There exists no systematic procedure for translating a problem definition for an arbitrary machine learning task (or inference task) to a neural network structure.

Another fundamental difficulty in neural network engineering is the intensive computational effort required to train existing neural networks. The process of training aims at assigning an optimal set of values for the parameters of the neural network, based on a set of training data pairs. Each training data pair may include a corresponding input data vector for the neural network and a corresponding output value (or output vector), e.g., an output value (or output vector) that the neural network should ideally produce in response to the input data vector. The training process results in a trained neural network that generalizes the functional relationship between input and output. Because the number of parameters in a neural network can be quite large, the training process can be computationally laborious. Thus, there exists a need for improved mechanisms for training neural networks, i.e., for determining optimal (or appropriate) values for parameters of a neural network relative to a given machine learning task (e.g., inference task) to be performed.

SUMMARY

A grand challenge in machine learning is the development of computational algorithms that match or outperform humans in perceptual inference tasks such as visual object and speech recognition. The key factor complicating such tasks is the presence of numerous nuisance variables, for instance, the unknown object position, orientation, and scale in object recognition, or the unknown voice pronunciation, pitch, and speed in speech recognition. Recently, a new breed of deep learning algorithms have emerged for high-nuisance inference tasks; they are constructed from many layers of alternating linear and nonlinear processing units and are trained using large-scale algorithms and massive amounts of training data. The recent success of deep learning systems is impressive—they now routinely yield pattern recognition systems with near- or super-human capabilities—but two fundamental question remains: (i) Why do they work? and (ii) How to derive the best deep network for solving a given inference task? Intuitions abound, but a coherent framework for understanding, analyzing, and synthesizing deep learning architectures has remained elusive.

We answer these questions by developing a new probabilistic framework for deep learning based on a Bayesian generative probabilistic model that explicitly captures variation due to nuisance variables. The graphical structure of the model enables it to be learned from data using classical expectation-maximization techniques. Furthermore, by relaxing the generative model to a discriminative one, we can recover two of the current leading deep learning systems, deep convolutional neural networks (DCNs) and random decision forests (RDFs), providing insights into their successes and shortcomings as well as a principled route to their improvement and refinement. Our framework goes far beyond explaining why current deep learning systems work. We develop an explicit procedure, called BrainFactory, that can convert a large class of probabilistic models into novel deep learning systems for solving difficult inference problems.

In one set of embodiments, a computer-implemented method for constructing a neural network may include the following operations.

The method may include receiving model input that specifies a generative probabilistic model, wherein the generative probabilistic model characterizes a conditional probability distribution for measurement data given a set of latent variables. The measurement data may be a random vector variable, whose components represent elements or features of interest in a given application.

The method may also include generating a factor graph corresponding to the generative probabilistic model, where the factor graph includes a measurement data node, latent variable nodes and factor nodes.

The method may also include expanding each factor node based on a specified inference task and a specified kind of message passing algorithm. Each factor node is expanded into a corresponding sequence of arithmetic operations. The factor graph and the sequences of arithmetic operations specify a structure of a neural network for performance of the inference task.

The method may also include executing a learning algorithm to determine values of parameters of the neural network.

The method may also include storing information that specifies a trained state of the neural network, wherein the information includes the sequences of arithmetic operations and the determined parameter values.

Additional embodiments are described in U.S. Provisional Application No. 62/131,872 (filed on Mar. 12, 2015) and U.S. Provisional Application No. 62/137,656 (filed on Mar. 24, 2015).

BRIEF DESCRIPTION OF THE DRAWINGS

A better understanding of the present invention can be obtained when the following detailed description of the preferred embodiments is considered in conjunction with the following drawings.

FIGS. 1A-1C present: (1A) a graphical depiction of a naïve Bayes classifier (left) and a Gaussian mixture model (right); (1B) a shallow rendering model; and (1C) a deep rendering model. All dependence on pixel location x has been suppressed for clarity.

FIGS. 2A-2C depict a process of mapping from the deep rendering model (2A) to a factor graph to (2B) to a deep convolutional neural network (2C), showing only the transformation from level l of the hierarchy to level l+1. (DRM is an acronym for deep rendering model. DCN is an acronym for deep convolutional neural network.) FIG. 2A shows the DRM generative model: a single super pixel $x^{l+1}$ at level l+1 (upper) renders down to a 3×3 image patch at level l (lower), whose location is specified by $g^{l+1}$. FIG. 2B shows the factor graph representation of the DRM model designed specifically for inference algorithms such as the max-sum message passing shown here. FIG. 2C shows the resulting neural network that explicitly implements the max-sum message passing algorithm from FIG. 2B; its structure exactly matches that of a deep convolutional network.

FIG. 4 (i.e., Table 1) presents a summary of probabilistic and neural network perspectives for DCNs, according to one set of embodiments. The DRM provides an exact correspondence between the two, providing a probabilistic interpretation for all of the common elements of DCNs relating to the underlying model, inference algorithm, and learning rules.

FIGS. 5A and 5B depict a discriminative relaxation procedure. In FIG. 5A, the Rendering Model (RM) is depicted graphically, with mixing probability parameters $\pi_{cg}$ and rendered template parameters $\lambda_{cg}$. The brain-world transformation converts the RM to an equivalent graphical model (as shown in FIG. 5B), where an extra set of parameters $\tilde{\theta}$ and constraints (arrows from θ to $\tilde{\theta}$) have been introduced. Discriminatively relaxing these constraints (denoted by the X markers) yields the single-layer DCN as the discriminative counterpart to the original generative RM classifier in FIG. 5A.

FIGS. 6A-6L show the results of activity maximization on ImageNet dataset. For a given class c, activity-maximizing inputs are superpositions of various poses of the object, with distinct patches Pi containing distinct poses $g_{P_i}^*$, as predicted by Eq. (28). These Figures are adapted from (32) with permission from the authors.

Note that disentanglement of the latent nuisance parameters is achieved progressively over multiple layers, without requiring the network to explicitly train for them. Due to the complexity of the variation induced, several layers are required for successful disentanglement, as predicted by our theory.

FIG. 8 (i.e., Table 2) shows currents limitations of DCNs and potential solutions using extended DRMs.

Figure 9:
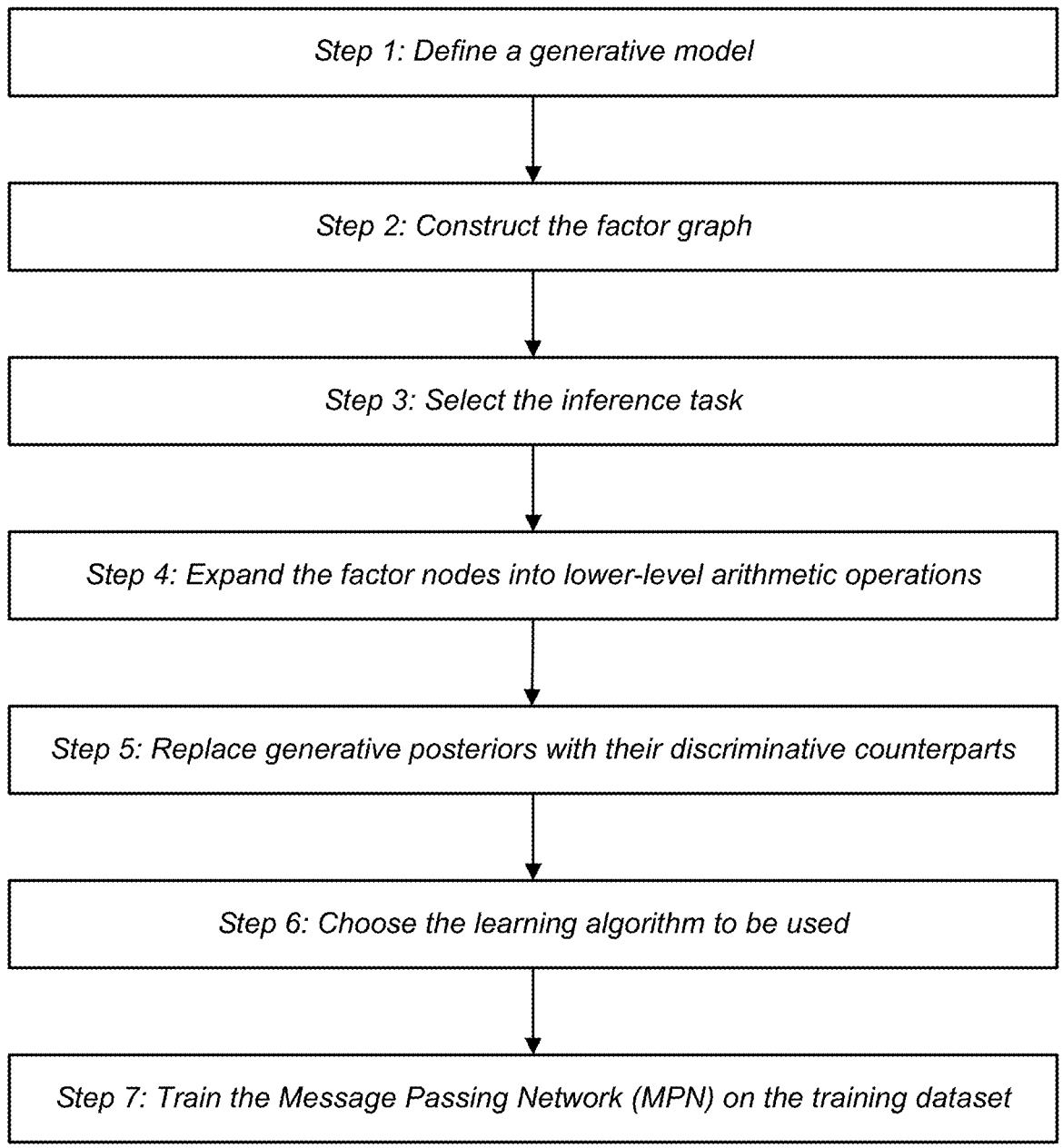

FIG. 9 illustrates one embodiment of the BrianFactory procedure.

Figure 10:
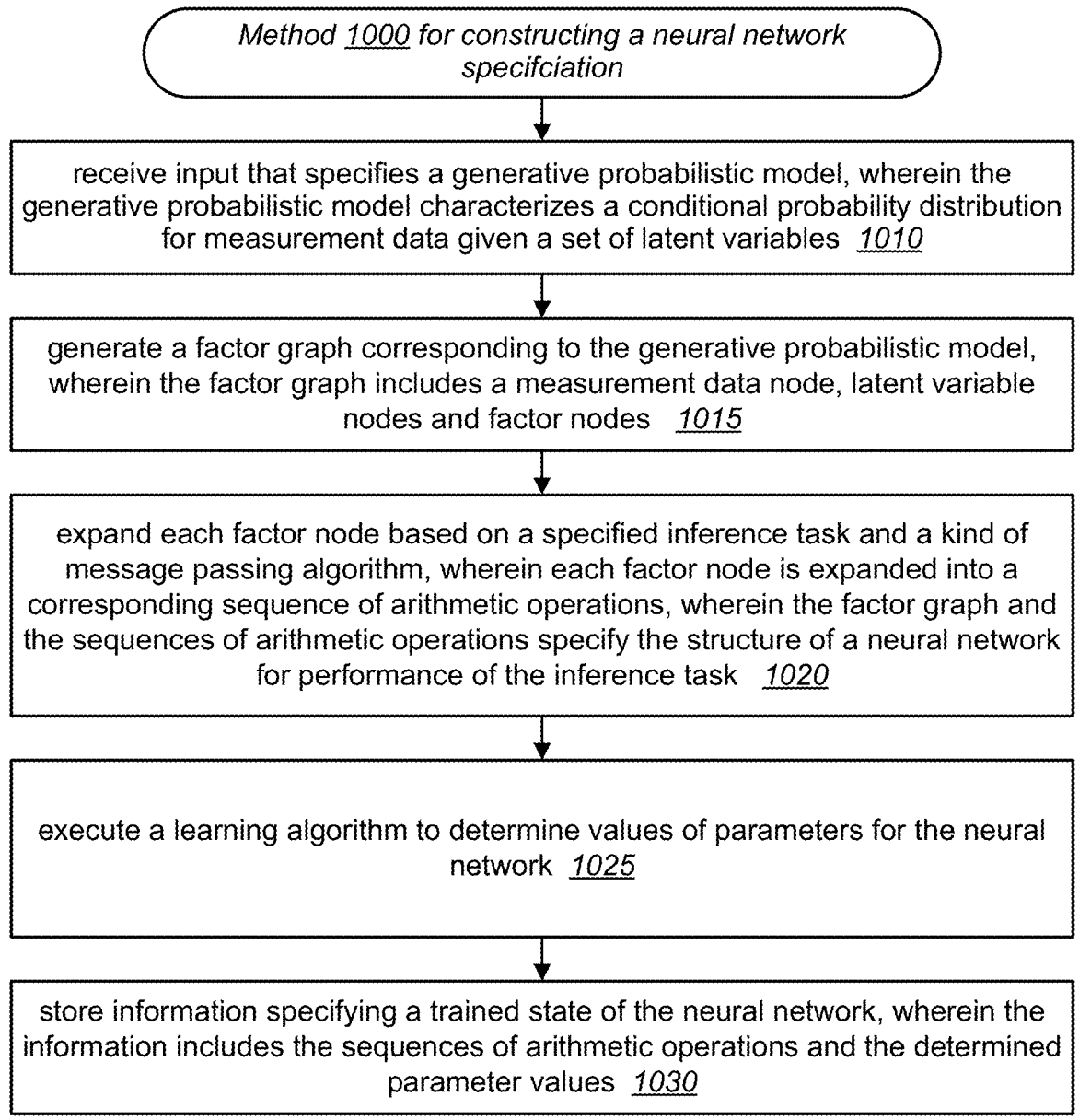

FIG. 10 illustrates one embodiment of a method for constructing a neural network.

Figure 11:
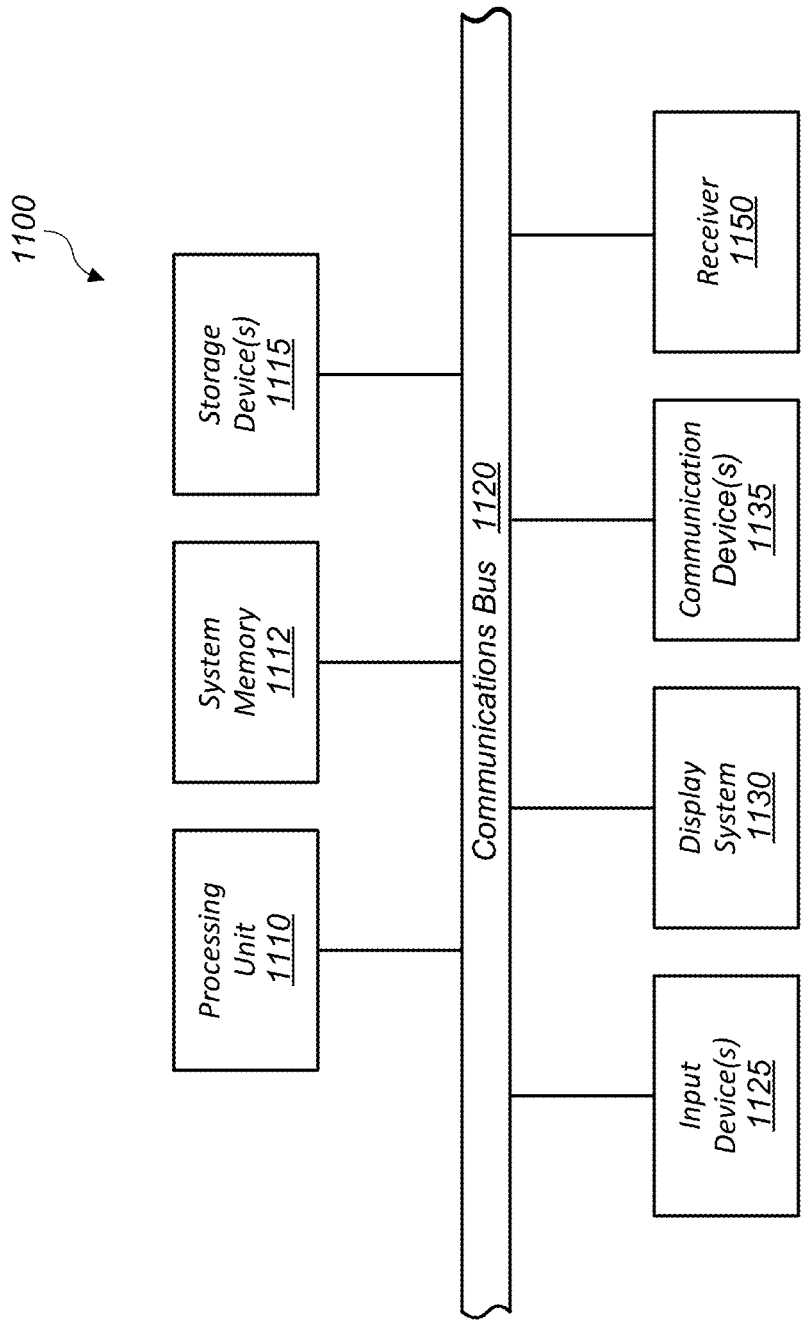

FIG. 11 illustrates one embodiment of a computer system that may be used to implement any of the embodiments described herein.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; media based on the modulation of a physical property of a material substrate; etc. The term "memory medium" includes within its scope of meaning the possibility that a given memory medium might be a union of two or more memory media that reside at different locations, e.g., in different portions of an integrated circuit or on different integrated circuits in an electronic system or on different computers in a computer network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), laptop computers, tablet computers, mainframe computers, workstations, server computers, client computers, network or Internet appliances, hand-held devices, mobile devices such as media players or mobile phones, personal digital assistants (PDAs), computer-based television systems, grid computing systems, wearable computers, computers implanted in living organisms, computers embedded in head-mounted displays, computers embedded in sensors, computers embedded in camera devices or imaging devices or measurement devices, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

Automated Construction and Manufacturing of Neural Network Architectures for Solving Machine Learning Tasks The following is an outline of sections to be presented below.

1 Introduction
2 A Deep Probabilistic Model for Nuisance Variation
2.1 The Rendering Model: Capturing Nuisance Variation
2.2 Deriving the Key Elements of One Layer of a Deep Convolutional
Network from the Rendering Model
2.2.1 Deriving the Rectified Linear Unit (ReLU) from Sparsity Assumptions
2.2.2 What about Non-diagonal Covariance Structure?
2.3 The Deep Rendering Model: Capturing Levels of Abstraction
2.4 Inference in the Deep Rendering Model
2.4.1 What About the SoftMax Regression Layer?
2.4.2 What About the ReLUs?
2.5 DCNs are Probabilistic Message Passing Networks
2.5.1 Deep Rendering Model and Message Passing
2.5.2 A Unification of Neural Networks and Probabilistic Inference
2.5.3 The Probabilistic Role of Max-Pooling
2.6 Learning the Rendering Models
2.6.1 EM Algorithm for the Shallow Rendering Model
2.6.2 Hard EM Algorithm
2.6.3 EM Algorithm for the Deep Rendering Model
2.6.4 What About DropOut Training?
2.7 From Generative to Discriminative Classifiers
2.7.1 Transforming a Generative Classifier into a Discriminative One
2.7.2 From the Deep Rendering Model to Deep Convolutional Networks
3 New Insights into Deep Convolutional Networks
3.1 DCNs Possess Full Probabilistic Semantics
3.2 Class Appearance Models and Activity Maximization
3.3 (Dis)Entanglement: Supervised Learning of Task Targets Is Intertwined with Unsupervised Learning of Latent Task Nuisances
4 From the Deep Rendering Model to Random Decision Forests
4.1 The Evolutionary Deep Rendering Model: A Hierarchy of Categories
4.2 Inference with the E-DRM Yields a Decision Tree 4.2.1 What About the Leaf Histograms?
4.3 Bootstrap Aggregation to Prevent Overfitting Yields A Decision Forest
4.4 EM Learning for the E-DRM Yields the InfoMax Principle
5 Relation to Prior Work
5.1 Relation to Mixture of Factor Analyzers
5.2 i-Theory: Invariant Representations Inspired by Sensory Cortex
5.3 Scattering Transform: Achieving Invariance via Wavelets
5.4 Learning Deep Architectures via Sparsity
5.5 Google FaceNet: Learning Useful Representations with DCNs
5.6 Renormalization Theory
5.7 Summary of Key Distinguishing Features of the DRM
6 New Directions
6.1 More Realistic Rendering Models
6.2 New Inference Algorithms
6.2.1 Soft Inference
6.2.2 Top-Down Convolutional Nets: Top-Down Inference via the DRM
6.3 New Learning Algorithms
6.3.1 Derivative-Free Learning
6.3.2 Dynamics: Learning from Video
6.3.3 Learning Architectures: Model Selection in the DRM
6.3.4 Training from Labeled and Unlabeled Data
7 Other Architectures: Autoencoders and LS™/Gated RNNs
7.1 From Gaussian-Bernoulli RBMs to Autoencoders
7.1.1 EM Algorithm for the Gaussian-Binary RBM
7.2 From Two-Time Hidden Markov Models to LSTM/Gated RNNs
7.2.1 Update/Forget/Remember Gate
7.2.2 Refresh/Reset Gate
1 Introduction Humans are expert at a wide array of complicated sensory inference tasks, from recognizing objects in an image to understanding phonemes in a speech signal, despite significant variations such as the position, orientation, and scale of objects and the pronunciation, pitch, and volume of speech. Indeed, the main challenge in many sensory perception tasks in vision, speech, and natural language processing is a high amount of such nuisance variation. Nuisance variations complicate perception, because they turn otherwise simple statistical inference problems with a small number of variables (e.g., class label) into much higher-dimensional problems. For example, images of a car taken from different camera viewpoints lie on a highly curved, nonlinear manifold in high-dimensional space that is intertwined with the manifolds of myriad other objects. The key challenge in developing an inference algorithm is then how to factor out all of the nuisance variation in the input. Over the past few decades, a vast literature that approaches this problem from myriad different perspectives has developed, but the most difficult inference problems have remained out of reach.

Recently, a new breed of machine learning algorithms have emerged for high-nuisance inference tasks, resulting in pattern recognition systems with sometimes super-human capabilities (1). These so-called deep learning systems share two common hallmarks. First, architecturally, they are constructed from many layers of alternating linear and nonlinear processing units. Second, computationally, their parameters are learned using large-scale algorithms and massive amounts of training data. Two examples of such architectures are: the deep convolutional neural network (DCN), which has seen great success in tasks like visual object recognition and localization (2), speech recognition (3), and part-of-speech recognition (4); and random decision forests (RDFs) (5) for image segmentation.

The success of deep learning systems is impressive, but two fundamental questions remain: (i) Why do they work? and (ii) How to derive the best deep network for solving a given task? Intuitions abound to explain their success. Some explanations focus on properties of feature invariance and selectivity developed over multiple layers, while others credit raw computational power and the amount of available training data (1). However, beyond these intuitions, a coherent theoretical framework for understanding, analyzing, and synthesizing deep learning architectures has remained elusive.

In this patent, we develop a new theoretical framework that provides insights into both the successes and shortcomings of deep learning systems, as well as a principled route to their design and improvement. Our framework is based on a generative probabilistic model that explicitly captures variation due to latent nuisance variables. The Rendering Model (RM) explicitly models nuisance variation through a rendering function that combines the task-specific variables of interest (e.g., object class in an object recognition task) and the collection of nuisance variables. The Deep Rendering Model (DRM) extends the RM in a hierarchical fashion by rendering via a product of affine nuisance transformations across multiple levels of abstraction. The graphical structures of the RM and DRM enable inference via message passing, using, for example, the sum-product or max-sum algorithms, and training via the expectation-maximization (EM) algorithm. By relaxing the generative model to a discriminative one, we recover deep convolutional neural networks (DCNs) and random forests (RFs) and discover a number of ways that they can be improved. (In some embodiments, a key element of the framework is the relaxation of the RM/DRM generative model to a discriminative one in order to optimize the bias-variance tradeoff.)

Most importantly, our framework goes far beyond explaining why current deep learning systems work. We develop an explicit procedure, which we call BrainFactory, that can convert a large class of probabilistic graphical models into new deep learning systems for solving new kinds of inference problems.

The DRM unites and subsumes two of the current leading deep learning based systems as max-sum message passing networks. That is, configuring the DRM with two different nuisance structures—Gaussian translational nuisance or evolutionary additive nuisance—leads directly to DCNs and RDFs, respectively. The intimate connection between the DRM and these deep learning systems provides a range of new insights into how and why they work, answering several open questions. Moreover, the DRM provides insights into how and why deep learning fails and suggests pathways to their improvement.

It is important to note that our theory and methods apply to a wide range of inference tasks (including, for example, classification, estimation, regression, etc.) that feature a number of task-irrelevant nuisance variables (including, for example, object and speech recognition). However, for concreteness of exposition, we will focus below on the classification problem underlying visual object recognition.

The following discussion is organized as follows. Section 2 introduces the RM and DRM and demonstrates step-by-step how they map onto DCNs. Section 3 then summarizes some of the key insights that the DRM provides into the operation and performance of DCNs. Section 4 proceeds in a similar fashion to derive RDFs from a variant of the DRM that models a hierarchy of categories. Section 6 suggests a number of promising avenues for research, including several that should lead to improvement in deep learning system performance and generality.

2 A Deep Probabilistic Model for Nuisance Variation

The main challenge in many sensory perception tasks in vision, speech, and natural language processing is a high amount of nuisance variation. For instance, recognizing faces and objects requires robustness to changes in pose, location, depth, lighting, and deformations such as varying facial expressions. Similarly, recognizing phonemes in speech requires robustness to changes in pitch, speed, volume, and accent.

Nuisance variations complicate perception because they turn otherwise simple statistical inference problems with a small number of variables (e.g., class label) into much higher-dimensional problems. For example, images of a car taken from different camera viewpoints lie on a highly curved, nonlinear manifold in high-dimensional space that is intertwined with the manifolds of myriad other objects. A key question in developing an inference algorithm is then: how to factor out all of the nuisance variation in the input?

In this patent, we directly address the nuisance variation problem by constructing a probabilistic model that explicitly models nuisance transformations as latent variables. The theory and methods presented below apply to any task where the goal is to distinguish task-relevant targets from a large number of task-irrelevant nuisance variables (including, but not limited to, object recognition, speech recognition, and part-of-speech recognition). However, for concreteness of exposition, here we will focus on the problem of visual object recognition. The framework also extends to inference problems beyond classification, such as, but not limited to, estimation, regression, and detection.

This section develops the RM, a generative probabilistic model that explicitly captures nuisance transformations as latent variables. We show how inference in the RM corresponds to operations in a single layer of a DCN. We then extend the RM by defining the DRM, a rendering model with layers representing different scales or levels of abstraction. Finally, we show that, after the application of a discriminative relaxation, inference and learning in the DRM correspond to feedforward propagation and back propagation training in the DCN. This enables us to conclude that DCNs are probabilistic message passing networks, thus unifying the probabilistic and neural network perspectives.

2.1 The Rendering Model: Capturing Nuisance Variation

Visual object recognition is naturally formulated as a statistical classification problem. (Recall that we focus on object recognition from images only for concreteness of exposition.) We are given a D-pixel, multi-channel image I of an object, with intensity $I(x,\omega)$ at pixel x and channel $\omega$ (e.g., $\omega \in \{red, green, blue\}$). We seek to infer the object's identity (class) $c \in C$, where C is a finite set of classes. (The restriction for C to be finite can be removed by using a nonparametric prior such as a Chinese Restaurant Process.) We will use the terms "object" and "class" interchangeably. Given a joint probabilistic model p(I,c) for images and objects, we can classify a particular image I using the maximum a posteriori (MAP) classifier $$\hat{c}(I) = \text{argmax}_{c \in C} p(c|I) = \text{argmax}_{c \in C} p(I|c)p(c), \quad (1)$$

where p(I|c) is the image likelihood, p(c) is the prior distribution over the classes, and $p(c|I) \propto p(I|c)p(c)$ by Bayes' rule.

Object recognition, like many other inference tasks, is complicated by a high amount of variation due to nuisance variables, which the above formation ignores. We advocate explicitly modeling nuisance variables by encapsulating all of them into a (possibly high-dimensional) parameter $g \in G$, where G is the set of all nuisances. In some cases, it is natural for g to be a transformation and for G to be endowed with a group structure (or semi-group structure).

We now propose a generative model for images that explicitly models the relationship between images I of the same object c subject to nuisance g. First, given c, g, and other auxiliary parameters, we define the rendering function R(c,g) that renders (produces) an image. In image inference problems, for example, R(c,g) might be a photorealistic computer graphics engine (c.f., Pixar). A particular realization of an image is then generated by adding noise to the output of the renderer:

$$I|c,g = R(c,g) + \text{noise}. \quad (2)$$

We assume that the noise distribution is from the exponential family, which includes a large number of practically useful distributions (e.g., Gaussian, Poisson, etc.). Also we assume that the noise is independent and identically distributed (iid) as a function of pixel location x and that the class and nuisance variables are independently distributed according to categorical distributions. (Independence is merely a convenient approximation; in practice, g can depend on c. For example, humans have difficulty recognizing and discriminating upside down faces (7).) With these assumptions, Eq. 2 then becomes the probabilistic (shallow) Rendering Model (RM)

$$c \sim \text{Cat}(\{\pi_c\}_{c \in C})$$

$$g \sim \text{Cat}(\{\pi_g\}_{g \in C})$$

$$I|c,g \sim Q(\theta_{cg}). \quad (3)$$

Here $Q(\theta_{cg})$ denotes a distribution from the exponential family with parameters $\theta_{cg}$, which include the mixing probabilities $\pi_{cg}$, natural parameters $\eta(\theta_{cg})$, sufficient statistics T(I), and whose mean is the rendered template $\mu_{cg} = R(c,g)$.

An important special case is when $Q(\theta_{cg})$ is Gaussian. This assumption defines the Gaussian Rendering Model (GRM), in which images are generated according to $$I|c,g \sim N(I|\mu_{cg} = R(c,g), \Sigma_{cg} = \sigma^2 1), \quad (4)$$

where 1 is the identity matrix. The GRM generalizes both the Gaussian Naïve Bayes Classifier (GNBC) and the Gaussian Mixture Model (GMM) by allowing variation in the image to depend on an observed class label c, like a GNBC, and on an unobserved nuisance label g, like a GMM. The GNBC, GMM and the (G)RM can all be conveniently described as a directed graphical model (8). FIG. 1A depicts the graphical models for the GNBC and GMM, while FIG. 1B shows how they are combined to form the (G)RM.

Finally, since the world is spatially varying and an image can contain a number of different objects, it is natural to break the image up into a number of (overlapping) subimages, called patches, that are indexed by spatial location x. Thus, a patch is defined here as a collection of pixels centered on a single pixel x. In general, patches can overlap, meaning that (i) they do not tile the image, and (ii) an image pixel x can belong to more than one patch. Given this notion of pixels and patches, we allow the class and nuisance variables to depend on pixel/patch location: i.e., local image class c(x) and local nuisance g(x) (see FIG. 2A). We will omit the dependence on x when it is clear from context.

The notion of a rendering operator is quite general and can refer to any function that maps a target variable c and nuisance variables g into a pattern or template R(c,g). For example, in speech recognition, c might be a phoneme, in which case g represents volume, pitch, speed, and accent, and R(c,g) is the amplitude of the acoustic signal (or alternatively the time-frequency representation). In natural language processing, c might be the grammatical part-of-speech, in which case g represents syntax and grammar, and R(c,g) is a clause, phrase or sentence.

To perform object recognition with the RM via Eq. 1, we marginalize out the nuisance variables g. We consider two approaches for doing so. The Sum-Product RM Classifier (SP-RMC) sums over all nuisance variables g∈G and then chooses the most likely class:

$$\hat{c}_{SP}(I) = \text{argmax}_{c \in C} \frac{1}{|G|} \sum_{g \in G} p(I \mid c, g) p(c) p(g) \quad (5)$$

$$= \text{argmax}_{c \in C} \frac{1}{|G|} \sum_{g \in G} \exp\langle \eta(\theta_{cg}) \mid T(I) \rangle$$

where $\langle \cdot \mid \cdot \rangle$ is the bra-ket notation for inner products and in the last line we have used the definition of an exponential family distribution. Thus the SP-RM computes the marginal of the posterior distribution over the target variable, given the input image.

An alternative approach is to use the Max-Sum RM Classifier (MS-RMC), which maximizes over all g∈G and then chooses the most likely class:

$$\hat{c}_{MS}(I) = \text{argmax}_{c \in C} \max_{g \in G} p(I \mid c, g) p(c) p(g) \quad (6)$$

$$= \text{argmax}_{c \in C} \max_{g \in G} \langle \eta(\theta_{cg}) \mid T(I) \rangle.$$

The MS-RMC computes the mode of the posterior distribution over the target and nuisance variables, given the input image. Equivalently, it computes the most likely global configuration of target and nuisance variables for the image. Intuitively, this is an effective strategy when there is one explanation g*∈G that dominates all other explanations g≠g*. This condition is justified in settings where the rendering function is deterministic or nearly noise-free. This approach to classification is unconventional in both the machine learning and computational neuroscience literatures, where the sum-product approach is most commonly used, although it has received some recent attention (9).

Both the sum-product and max-sum classifiers amount to applying an affine transformation to the input image I (via an inner product that performs feature detection via template matching), followed by a sum or max nonlinearity that marginalizes over the nuisance variables.

Throughout the present discussion we will assume isotropic or diagonal Gaussian noise for simplicity, but the treatment presented here can be generalized to any distribution from the exponential family in a straightforward manner. Note that such an extension may require a non-linear transformation (e.g., quadratic or logarithmic T(I)), depending on the specific exponential family.

2.2 Deriving the Key Elements of One Layer of a Deep Convolutional Network from the Rendering Model Having formulated the Rendering Model (RM), we now show how to connect the RM with deep convolutional networks (DCNs). We will see that the MS-RMC (after imposing a few additional assumptions on the RM) gives rise to most commonly used DCN layer types.

Our first assumption is that the noise added to the rendered template is isotropically Gaussian (GRM), i.e., each pixel has the same noise variance $\sigma^2$ that is independent of the configuration (c,g). Then, assuming the image is normalized $\|I\|^2 = 1$, Eq. 6 yields the max-sum Gaussian RM classifier $$\hat{c}_{MS}(I) = \text{argmax}_{c \in C} \max_{g \in G} \left\{ \left\langle \frac{1}{\sigma^2} \mu_{cg} \mid I \right\rangle - \frac{1}{2\sigma^2} \|\mu_{cg}\|_2^2 + \ln \pi_c \pi_g \right\} \quad (7)$$

$$\equiv \text{argmax}_{c \in C} \max_{g \in G} \langle w_{cg} \mid I \rangle + b_{cg}$$

where we have defined the natural parameters $\eta \equiv \{w_{cg}, b_{cg}\}$ in terms of the traditional parameters $\theta \equiv \{\sigma^2, \mu_{cg}, \pi_c, \pi_g\}$ according to $$w_{cg} \equiv \frac{1}{\sigma^2} \mu_{cg} = \frac{1}{\sigma^2} R(c, g) \quad (8)$$

$$b_{cg} \equiv -\frac{1}{2\sigma^2} \|\mu_{cg}\|_2^2 + \ln \pi_c \pi_g$$

(Since the Gaussian distribution of the noise is in the exponential family, it can be reparametrized in terms of the natural parameters. This is known as canonical form.) Note that we have suppressed the parameters' dependence on pixel location x.

We will now demonstrate that the sequence of operations in the MS-RMC in Eq. 7 coincides exactly with the operations involved in one layer of a DCN (or, more generally, a max-out neural network (10)): image normalization, linear template matching, thresholding, and max pooling. See FIG. 2C. We now explore each operation in Eq. 7 in detail to make the link precise.

First, the image is normalized. Until recently, there were several different types of normalization typically employed in DCNs: local response normalization, and local contrast normalization (11, 12). However, the most recent highly performing DCNs employ a different form of normalization, known as batch-normalization (11). We will come back to this later when we show how to derive batch normalization from a principled approach. One implication of this is that it is unclear what probabilistic assumption the older forms of normalization arise from, if any.

Second, the image is filtered with a set of noise-scaled rendered templates $w_{cg}$. The size of the templates depends on the size of the objects of class c and the values of the nuisance variables g. Large objects will have large templates, corresponding to a fully connected layer in a DCN (12), while small objects will have small templates, corresponding to a locally connected layer in a DCN (13). If the distribution of objects depends on the pixel position x (e.g., cars are more likely on the ground while planes are more likely in the air) then, in general, we will need different rendered templates at each x. In this case, the locally connected layer is appropriate. If, on the other hand, all objects are equally likely to be present at all locations throughout the entire image, then we can assume translational invariance in the RM. This yields a global set of templates that are used at all pixels x, corresponding to a convolutional layer in a DCN (12). If the filter sizes are large relative to the scale at which the image variation occurs and the filters are overcomplete, then adjacent filters overlap and waste computation. In these cases, it is appropriate to use a strided convolution, where the output of the traditional convolution is down-sampled by some factor; this saves some computation without losing information.

Third, the resulting activations (log-probabilities of the hypotheses) are passed through a pooling layer; i.e., if g is a translational nuisance, then taking the maximum over g corresponds to max pooling in a DCN.

2.2.1 Deriving the Rectified Linear Unit (ReLU) from Sparsity Assumptions

Recall that a given image pixel x will reside in several overlapping image patches, each rendered by its own parent class c(x) and the nuisance location g(x) (FIG. 2A). Thus, we consider the possibility of collisions, i.e., when two different parents $c(x_1) \neq c(x_2)$ might render the same pixel (or patch). To avoid such undesirable collisions, it is natural to force the rendering to be locally sparse. Thus, we require that only one renderer in a local neighborhood can be "active".

To formalize this, we endow each parent renderer with an ON/OFF state via a switching variable $a \in A \equiv \{ON, OFF\}$. If a=ON=1, then the rendered image patch is left untouched, whereas if a=OFF=0, the image patch is masked with zeros after rendering (or alternatively, set to all zeros without rendering). Thus, the switching variable a models the activity state of parent renderers. (In some embodiment, the switching variable a may also model missing data.)

However, these switching variables have strong correlations due to the crowding out effect: if one is ON, then its neighbors must be OFF in order to prevent rendering collisions. Although natural for realistic rendering, this complicates inference. Thus, we employ an approximation by instead assuming that the state of each renderer (ON or OFF) is determined completely at random and thus independently of any other variables, including the measurements (i.e., the image itself). Of course, this is an approximation to real rendering, but it simplifies inference, and leads directly to rectified linear units (ReLUs), as we show below. Such approximations to true sparsity have been extensively studied, and are known as spike-and-slab sparse coding models (14, 15).

Since the switching variables are latent (unobserved), we max-marginalize over them during classification, as we did with nuisance variables g in the last section (one can think of a as just another nuisance). This leads to $$\hat{c}(I) = \text{argmax}_{c \in C} \text{max}_{g \in G} \text{max}_{a \in A} \left\{ \begin{array}{l} \langle \frac{1}{\sigma^2} a\mu_{cg} | I \rangle - \\ \frac{1}{2\sigma^2}(\|a\mu_{cg}\|_2^2 + \|I\|_2^2) + \\ \ln \pi_c \pi_g \pi_a \end{array} \right\} \quad (9)$$

$$\equiv \text{argmax}_{c \in C} \text{max}_{g \in G} \text{max}_{a \in A} a(\langle w_{cg} | I \rangle + b_{cg}) + b_{cga}$$

$$= \text{argmax}_{c \in C} \text{max}_{g \in G} ReLU(\langle w_{cg} | I \rangle + b_{cg})$$

where $b_{cga}$ and $b_{cg}$ are bias terms and $$ReLU(u) \equiv (u)_+ = \max\{u, 0\}$$

denotes the soft-thresholding operation performed by the Rectified Linear Units (ReLUs) in modern DCNs (16). In the last line, we have assumed that the prior $\pi_{cg}$ is uniform so that $b_{cga}$ is independent of c and g and can be dropped.

2.2.2 What about Non-diagonal Covariance Structure?

The above derivations have been for diagonal or isotropic covariance Gaussian noise models. But what if we want to model non-trivial correlations between pixels? A simple example would be if defined the action of the nuisance g on the rendered template $\mu_{cg}$ as $$\mu_{cg} = \Lambda_g \mu_c + \alpha_g,$$

or we could model the latent structure as low-dimensional via the use of a latent factor model:

$$z \sim N(0,1)$$

$$\mu_{cg} = \Lambda_{cg} z + \alpha_{cg}.$$

This is an instance of the Mixture of Factor Analyzers (MoFA) model, first introduced by Ghahramani and Hinton (22). The power of this model is that it employs both clustering and factor analysis in the same model. We will find this useful in the next section, when we go deep.

For now, let us consider how we would impose sparse spike-n-slab prior on this model. Similar to earlier, we can do this by introducing a switching vector a:

$$a \sim B(\pi_{ON})$$

$$z \sim N(0,1)$$

$$\mu_{cga} = \Lambda_{cga} z + \alpha_{cga},$$

where $\Lambda_{cga}$ is defined as a subset of the columns of $\Lambda_{cg}$, as selected by the indicator vector $a \in \{0, 1\}^d$. Intuitively, a selects which elements of the dictionary $\Lambda_{cg}$ will be used to render a patch. To enforce sparsity, we set the prior probability of $a_i=1$ to be small, e.g. $\pi_{ON} \approx 5\%$.

This latter formulation will be useful for us when we go deep in the next section. For now, we note that the proofs above still hold approximately, if we recognize that the only changes in eq. (9) are the inclusion of a quadratic term in I of the form $$Q(I, g) = -\frac{1}{2} \|I\|^2_{\Sigma_{cg}^{-1}},$$

where $\Sigma_{cg}$ is the covariance that results when the latent variable z is integrated out of the model:

$$I \sim N(\mu_{cg} = \alpha_{cg}, \Sigma_{cg} = \Lambda_{cg}\Lambda_{cg}^T + \sigma^2 1) \quad (10)$$

Now, there are several ways to deal with this quadratic term:

(1) Assume that the covariance $\Sigma_{cg}$ is independent of c,g.
(2) Go back and choose another exponential family model that has linear sufficient statistics i.e. isotropic Gaussian or Poisson or Exponential.
(3) Assume or execute an approximate standardization of the input images i.e. via a diagonal whitening $$I_n \to \frac{I_n - 1}{\hat{\sigma}_I}.$$

This will encourage Q(I,g) to be more uniform across images I and also to have a weaker dependence on g, making the linear approximation in eq. (9) better. Indeed, this rule has been used by Google to define Batch-normalized convnets, wherein each mini-batch is diagonally whitened at all levels of the network. This leads to dramatic speed ups in learning and a 20× reduction in the number of parameters needed on hard tasks such as object recognition.

We choose the latter strategy, noting that it implies that we are employing approximate inference.

2.3 the Deep Rendering Model: Capturing Levels of Abstraction

The world is summarizable at varying levels of abstraction, and Hierarchical Bayesian Models (HBMs) can exploit this fact to accelerate learning. In particular, the power of abstraction allows the higher levels of an HBM to learn concepts and categories far more rapidly than lower levels, due to stronger inductive biases and exposure to more data (17). This is informally known as the Blessing of Abstraction (17). In light of these benefits, it is natural for us to extend the RM into an HBM, thus giving it the power to summarize data at different levels of abstraction.

In order to illustrate this concept, consider the example of rendering an image of a face, at different levels of detail $l \in \{L, L-1, \ldots, 0\}$. At level $l=L$ (the coarsest level of abstraction), we specify only the identity of the face $c^L$ and its overall location and pose $g^L$ without specifying any finer-scale details such as the locations of the eyes or type of facial expression. At level $l=L-1$, we specify finer-grained details, such as the existence of a left eye ($c^{L-1}$) with a certain location, pose, and state (e.g., $g^{L-1}$=open or closed), again without specifying any finer-scale parameters (such as eyelash length or pupil shape). We continue in this way, at each level $l$ adding finer-scale information that was unspecified at level $l-1$, until at level $l=0$ we have fully specified the image's pixel intensities, leaving us with the fully rendered, multi-channel image $I^0(x^l, \omega^l)$. Here $x^l$ refers to a pixel location at level $l$.

For another illustrative example, consider *The Back Series* of sculptures by the artist Henri Matisse (FIGS. 3A-D). As one moves from left to right, the sculptures become increasingly abstract, losing low-level features and details, while preserving high-level features essential for the overall meaning: i.e. $(c^L, g^L)$="woman with her back facing us." Conversely, as one moves from right to left, the sculptures become increasingly concrete, progressively gaining finer-scale details (nuisance parameters $g^l$, $l=L-1$, $L-2, \ldots, 0$) and culminating in a rich and textured rendering.

We formalize this process of progressive rendering by defining the Deep Rendering Model (DRM). Analogous to the Matisse sculptures, the image generation process in a DRM starts at the highest level of abstraction ($l=L$), with the random choice of the object class $c^L$ and overall pose $g^L$. It is then followed by generation of the lower-level details $g^l$, and a progressive level-by-level ($l \to l-1$) rendering of a set of intermediate rendered "images" $\mu^l$, each with more detailed information. The process finally culminates in a fully rendered $D^0 \equiv D$-dimensional image $\mu^0 = I^0 \equiv I$ ($l=0$). Mathematically, $$c^L \sim \text{Cat}(\pi(c^L)), c^L \in C^L,$$

$$g^{l+1} \sim \text{Cat}(\pi(g^{l+1})), g^{l+1} \in G^{l+1},$$

$$l = L-1, L-2, \ldots, 0$$

$$\mu(c^L, g) = \Lambda(g)\mu(c^L) \equiv \Lambda^1(g^1) \ldots \Lambda^L(g^L) \cdot \mu(c^L),$$

$$g = \{g^l\}_{l=1}^L$$

$$I(c^L, g) = \mu(c^L, g) + N(0, \sigma^2 1_D) \in \mathbb{R}^D. \quad (11)$$

Here $C^l$, $G^l$ are the sets of all target-relevant and target-irrelevant nuisance variables at level $l$, respectively. The rendering path is defined as the sequence $(c^L, g^L, \ldots, g^l, \ldots, g^1)$ from the root (overall class) down to the individual pixels at $l=0$. $\mu(c^L)$ is an abstract template for the high-level class $c^L$, and $\Lambda(g) \equiv \Pi_l \Lambda^l(g^l)$ represents the sequence of local nuisance transformations that renders finer-scale details as one moves from abstract to concrete. Note that each $\Lambda^l(g^l)$ is an affine transformation with a bias term $\alpha(g^l)$ that we have suppressed for clarity. (This assumes that we are using an exponential family with linear sufficient statistics, i.e. $T(I)=(I,1)^T$. However, note that the family we use here is not Gaussian, it is instead a Factor Analyzer, a different probabilistic model.) FIG. 2A illustrates the corresponding graphical model. As before, we have suppressed the dependence of $c^l$, $g^l$ on the pixel location $x^l$ at level l of the hierarchy.

We can cast the DRM into an incremental form by defining an intermediate class $c^l \equiv (c^L, g^L, \ldots, g^{l+1})$ that intuitively represents a partial rendering path up to level l. Then, the partial rendering from level $l+1$ to $l$ can be written as an affine transformation $$\mu(c^l) = \Lambda^{l+1}(g^{l+1}) \cdot \mu(c^{l+1}) + \alpha(g^{l+1}) + N(0, \Psi^{l+1}), \quad (12)$$

where we have shown the bias term $\alpha$ explicitly and introduced noise with a diagonal covariance $\Psi^{l+1}$. (We introduce noise for at least two reasons: (1) it will make it easier to connect later to existing EM algorithms for factor analyzers; and (2) we can always take the noise-free limit to impose cluster well-separatedness if needed. Indeed, if the rendering process is deterministic or nearly noise-free, then the latter is justified.) It is important to note that $c^l, g^l$ can correspond to different kinds of target relevant and irrelevant features at different levels. For example, when rendering faces, $c^1(x^1)$ might correspond to different edge orientations and $g^1(x^1)$ to different edge locations in patch $x^1$, whereas $c^2(x^2)$ might correspond to different eye types and $g^2(x^2)$ to different eye gaze directions in patch $x^2$.

The DRM generates images at intermediate abstraction levels via the incremental rendering functions in Eq. 12 (see FIG. 2A). Hence the complete rendering function $R(c,g)$ from Eq. 2 is a composition of incremental rendering functions, amounting to a product of affine transformations as in Eq. 11. Compared to the shallow RM, the factorized structure of the DRM results in an exponential reduction in the number of free parameters, from $D^0|C^L| \Pi_l |G_l|$ to $|C^L| \tau_l D^l |G^l|$ where $D^l$ is the number of pixels in the intermediate image $\mu^l$, thus enabling more efficient inference and learning, and most importantly, better generalization.

The DRM as formulated here is distinct from but related to several other hierarchical models, such as the Deep Mixture of Factor Analyzers (DMFA) (20) and the Deep Gaussian Mixture Model (21), both of which are essentially compositions of another model—the Mixture of Factor Analyzers (MFA) (22).

2.4 Inference in the Deep Rendering Model

Inference in the DRM is similar to inference in the shallow RM. For example, to classify images we can use either the sum-product (Eq. 6) or the max-sum (Eq. 6) classifier. The key difference between the deep and shallow RMs is that the DRM yields iterated layer-by-layer updates, from fine-to-coarse abstraction (bottom-up), and optionally, from coarse-to-fine abstraction (top-down). In the case we are only interested in inferring the high-level class $c^L$, we only need the fine-to-coarse pass and so we will only consider it in this section.

Importantly, the bottom-up pass leads directly to DCNs, implying that DCNs ignore potentially useful top-down information. This may be an explanation for their difficulties in vision tasks with occlusion and clutter, where such top-down information is essential for disambiguating local bottom-up hypotheses. Later on in Section 6.2.2, we will describe the coarse-to-fine pass and a new class of Top-Down DCNs that do make use of such information.

Given an input image $I^0$, the max-sum classifier infers the most likely global configuration $\{c^l, g^l\}$, $l=0, 1, \ldots, L$ by executing the max-sum message passing algorithm in two stages: (i) from fine-to-coarse levels of abstraction to infer the overall class label $\hat{c}_{MS}^L$ and (ii) from coarse-to-fine levels of abstraction to infer the latent variables $\hat{c}_{MS}^l$ and $\hat{g}_{MS}^l$ at all intermediate levels l. As mentioned above, we will focus on the fine-to-coarse pass. Since the DRM is an RM with a hierarchical prior on the rendered templates, we can use Eq. 7 to derive the fine-to-coarse max-sum DRM classifier (MS-DRMC) as:

$$\hat{c}_{MS}(I) = \underset{c^L \in C}{\operatorname{argmax}} \max_{g \in \mathcal{G}} \left\langle \eta(c^L, g) \middle| \Sigma \middle|^{-1} \middle| I^0 \right\rangle \quad (13)$$

$$= \underset{c^L \in C}{\operatorname{argmax}} \max_{g \in \mathcal{G}} \left\langle \Lambda(g) \mu(c^L) \middle| (\Lambda(g) \Lambda(g)^T)^\dagger \middle| I^0 \right\rangle$$

$$= \underset{c^L \in C}{\operatorname{argmax}} \max_{g \in \mathcal{G}} \left\langle \mu(c^L) \middle| \prod_{\ell=L}^{1} \Lambda^\ell(g^\ell)^\dagger \middle| I^0 \right\rangle$$

$$= \underset{c^L \in C}{\operatorname{argmax}} \left\langle \mu(c^L) \middle| \prod_{\ell=L}^{1} \max_{g^\ell \in \mathcal{G}^\ell} \Lambda^\ell(g^\ell)^\dagger \middle| I^0 \right\rangle$$

$$= \underset{c^L \in C}{\operatorname{argmax}} \left\langle \mu(c^L) \middle| \max_{g^L \in \mathcal{G}^L} \Lambda^L(g^L)^\dagger \ldots \underbrace{\max_{g^1 \in \mathcal{G}^1} \Lambda^1(g^1)^\dagger \middle| I^0}_{\equiv I^1} \right\rangle$$

$$\equiv \underset{c^L \in C}{\operatorname{argmax}} \left\langle \mu(c^L) \middle| \max_{g^L \in \mathcal{G}^L} \Lambda^L(g^L)^\dagger \ldots \underbrace{\max_{g^2 \in \mathcal{G}^2} \Lambda^2(g^2)^\dagger \middle| I^1}_{\equiv I^2} \right\rangle$$

$$\equiv \underset{c^L \in C}{\operatorname{argmax}} \left\langle \mu(c^L) \middle| \max_{g^L \in \mathcal{G}^L} \Lambda^L(g^L)^\dagger \ldots \max_{g^3 \in \mathcal{G}^3} \Lambda^3(g^3)^\dagger \middle| I^2 \right\rangle$$

$$\vdots$$

$$\equiv \underset{c^L \in C}{\operatorname{argmax}} \langle \mu(c^L) | I^L \rangle,$$

where $\Sigma \equiv \Lambda(g)\Lambda(g)^T$ is the covariance of the rendered image I and $$\langle x|M|y \rangle \equiv x^T M y.$$

Note the significant change with respect to the shallow RM: the covariance $\Sigma$ is no longer diagonal due to the iterative affine transformations during rendering (Eq. 12), and thus, we decorrelate the input image (via the product $\Sigma^{-1} I^0$ in the first line) in order to classify accurately.

Note also that we have omitted the bias terms for clarity and that $M^\dagger$ is the pseudoinverse of matrix M. In the fourth line, we used the distributivity of max over products and in the last lines defined the intermediate quantities $$I^{\ell+1} \equiv \max_{g^{\ell+1} \in G^{\ell+1}} \left\langle (\Lambda^{\ell+1}(g^{\ell+1}))^\dagger \middle| I^\ell \right\rangle \quad (14)$$

$$W^{\ell+1}(g^{\ell+1}) \equiv (\Lambda^{\ell+1}(g^{\ell+1}))^\dagger$$

$$I^{\ell+1} \equiv \max_{g^{\ell+1} \in G^{\ell+1}} \left\langle W^{\ell+1}(g^{\ell+1})^\dagger \middle| I^{\ell+1} \right\rangle$$

$$\equiv MaxPool(Conv(I^\ell))$$

(Recall that, for a>0, max{ab,ac}=a max{b,c}.) Here $I^l \equiv I^l(x^l, c^l)$ is the feature map output of layer l indexed by channels $c^l$, and $\eta(c^l, g^l) \propto \mu(c^l, g^l)$ are the natural parameters (i.e., intermediate rendered templates) for level l.

If we care only about inferring the overall class of the image) $c^L(I^0)$, then the fine-to-coarse pass suffices, since all information relevant to determining the overall class has been integrated. That is, for high-level classification, we need only iterate Eqs. 13 and 14. Note that Eq. 13 simplifies to Eq. 9 when we assume sparse patch rendering as in Section 2.2.

Coining back to DCNs, we have seen that the l-th iteration of Eq. 13 or Eq. 9 corresponds to feedforward propagation in the l-th layer of a DCN. Thus, a DCN's operation has a probabilistic interpretation as fine-to-coarse inference of the most probable global configuration in the DRM.

2.4.1 What about the SoftMax Regression Layer?

It is important to note that we have not fully reconstituted the architecture of a modern DCN yet. In particular, the SoftMax regression layer, typically attached to the end of network, is missing. This means that the high-level class $c^L$ in the DRM (Eq. 13) is not necessarily the same as the training data class labels $\tilde{c}$ given in the dataset. In fact, the two labels $\tilde{c}$ and $c^L$ are in general distinct.

But then how are we to interpret $c^L$? The answer is that the most probable global configuration $(c^L, g^*)$ inferred by a DCN can be interpreted as a good representation of the input image, i.e., one that disentangles the many nuisance factors into (nearly) independent components $c^L, g^*$. (In this sense, the DRM can be seen as a deep (nonlinear) generalization of Independent Components Analysis.) Under this interpretation, it becomes clear that the high-level class $c^L$ in the disentangled representation need not be the same as the training data class label $\tilde{c}$.

The disentangled representation for $c^L$ lies in the penultimate layer activations:

$$\hat{a}^L(I_n) = \ln p(c^L, g^* | I_n).$$

Given this representation, we can infer the class label $\tilde{c}$ by using a simple linear classifier such as the SoftMax regression. (Note that this implicitly assumes that a good disentangled representation of an image will be useful for the classification task at hand.) Explicitly, the Softmax regression layer computes $$p(\tilde{c}|\hat{a}^L; \theta_{Softmax}) = \phi(W^{L+1} \hat{a}^L + b^{L+1}),$$

and then chooses the most likely class. Here $\phi(\cdot)$ is the softmax function and $\theta_{Softmax} \equiv \{W^{L+1}, b^{L+1}\}$ are the parameters of the SoftMax regression layer.

2.4.2 What about the ReLUs?

In the last section, we have absorbed the role of switching vector a into the overall nuisance g, for brevity and clarity. However, we must check that the ReLU derivation from earlier, culminating in eq. (9), still holds when we go deep. There are two ways to see this, one short and one long. The short way is to look at each max-term in eq. (13) and expand it out to get:

$$\max_{g^L \in G^L} W^L(g^L) | I \rangle = \max_{g^L} \max_{a^L \in \{0,1\}} W^L(g^L) | I \rangle,$$

where the last max-term is exactly of the same form as we encountered in our derivation of eq. (9).

The longer way, despite being lengthier, is illuminating and allows us to better understand the DRM as a generative model. Along the way we will be able to better connect to other interesting work as well. Consider the Sparse DRM model which incorporates the switching vectors a at each level of abstraction:

$$I = \Lambda_a z + \alpha_a + \text{noise}.$$

where we have suppressed the c,g-dependence of the parameters for clarity. The switching configuration a here refers the network-wide ON/OFF state of each generative unit. Next, we expand out the matrix $\Lambda_a$ and examine each individual pixel i of the generated image I (ignoring the bias and the noise for simplicity):

$$I_i = [\Lambda_a z^0]_i$$

$$= \sum_k \Lambda_{a,ik} z_k^0$$

$$= \sum_k \sum_{\gamma=1}^{N_{paths}} \Lambda_{a,i\gamma_1} \Lambda_{a,\gamma_1\gamma_2} \ldots \Lambda_{a,\gamma_{L-1}k} z_k^0$$

$$= \sum_k \sum_{\gamma=1}^{N_{paths}} a_{i\gamma_1} \Lambda_{i\gamma_1} a_{\gamma_1\gamma_2} \Lambda_{\gamma_1\gamma_2} \ldots a_{\gamma_{L-1}k} \Lambda_{\gamma_{L-1}k} z_k^0$$

$$= \sum_k \sum_{\gamma=1}^{N_{paths}} a_\gamma \Lambda_{i\gamma_1} \Lambda_{\gamma_1\gamma_2} \ldots \Lambda_{\gamma_{L-1}k} z_k^0$$

$$= \sum_k \sum_{\gamma=1}^{N_{paths}} a_\gamma \left( \prod_{\ell=1}^{L-1} \Lambda_{ik}^{(\ell)} \right) z_k^0.$$

Here $N_{paths} \equiv \Pi_l D_l$ is the total number of paths from a top-level unit (some $z_k$) to an image pixel $I_i$. The switching variable $a_\gamma \in \{0, 1\}$ encodes whether path $\gamma$ is active or not. Note that if any unit on the path is inactive, the whole path is rendered inactive! Thus, for each generated image $I_n$ only a few paths are active, i.e., rendering in the sparse DRM is indeed very sparse.

During inference, we infer the switching vector a, or equivalently, the very few active paths $\gamma$ for which $a_\gamma = 1$. Given that each a at each level is chosen at random and independent of other a's, in the bottom-up inference we can decide whether $\hat{a}^l$ is active or not based solely on its receptive field input. Iterating this at each layer yields ReLUs at each layer, and culminates in a small set of active paths inferred for each input image.

2.5 DCNs are Probabilistic Message Passing Networks 2.5.1 Deep Rendering Model and Message Passing Encouraged by the correspondence identified in Section 2.4, we step back for a moment to reinterpret all of the major elements of DCNs in a probabilistic light. Our derivation of the DRM inference algorithm above is mathematically equivalent to performing max-sum message passing on the factor graph representation of the DRM, which is shown in FIG. 2B. The factor graph encodes the same information as the generative model but organizes it in a manner that simplifies the definition and execution of inference algorithms (21). Such inference algorithms are called message passing algorithms, because they work by passing real-valued functions called messages along the edges between nodes. In the DRM/DCN, the messages sent from finer to coarser levels are the feature maps $I^l(x^l, c^l)$. However, unlike the input image $I^0$, the channels $c^l$ in these feature maps do not refer to colors (e.g, red, green, blue) but instead to more abstract features (e.g., edge orientations or the open/closed state of an eyelid).

2.5.2 A Unification of Neural Networks and Probabilistic Inference

The factor graph formulation provides a powerful interpretation that the convolution, Max-Pooling and ReLU operations in a DCN correspond to max-sum inference in a DRM. Thus, we see that architectures and layer types commonly used in today's DCNs are not ad hoc; rather they can be derived from precise probabilistic assumptions that entirely determine their structure. Thus the DRM unifies two perspectives—neural network and probabilistic inference. A summary of the relationship between the two perspectives is given in Table 1 (i.e., FIG. 4).

2.5.3 the Probabilistic Role of Max-Pooling

Consider the role of max-pooling from the message passing perspective. We see that it can be interpreted as the "max" in max-sum, thus executing a max-marginalization over nuisance variables g. Typically, this operation would be intractable, since there are exponentially many configurations g∈G. But here the DRM's model of abstraction—a deep product of affine transformations—comes to the rescue. It enables us to convert an otherwise intractable max-marginalization over g into a tractable sequence of iterated max-marginalizations over abstraction levels $g^l$ (Eqs. 13, 14). (This can be seen, equivalently, as the execution of the max-product algorithm (22).) Thus, the max-pooling operation implements probabilistic marginalization, and is essential to the DCN's ability to factor out nuisance variation. Indeed, since the ReLU can also be cast as a max-pooling over ON/OFF switching variables, we conclude that the most important operation in DCNs is max-pooling. This is in conflict with some recent claims to the contrary (27). We will return to factor graphs later in Section 6 when we generalize the construction defined here to other generative models, enabling the creation of novel neural networks and other message passing networks.

2.6 Learning the Rendering Models

Since the RM and DRM are graphical models with latent variables, we can learn their parameters from training data using the expectation-maximization (EM) algorithm (28). We first develop the EM algorithm for the shallow RM from Section 2.1 and then extend it to the DRM from Section 2.3.

2.6.1 EM Algorithm for the Shallow Rendering Model

Given a dataset of labeled training images $\{(I_n, c_n)\}_{n=1}^N$, each iteration of the EM algorithm comprises an E-step that infers the latent variables given the observed variables and the "old" parameters $\hat{\theta}_{gen}^{old}$ from the last M-step, followed by an M-step that updates the parameter estimates according to $$E\text{-Step: } \gamma_{ncga} = p(c, g, a | I_n; \theta_{gen}^{old}), \quad (15)$$

$$M\text{-Step: } \hat{\theta} = \text{argmax}_\theta \Sigma_n \Sigma_{cga} \gamma_{ncga} L(\theta) \quad (16)$$

Here $\gamma_{ncga}$ are the posterior probabilities over the latent mixture components (also called the responsibilities), the sum $\Sigma_{cga}$ is over all possible global configurations (c,g,a) ∈C×G×{0,1}, and L(θ) is the complete-data log-likelihood for the model. For the RM, the parameters are defined as $$\theta = \{\pi_c, \pi_g, \pi_a, \mu_{cga}, \Sigma\}$$

and include the prior probabilities of the different classes $\pi_c$, the probabilities of nuisance variables $\pi_g$ and switching variable $\pi_a$ along with the rendered templates $\mu_{cga}$ and the pixel noise covariance $\Sigma$.

In alternative embodiments, the M-Step may be performed according to the expression $$\hat{\theta}_{cg} = \sum_n \sum_{cg} \gamma_{ncg} T(I), \quad (16^*)$$

where $\gamma_{ncg}$ are the posterior probabilities over the latent mixture components (the responsibilities), the sum $\Sigma_{cg}$ is over all possible global configurations (c,g)∈C×G, and the vector of sufficient statistics $T(I) \equiv (1, I, \|I\|^2)^T$. For the RM, the parameters may be defined as $$\theta = \{\pi_c, \pi_g, \mu_{cg}, \sigma^2\},$$

including the prior probabilities of the different classes $\pi_c$, the probabilities of nuisance variables $\pi_g$ along with the rendered templates $\mu_{cg}$ and the pixel noise variance $\sigma^2$. If, instead of a Gaussian RM, we use an RM with a different component distribution (but still from the exponential family), then the sufficient statistics and the rendered template parameters will be different.

The RM is similar to the Gaussian Sparse Coding (GSC) model, and the EM algorithm for the GSC can be used to train the RM. In the following EM algorithm for DRM, $a_n$ and $z_n$ are scalars, so the Hadamard products in our EM algorithm can be reduced to scalar products. (The layer dependence in the following EM algorithm has been suppressed, for the sake of clarity.) Unlike the GSC, the DRM also contains the nuisance variables g and the target variable c. Since g and c have similar roles, we use g to denote both of these two variables.

*E*-Step:

$$\gamma_{nga} = p(g, a \mid I_n; \theta) \propto \pi_{ga} N(I_n - \mu_{ga}, \Lambda_{ga} \Lambda_{ga}^T + \Sigma) \quad (17)$$

$$E[a_n \odot \tilde{z}_n \mid g; \theta] = \sum_a p(a \mid g, I_n; \theta) \hat{z}_n(g, a) \quad (18)$$

$$E[(a_n \odot \tilde{z}_n)(a_n \odot \tilde{z}_n)^T \mid g; \theta] = \quad (19)$$

$$\sum_a p(a \mid g, I_n; \theta) \left( \hat{\Sigma}_{\tilde{z}_n \mid g, a} + \hat{z}_n(g, a) \hat{z}_n(g, a)^T \right)$$

*M*-Step:

$$\tilde{\Lambda}_g = \left( \sum_{n=1}^N p(g \mid I_n; \theta) I_n E[a_n \odot \tilde{z}_n \mid g, \theta]^T \right) \cdot \quad (20)$$

$$\left( \sum_{n=1}^N p(g \mid I_n; \theta) E[(a_n \odot \tilde{z}_n)(a_n \odot \tilde{z}_n)^T \mid g, \theta] \right)^{-1}$$

$$\Sigma = \frac{1}{N} \sum_{n=1}^N p(g \mid I_n; \theta) \begin{pmatrix} I_n I_n^T - \\ 2(\tilde{\Lambda}_g E[a_n \odot \tilde{z}_n \mid \theta]) I_n^T + \\ \tilde{\Lambda}_g E[(a_n \odot \tilde{z}_n)(a_n \odot \tilde{z}_n)^T \mid \theta] \tilde{\Lambda}_g^T \end{pmatrix} \quad (21)$$

$$\pi_{ga} = \frac{1}{N} \sum_{n=1}^N p(g \mid I_n; \theta) \quad (22)$$

where $$\tilde{z}_n \mid I_n, g, a; \theta \sim N\left(\hat{z}_n(g, a), \hat{\Sigma}_{\tilde{z}_n \mid g, a}\right) \quad (23)$$

$$\hat{z}_n(g, a) = E[\tilde{z}_n \mid g, a, I_n; \theta] = \hat{\Sigma}_{\tilde{z}_n \mid g, a} \tilde{\Lambda}_{g,a}^T \Sigma^{-1} I_n \quad (24)$$

$$\hat{\Sigma}_{\tilde{z}_n \mid g, a} = \mathrm{Cov}[\tilde{z}_n \mid g, a, I_n; \theta] = \left( \tilde{\Lambda}_{g,a}^T \Sigma^{-1} \tilde{\Lambda}_{g,a} + 1_D \right)^{-1} \quad (25)$$

2.6.2 Hard EM Algorithm

When the clusters in the RM are well-separated (or equivalently, when the rendering introduces little noise), each input image can be assigned to its nearest cluster in a "hard" E-step, wherein we care only about the most likely configuration of c and g given the input $I_n$. (The most likely configuration is the configuration with the largest posterior probability.) In this case, the responsibility $\gamma_{ncga} = p(c,g,a \mid I_n, \theta) = 1$ if c, g, and a in image $I_n$ are consistent with the most likely configuration; otherwise it equals 0. Thus, we can compute the responsibilities using max-sum message passing according to Eqs. 13 and 15. Like before, we can use g to denote both of c and g, and the Hard EM algorithm for the DRM may be defined as follows.

*E*-Step:

$$g_n^*, a_n^* = \mathrm{argmax}_{g,a} \gamma_{nga} \quad (26)$$

$$E[(\tilde{a}_n \odot \tilde{z}_n) \mid g_n^*, I_n; \theta] = \tilde{\Lambda}_{g_n^*}^\dagger [a_n^*] I_n \quad (27)$$

$$\dagger = \text{pseudoinverse} \quad (28)$$

*M*-Step:

$$\tilde{N}_{ga} = \sum_{n=1}^N \llbracket (g_n^*, a_n^*) = (g, a) \rrbracket \quad (29)$$

$$\pi_{ga} = \frac{1}{N} \hat{N}_{ga} \quad (30)$$

$$\tilde{\Lambda}_g = \mathrm{OLS}(I_n \sim E[\tilde{a}_n \odot \tilde{z}_n \mid g_n, I_n; \theta], n \in (g, a)) \quad (31)$$

$$= (1^{st} \text{ Factor})(\text{Second Factor}), \quad (32)$$

where $$(1st \text{ Factor}) = \left( \sum_{g_n^*, a_n^* = g, a} I_n E[\tilde{a}_n \odot \tilde{z}_n \mid g, I_n; \theta]^T \right) \quad (33A)$$

$$(2nd \text{ Factor}) = \quad (33B)$$

$$\left( \sum_{g_n^*, a_n^* = g, a} E[\tilde{a}_n \odot \tilde{z}_n \mid g, I_n; \theta] E[\tilde{a}_n \odot \tilde{z}_n \mid g_n, I_n; \theta]^T \right)^{-1}$$

where we have used the Iverson bracket to denote a Boolean expression, i.e., $\llbracket b \rrbracket = 1$ if b is true and $\llbracket b \rrbracket = 0$ if b is false. The $\tilde{\Lambda}_{g_n^*}^\dagger [a_n^*]$ in the E-step selects the columns in $\tilde{\Lambda}_{g_n^*}^\dagger$ according to the non-zero elements of $a_n^*$.

2.6.3 EM Algorithm for the Deep Rendering Model

For high-nuisance tasks, the EM algorithm for the shallow RM is computationally intractable, since it requires recomputing the responsibilities and parameters for all possible configurations $$\tau = (c^L, g^L, \ldots, g^1).$$

There are exponentially many such configurations ($|C^L||\Pi_l|G^l$), one for each possible rendering tree rooted at $c^L$. However, the crux of the DRM is the factorized form of the rendered templates (Eq. 12), which results in a dramatic reduction in the number of parameters. This enables us to efficiently infer the most probable configuration exactly via Eq. 13 and thus avoid the need to resort to slower, approximate sampling techniques (e.g. Gibbs sampling), which are commonly used for approximate inference in deep HBMs (20, 21). (Note that this inferred configuration is exact for the spike-n-slab approximation to the truly sparse rendering model where only one renderer per neighborhood is active, as described in Section 2.2. Technically, this approximation is not a tree, but instead a so-called polytree. Nevertheless, max-sum is exact for trees and polytrees.) We will exploit this realization below in the DRM E-step.

We can extend the EM algorithm for the shallow RM from the previous section into one for the DRM. The DRM E-step performs inference, finding the most likely rendering tree configuration $\tau_n^* \equiv (c_n^L, g_n^L, \ldots, g_n^1)^*$ given the current training input $I_n^0$. The DRM M-step updates the parameters in each layer—the weights and biases—via a responsibility-weighted regression of output activations off of input activations. This can be interpreted as each layer learning how to summarize its input feature map into a coarser-grained output feature map, the essence of abstraction.

Mathematically, a single E step for the DRM repeats Eq. 26, Eq. 27, and a single M step reiterates Equations 29-32 at each level l in the DRM. Note that the input to the layer l is the expectation $\mathbb{E}[a_n^{l-1} \odot z_n^{l-1} | g^{l-1}, \theta]$ at the layer l-1. This new EM algorithm is a derivative free alternative to the back propagation algorithm for training DCNs that is fast, easy to implement, and intuitive.

In some embodiments, the E-Step and the M-Step may be performed as follows. It will be convenient to define an augmented form for certain parameters so that affine transformations can be recast as linear ones. In particular, $y=mx+b=\tilde{m}^T\tilde{x}$, where $\tilde{m} \equiv [m|b]$ and $\tilde{x} \equiv [x|1]$ are the augmented forms for the parameters and input. A single EM iteration is then defined as:

E-Step:

$$\gamma_{n\tau} = [\![\tau = \tau_n^*]\!] \text{ where } \tau_n^* \equiv \arg\max_\tau \{\ln p(\tau | I_n)\} \quad \text{(drm19)}$$

$$E[\mu^\ell(c^\ell)] = \Lambda^\ell(g^\ell)^\dagger(I_n^{\ell-1} - a^\ell(g^\ell)) \quad \text{(drm20)}$$
$$\equiv W^\ell(g^\ell)I_n^{\ell-1} + b^\ell(g^\ell)$$

$$E[\mu^\ell(c^\ell)\mu^\ell(c^\ell)^T] = 1 - \Lambda^\ell(g^\ell)^\dagger \Lambda^\ell(g^\ell) + \quad \text{(drm21)}$$
$$\Lambda^\ell(g^\ell)^\dagger(I_n^{\ell-1} - a^\ell(g^\ell))(I_n^{\ell-1} - a^\ell(g^\ell))^T (\Lambda^\ell(g^\ell)^\dagger)^T$$

M-Step:

$$\pi(\tau) = \frac{1}{N}\sum_n \gamma_{n\tau} \quad \text{(drm22)}$$

$$\tilde{\Lambda}^\ell(g^\ell) \equiv [\Lambda^\ell(g^\ell) | a^\ell(g^\ell)] \quad \text{(drm23)}$$
$$= \left(\sum_n \gamma_{n\tau} I_n^{\ell-1} E[\tilde{\mu}^\ell(c^\ell)]^T\right)$$
$$\left(\sum_n \gamma_{n\tau} E[\tilde{\mu}^\ell(c^\ell)\tilde{\mu}^\ell(c^\ell)^T]\right)^{-1}$$

$$\Psi^\ell = \frac{1}{N}\text{diag}\left\{\sum_n \gamma_{n\tau}(I_n^{\ell-1} - \tilde{\Lambda}^\ell(g^\ell)E[\tilde{\mu}^\ell(c^\ell)])(I_n^{\ell-1})^T\right\} \quad \text{(drm24)}$$

where $\Lambda^\ell(g^\ell)^\dagger \equiv \Lambda^\ell(g^\ell)^T(\Psi^\ell + \Lambda^\ell(g^\ell)(\Lambda^\ell(g^\ell))^T)^{-1}$ and $E[\tilde{\mu}^\ell(c^\ell)] = [E[\tilde{\mu}^\ell(c^\ell)] | 1]$.

Note that the nuisance variables $g^l$ comprise both the translational and the switching variables that were derived earlier for DCNs.

Note that this new EM algorithm is a derivative-free alternative to the back propagation algorithm for training DCNs that is fast, easy to implement, and intuitive. The E-step performs inference, finding the most likely rendering tree configuration $\tau_n^* \equiv (c_n^L, g_n^L, g_n^{L-1}, \ldots, g_n^1)^*$ given the current input $I_n^0$. The M-step updates the parameters in each layer—the weights and biases—via a responsibility-weighted regression of output activations off of input activations. This can be interpreted as each layer learning how to summarize its input feature maps into coarser-grained output feature maps, the essence of abstraction.

A powerful learning rule discovered recently and independently by Google (25) can be seen as an approximation to the above EM algorithm, whereby Eq. (drm19) is approximated by normalizing the input activations with respect to each training batch and introducing scaling and bias parameters according to $$\mathbb{E}[\mu^\ell(c^\ell)] = \Lambda^\ell(g^\ell)^\dagger(I_n^{\ell-1} - a^\ell(g^\ell)) \quad \text{(drm 25)}$$
$$\approx \Gamma \cdot \tilde{I}_n^{\ell-1} + \beta$$
$$\equiv \Gamma \cdot \left(\frac{I_n^{\ell-1} - \bar{I}_B}{\sigma_B}\right) + \beta.$$

Here $\tilde{I}_n^{l-1}$ are the batch-normalized activations, and $\bar{I}_B$ and $\sigma_B$ are the batch mean and standard deviation vector of the input activations, respectively. Note that the division is element-wise, since each activation is normalized independently to avoid a costly full covariance calculation. The diagonal matrix $\Gamma$ and bias vector $\beta$ are parameters that are introduced to compensate for any distortions due to the batch-normalization. In light of our EM algorithm derivation for the DRM, it is clear that this scheme is a crude approximation to the true normalization step in Eq. (drm19), whose decorrelation scheme uses the nuisance-dependent mean $\alpha(g^l)$ and full covariance $\Lambda^l(g^l)^\dagger$. Nevertheless, the excellent performance of the Google algorithm bodes well for the performance of the exact EM algorithm for the DRM developed here.

2.6.4 What about DropOut Training?

We did not mention the most common regularization scheme used with DCNs—DropOut (30). DropOut training involves units in the DCN dropping their outputs at random. This can be seen as a kind of noise corruption, and encourages the learning of features that are robust to missing data and prevents feature co-adaptation as well. DropOut is not specific to DCNs; it can be used with other architectures as well. It should be noted that DropOut can be derived from the EM algorithm.

2.7 from Generative to Discriminative Classifiers

We have constructed a correspondence between the DRM and DCNs, but the mapping defined so far is not exact. In particular, note the constraints on the weights and biases in Eq. 8. These are reflections of the distributional assumptions underlying the Gaussian DRM. DCNs do not have such constraints—their weights and biases are free parameters. As a result, when faced with training data that violates the DRM's underlying assumptions (model misspecification), the DCN will have more freedom to compensate. In order to complete our mapping and create an exact correspondence between the DRM and DCNs, we relax these parameter constraints, allowing the weights and biases to be free and independent parameters. However, this seems an ad hoc approach. Can we instead theoretically motivate such a relaxation?

It turns out that the distinction between the DRM and DCN classifiers is fundamental: the former is known as a generative classifier while the latter is known as a discriminative classifier (31, 32). The distinction between generative and discriminative models has to do with the bias-variance tradeoff. On the one hand, generative models have strong distributional assumptions, and thus introduce significant model bias in order to lower model variance (i.e., less risk of overfitting). On the other hand, discriminative models relax some of the distributional assumptions in order to lower the model bias and thus "let the data speak for itself", but they do so at the cost of higher variance (i.e., more risk of overfitting) (31, 32). Practically speaking, if a generative model is misspecified and if enough labeled data is available, then a discriminative model will achieve better performance on a specific task (32). However, if the generative model really is the true data-generating distribution (or there is not much labeled data for the task), then the generative model will be the better choice.

Having motivated the distinction between the two types of models, in this section we will define a method for transforming one into the other that we call a discriminative relaxation. We call the resulting discriminative classifier a discriminative counterpart of the generative classifier. (The discriminative relaxation procedure is a many-to-one mapping: several generative models might have the same discriminative model as their counterpart.) We will then show that applying this procedure to the generative DRM classifier (with constrained weights) yields the discriminative DCN classifier (with free weights). Although we will focus again on the Gaussian DRM, the treatment can be generalized to other exponential family distributions with a few modifications.

2.7.1 Transforming a Generative Classifier into a Discriminative One

Before we formally define the procedure, some preliminary definitions and remarks will be helpful. A generative classifier models the joint distribution p(c,I) of the input features and the class labels. It can then classify inputs by using Bayes Rule to calculate $$p(c|I) \propto p(c,I) = p(I|c)p(c)$$

and picking the most likely label c. Training such a classifier is known as generative learning, since one can generate synthetic features I by sampling the joint distribution p(c,I). Therefore, a generative classifier learns an indirect map from input features I to labels c by modeling the joint distribution p(c,I) of the labels and the features.

In contrast, a discriminative classifier parametrically models $$p(c|I) = p(c|I;\theta_d)$$

and then trains on a dataset of input-output pairs $\{(I_n, c_n)\}_{n=1}^{N}$ in order to estimate the parameter $\theta_d$. This is known as discriminative learning, since we directly discriminate between different labels c given an input feature I. Therefore, a discriminative classifier learns a direct map from input features I to labels c by directly modeling the conditional distribution p(c|I) of the labels given the features.

Given these definitions, we can now define the discriminative relaxation procedure for converting a generative classifier into a discriminative one. Starting with the standard learning objective for a generative classifier, we will employ a series of transformations and relaxations to obtain the learning objective for a discriminative classifier. Mathematically, we have $$\max_\theta L_{gen}(\theta) \equiv \max_\theta \sum_n \ln p(c_n, I_n | \theta) \quad (34)$$

$$\stackrel{(a)}{=} \max_\theta \sum_n \ln p(c_n | I_n, \theta) + \ln p(I_n | \theta)$$

$$\stackrel{(b)}{=} \max_{\theta, \tilde\theta : \theta = \tilde\theta} \sum_n \ln p(c_n | I_n, \theta) + \ln p(I_n | \tilde\theta)$$

$$\stackrel{(c)}{\le} \max_\theta \underbrace{\sum_n \ln p(c_n | I_n, \theta)}_{\equiv L_{cond}(\theta)}$$

$$\stackrel{(d)}{=} \max_{\eta : \eta = \rho(\theta)} \sum_n \ln p(c_n | I_n, \eta)$$

$$\stackrel{(e)}{\le} \max_\eta \underbrace{\sum_n \ln p(c_n | I_n, \eta)}_{\equiv L_{dis}(\eta)},$$

where the L's are the generative, conditional and discriminative log-likelihoods, respectively. In line (a), we used the Chain Rule of Probability. In line (b), we introduced an extra set of parameters $\tilde\theta$ while also introducing a constraint that enforces equality with the old set of generative parameters $\theta$. In line (c), we relax the equality constraint (first introduced by Bishop, LaSerre and Minka in (31)), allowing the classifier parameters $\theta$ to differ from the image generation parameters $\tilde\theta$. In line (d), we pass to the natural parametrization of the exponential family distribution $\Pi$|c, where the natural parameters $\eta = \rho(\theta)$ are a fixed function of the conventional parameters $\theta$. This constraint on the natural parameters ensures that optimization of $L_{cond}(\eta)$ yields the same answer as optimization of $L_{cond}(\theta)$. And finally, in line (e) we relax the natural parameter constraint to get the learning objective for a discriminative classifier, where the parameters $\eta$ are now free to be optimized.

In summary, starting with a generative classifier with learning objective $L_{gen}(\theta)$, we complete steps (a) through (e) to arrive at a discriminative classifier with learning objective $L_{dis}(\eta)$. We refer to this process as a discriminative relaxation of a generative classifier and the resulting classifier is a discriminative counterpart to the generative classifier.

FIGS. 5A and 5B illustrate the discriminative relaxation procedure as applied to the RM (or DRM). If we consider a Gaussian (D)RM, then $\theta$ simply comprises the mixing probabilities $\pi_{cg}$ and the mixture parameters $\lambda_{cg}$, and so that we have $\theta = \{\pi_{cg}, \mu_{cg}, \sigma^2\}$. The corresponding relaxed discriminative parameters are the weights and biases: $\eta_{dis} \equiv \{w_{cg}, b_{cg}\}$.

Intuitively, we can interpret the discriminative relaxation as a brain-world transformation applied to a generative model. According to this interpretation, instead of the world generating images and class labels (FIG. 5A), we instead imagine the world generating images $I_n$ via the rendering parameters $\tilde\theta = \theta_{world}$ while the brain generates labels $c_n, g_n$ via the classifier parameters $\eta_{dis} = \eta_{brain}$ (FIG. 5B). Note that the graphical model depicted in FIG. 5B is equivalent to that in FIG. 5A, except for the relaxation of the parameter constraints (x's) that represent the discriminative relaxation.

2.7.2 from the Deep Rendering Model to Deep Convolutional Networks

We can now apply the above to show that the DCN is a discriminative relaxation of the DRM. First, we apply the brain-world transformation (Eq. 34) to the DRM. The resulting classifier is precisely a deep MaxOut neural network (10) as discussed earlier. Second, we impose translational invariance at the finer scales of abstraction f and introduce switching variables a to model inactive renderers (and/or missing data). This yields convolutional layers with ReLU activation functions, as in Section 2.1. Third, the learning algorithm for the generative DRM classifier—the EM algorithm in Eqs. (drm19)-(drm24)—is modified according to Eq. 34 to account for the discriminative relaxation. In particular, note that the new discriminative E-step is only fine-to-coarse and corresponds to forward propagation in DCNs. As for the discriminative M-step, there are a variety of choices: any general purpose optimization algorithm may be used (e.g., Newton-Raphson, conjugate gradient, L-BFGS, etc.). Choosing gradient descent this leads to the classical back propagation algorithm for neural network training (33). Typically, modern-day DCNs are trained using a variant of back propagation called Stochastic Gradient Descent (SGD), in which gradients are computed using one mini-batch of data at a time (instead of the entire dataset). In light of our developments here, we can re-interpret SGD as a discriminative counterpart to the generative batch EM algorithm (34, 35).

This completes the mapping from the DRM to DCNs. We have shown that DCN classifiers are a discriminative relaxation of DRM classifiers, with forward propagation in a DCN corresponding to inference of the most probable configuration in a DRM. (As mentioned in Section 2.4.1, this is typically followed by a Softmax Regression layer at the end. This layer classifies the hidden representation—the penultimate layer activations $\hat{a}^L(I_n)$—into the class labels $\tilde{c}_n$ used for training. See Section 2.4.1 for more details.) We have also re-interpreted learning: SGD back propagation training in DCNs is a discriminative relaxation of a batch EM learning algorithm for the DRM. We have provided a principled motivation for passing from the generative DRM to its discriminative counterpart DCN by showing that the discriminative relaxation helps alleviate model misspecification issues by increasing the DRM's flexibility, at the cost of slower learning and requiring more training data.

3 New Insights into Deep Convolutional Networks

In light of the intimate connection between DRMs and DCNs, the DRM provides new insights into how and why DCNs work, answering many open questions. And importantly, DRMs also show us how and why DCNs fail and what we can do to improve them (See Section 5). In this section, we explore some of these insights.

3.1 DCNs Possess Full Probabilistic Semantics

The factor graph formulation of the DRM (FIG. 2B) provides a useful interpretation of DCNs: it shows us that the convolutional and max-pooling layers correspond to standard message passing operations, as applied inside factor nodes in the factor graph of the DRM. In particular, the max-sum algorithm corresponds to a max-pool-conv neural network, whereas the sum product algorithm corresponds to a mean-pool-conv neural network. More generally, we see that architectures and layer types used commonly in successful DCNs are neither arbitrary nor ad hoc; rather they can be derived from precise probabilistic assumptions that almost entirely determine their structure. A summary of the two perspectives—neural network and probabilistic—are given in Table 1 (i.e., FIG. 4).

3.2 Class Appearance Models and Activity Maximization

Our derivation of inference in the DRM enables us to understand just how trained DCNs distill and store knowledge from past experiences in their parameters. Specifically, the DRM generates rendered templates $\mu(c^L,g) \equiv \mu(c^L, g^L, \ldots, g^1)$ via a product of affine transformations, thus implying that class appearance models in DCNs (and DRMs) are stored in a factorized form across multiple levels of abstraction. Thus, we can explain why past attempts to understand how DCNs store memories by examining filters at each layer were a fruitless exercise: it is the product of all the filters/weights over all layers that yield meaningful images of objects. Indeed, this fact is encapsulated mathematically in Eqs. 11, 12. Notably, recent studies in computational neuroscience have also shown a strong similarity between representations in primate visual cortex and a highly trained DCN (36), suggesting that the brain might also employ factorized class appearance models.

We can also shed new light on another approach to understanding DCN memories that proceeds by searching for input images that maximize the activity of a particular class unit (say, cat) (37), a technique we call activity maximization. Results from activity maximization on a high performance DCN trained on 15 million images from (37) is shown in FIGS. 6A-6L. The resulting images are striking and reveal much about how DCNs store memories. We now derive a closed-form expression for the activity-maximizing images as a function of the underlying DRM model's learned parameters. Mathematically, we seek the image I that maximizes the score $S(c|I)$ of a specific object class. Using the DRM, we have $$\max_I S(c^\ell \mid I) = \max_I \max_{g \in G} \left\{ \frac{1}{\sigma^2} \mu(c^\ell, g^\ell) \mid I \right\} \propto \quad (35)$$

$$\max_{g \in G} \max_I \langle \mu(c^\ell, g)I \rangle$$

$$= \max_{g \in G} \max_{I_{\mathcal{P}_1}} \ldots \max_{I_{\mathcal{P}_p}} \left\{ \mu(c^\ell, g) \middle| \sum_{\mathcal{P}_i \in \mathcal{P}} I_{\mathcal{P}_i} \right\}$$

$$= \max_{g \in G} \sum_{\mathcal{P}_i \in \mathcal{P}} \max_{I_{\mathcal{P}_i}} \langle \mu(c^\ell, g)I_{\mathcal{P}_i} \rangle$$

$$= \max_{g \in G} \sum_{\mathcal{P}_i \in \mathcal{P}} \langle \mu(c^\ell, g)I^*_{\mathcal{P}_i}(c^\ell, g) \rangle$$

$$= \sum_{\mathcal{P}_i \in \mathcal{P}} \langle \mu(c^\ell, g)I^*_{\mathcal{P}_i}(c^\ell, g^*_{\mathcal{P}_i}) \rangle,$$

where $$I^*_{\mathcal{P}_i}(c^\ell, g) \equiv \text{argmax}_{I_{\mathcal{P}_i}} \langle \mu(c^\ell, g)I_{\mathcal{P}_i} \rangle$$

and $$g^*_{\mathcal{P}_i} = g^*(c^\ell, \mathcal{P}_i) \equiv \text{argmax}_{g \in G} \langle \mu(c^\ell, g)I^*_{\mathcal{P}_i}(c^\ell, g) \rangle.$$

In the third line of Eq. 35, the image I is decomposed into P patches $I_{P_i}$ of the same size as I, with all pixels outside of the patch $P_i$ set to zero. The $\max_{g \in G}$ operator finds the most probable $g_{P_i}^*$ within each patch. The solution I* of the activity maximization is then the sum of the individual activity-maximizing patches $$I^* \equiv \sum_{\mathcal{P}_i \in \mathcal{P}} I^*_{\mathcal{P}_i}(c^\ell, g^*_{\mathcal{P}_i}) \propto \sum_{\mathcal{P}_i \in \mathcal{P}} \mu(c^\ell, g^*_{\mathcal{P}_i}). \quad (36)$$

Eq. 36 implies that I* contains multiple appearances of the same object but in various poses. Each activity-maximizing patch has its own pose (i.e., $g_{P_i}^*$), in agreement with FIGS. 6A-6L. Such images provide strong confirming evidence that the underlying model is a mixture over nuisance (pose) parameters, as is expected in light of the DRM.

3.3 (Dis)Entanglement: Supervised Learning of Task Targets is Intertwined with Unsupervised Learning of Latent Task Nuisances A key goal of representation learning is to disentangle the factors of variation that contribute to an image's appearance. Given our formulation of the DRM, it is clear that DCNs are discriminative classifiers that capture these factors of variation with latent nuisance variables g. As such, the theory presented here makes a clear prediction that for a DCN, supervised learning of task targets will lead inevitably to unsupervised learning of latent task nuisance variables. From the perspective of manifold learning, this means that the architecture of DCNs is designed to learn and disentangle the intrinsic dimensions of the data manifold.

Figure 3A:
FIGS. 3A-3D, which may be referred to as panels, illustrate the Deep Rendering Model (DRM) with respect to an image of a popular sculpture by Henri Matisse. The sculpture in the first panel (FIG. 3A) is analogous to a fully rendered image at the lowest abstraction level l=0. Moving successively from the first panel to the last panel (FIG. 3D), the sculptures become progressively more abstract. In the last panel (FIG. 3D), we reach the highest abstraction level l=3. The finer-scale details in the first three panels that are lost in the fourth are the nuisance parameters g, whereas the coarser-scale details in the last panel that are preserved are the target c.
Figure 3B:
Figure 3C:
Figure 3D:
Figure 6I:
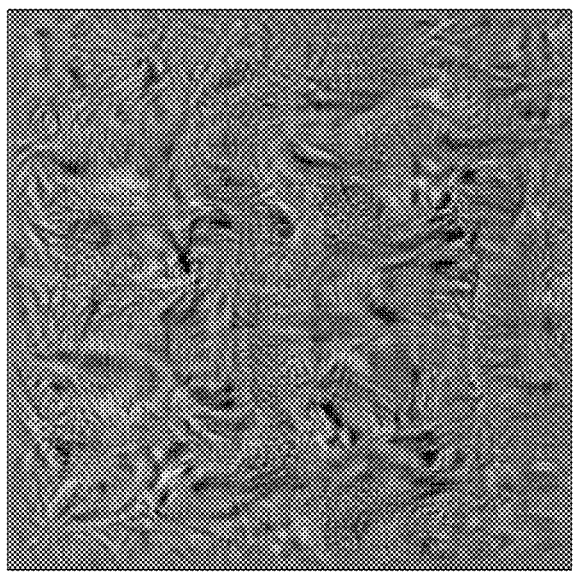
Figure 6H:
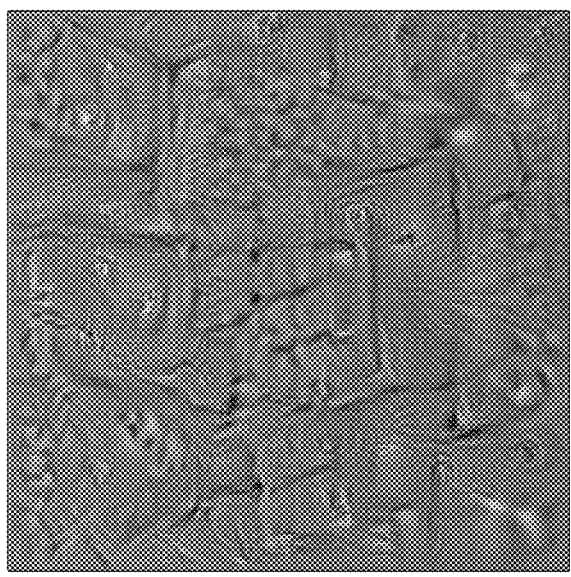
Figure 6G:
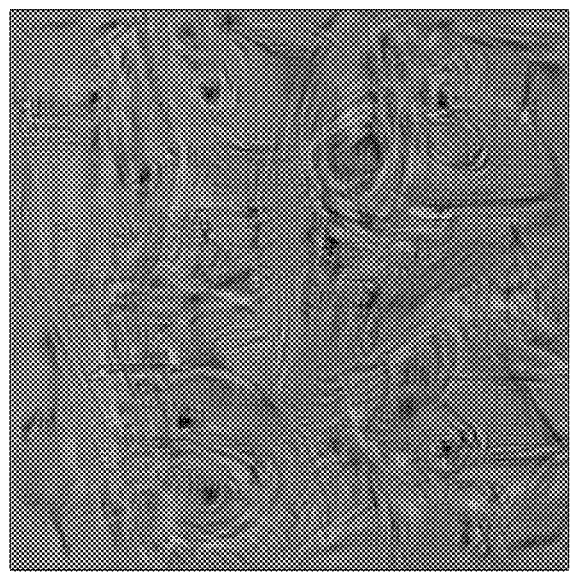
Figure 6L:
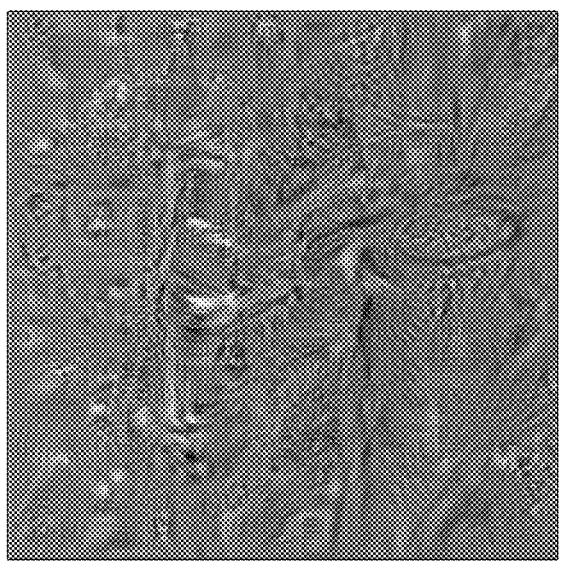
Figure 6K:
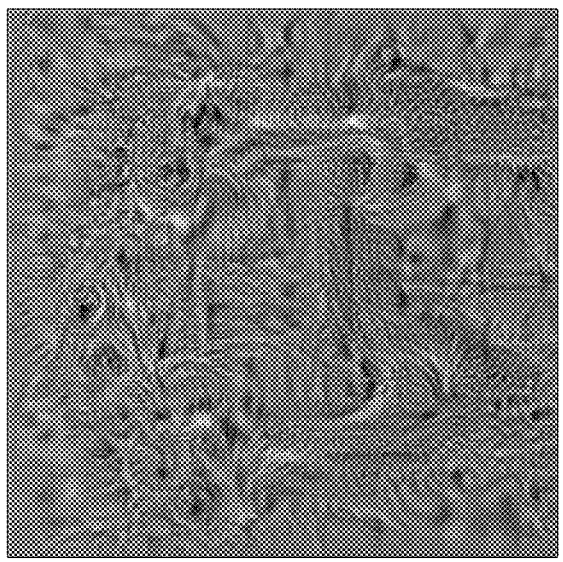
Figure 6J:
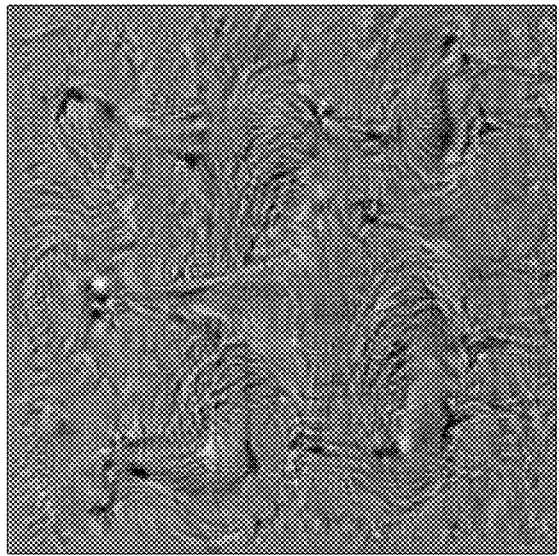
Figure 7A:
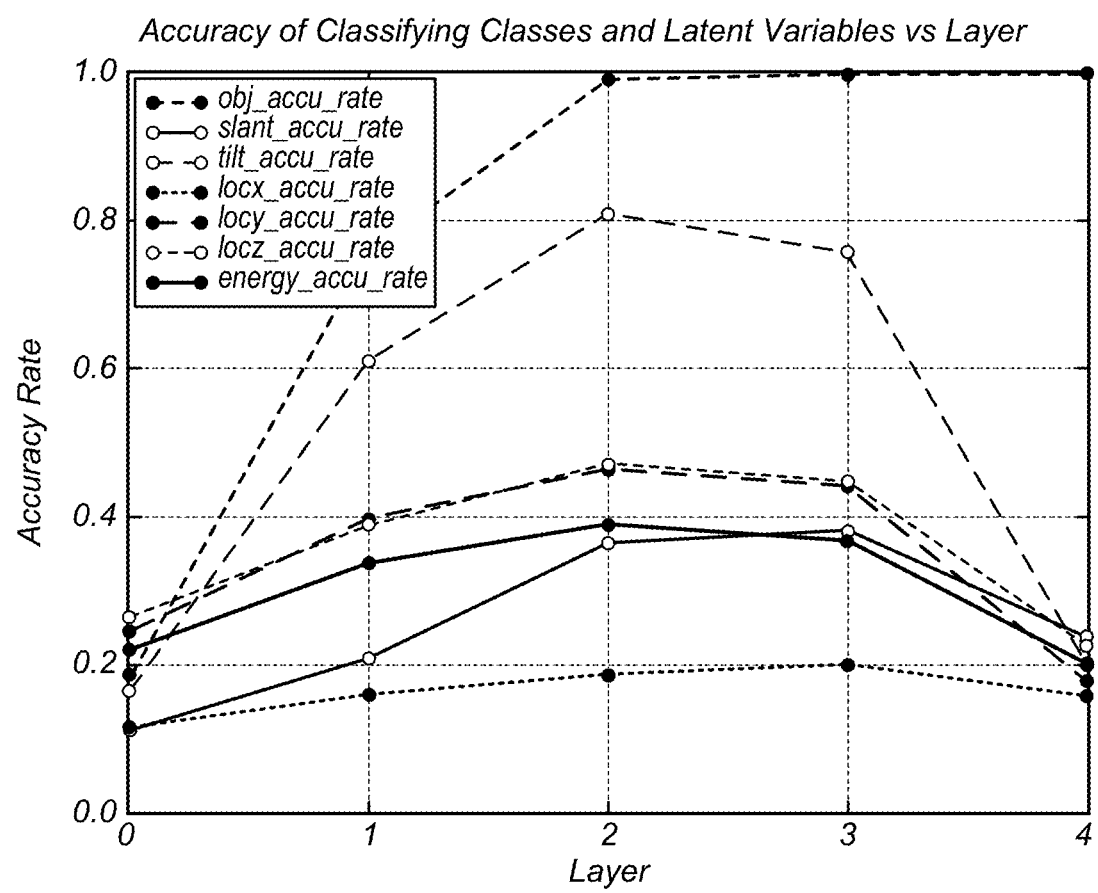
FIGS. 7A and 7B illustrate manifold entanglement and disentanglement in the context of a 5-layer max-out DCN trained to classify synthetically rendered images of planes (FIG. 6A) and naturalistic objects (FIG. 6B) in different poses, locations, depths and lighting conditions. The amount of linearly separable information about the target variable (object identity) increases with layer depth while information about nuisance variables (slant, tilt, left-right location, depth location) follows an inverted U-shaped curve. Layers with increasing information correspond to disentanglement of the manifold—factoring variation into independent parameters—whereas layers with decreasing information correspond to marginalization over the nuisance parameters.
Figure 7B:
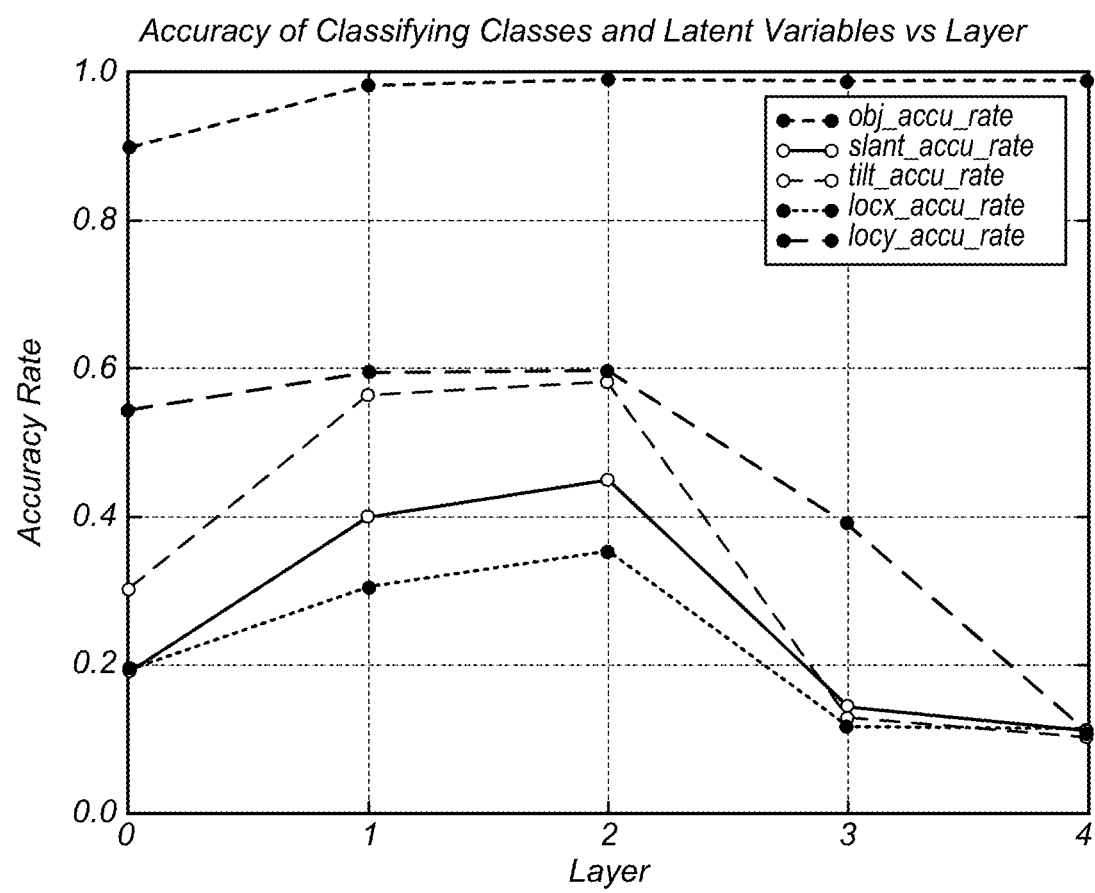

In order to test this prediction, we trained a DCN to classify synthetically rendered images of naturalistic objects, such as cars and planes. Since we explicitly used a renderer, we have the power to systematically control variation in factors such as pose, location, and lighting. After training, we probed the layers of the trained DCN to quantify how much linearly separable information exists about the task target c and latent nuisance variables g. FIGS. 7A and 7B show that the trained DCN possesses significant information about latent factors of variation and, furthermore, the more nuisance variables, the more layers are required to disentangle the factors. This is strong evidence that depth is necessary and that the amount of depth required increases with the complexity of the class models and the nuisance variations.

In light of these results, when we talk about training DCNs, the traditional distinction between supervised and unsupervised learning is ill-defined at worst and misleading at best. This is evident from the initial formulation of the RM, where c is the task target and g is a latent variable capturing all nuisance parameters (FIG. 1A). Put another way, our derivation above shows that DCNs are discriminative classifiers with latent variables that capture nuisance variation. We believe the main reason this was not noticed earlier is probably that latent nuisance variables in a DCN are hidden within the max-pooling units, which serve the dual purpose of learning and marginalizing out the latent nuisance variables.

4 from the Deep Rendering Model to Random Decision Forests

Random Decision Forests (RDF)s (5, 38) are one of the best performing but least understood classifiers in machine learning. While intuitive, their structure does not seem to arise from a proper probabilistic model. Their success in a vast array of ML tasks is perplexing, with no clear explanation or theoretical understanding. In particular, they have been quite successful in real-time image and video segmentation tasks, the most prominent example being their use for pose estimation and body part tracking in the Microsoft Kinect gaining system (39). They also have had great success in medical image segmentation problems (5, 38), wherein distinguishing different organs or cell types is quite difficult and typically requires expert annotators.

In this section we show that, like DCNs, RDFs can also be derived from the DRM model, but with a different set of assumptions regarding the nuisance structure. Instead of translational and switching nuisances, we will show that an additive mutation nuisance process that generates a hierarchy of categories (e.g., evolution of a taxonomy of living organisms) is at the heart of the RDF. As in the DRM to DCN derivation, we will start with a generative classifier and then derive its discriminative relaxation. As such, RDFs possess a similar interpretation as DCNs in that they can be cast as max-sum message passing networks.

A decision tree classifier takes an input image I and asks a series of questions about it. The answer to each question determines which branch in the tree to follow. At the next node, another question is asked. This pattern is repeated until a leaf b of the tree is reached. At the leaf, there is a class posterior probability distribution p(c|I,b) that can be used for classification. Different leaves contain different class posteriors. An RDF is an ensemble of decision tree classifiers t∈T. To classify an input I, it is sent as input to each decision tree t∈T individually, and each decision tree outputs a class posterior p(c|I,b,t). These are then averaged to obtain an overall posterior $$p(c|I) = \Sigma_t p(c|I,b,t) p(t),$$

from which the most likely class c is chosen. Typically we assume p(t)=1/|T|.

4.1 the Evolutionary Deep Rendering Model: A Hierarchy of Categories

We define the evolutionary DRM (E-DRM) as a DRM with an evolutionary tree of categories. Samples from the model are generated by starting from the root ancestor template and randomly mutating the templates. Each child template is an additive mutation of its parent, where the specific mutation does not depend on the parent (see Eq. 38 below). Repeating this pattern at each child node, an entire evolutionary tree of templates is generated. We assume for simplicity that we are working with a Gaussian E-DRM so that at the leaves of the tree a sample is generated by adding Gaussian pixel noise. Of course, as described earlier, this can be extended to handle other noise distributions from the exponential family. Mathematically, we have $$c^L \sim Cat(\pi(c^L)), c^L \in C^L, \quad (37)$$

$$g^{\ell+1} \sim Cat(\pi(g^{\ell+1})), g^{\ell+1} \in \mathcal{G}^{\ell+1},$$

$$\ell = L-1, L-2, \ldots, 0$$

$$\mu(c^L, g) = \Lambda(g)\mu(c^L) \equiv \Lambda^1(g^1) \ldots \Lambda^L(g^L) \cdot \mu(c^L)$$

$$= \mu(c^L) + \alpha(g^L) + \ldots + \alpha(g^1), g = \{g^\ell\}_{\ell=1}^L$$

$$I(c^L, g) = \mu(c^L, g) + \mathcal{N}(0, \sigma^2 1_D) \in \mathbb{R}^D.$$

Here, $\Lambda^l(g^l)$ has a special structure due to the additive mutation process: $\lambda^l(g^l)=[1|\alpha(g^l)]$, where 1 is the identity matrix. As before, $C^l$ and $G^l$ are the sets of all target-relevant and target-irrelevant nuisance variables at level l, respectively. (The target here is the same as with the DRM and DCNs—the overall class label $c^L$.) The rendering path represents template evolution and is defined as the sequence $(c^L, g^L, \ldots, g^l, \ldots, g^1)$ from the root ancestor template down to the individual pixels at l=0·$\mu(c^L)$ is an abstract template for the root ancestor $c^L$, and $\Sigma_l \alpha(g^l)$ represents the sequence of local nuisance transformations, in this case, the accumulation of many additive mutations.

As with the DRM, we can cast the E-DRM into an incremental form by defining an intermediate class $c^l \equiv (c^L, g^L, \ldots, g^{l+1})$ that intuitively represents a partial evolutionary path up to level l. Then, the mutation from level l+1 to l can be written as $$\mu(c^l) = \Lambda^{l+1}(g^{l+1}) \cdot \mu(c^{l+1}) = \mu(c^{l+1}) + \alpha(g^{l+1}), \quad (38)$$

where $\alpha(g^l)$ is the mutation added to the template at level l in the evolutionary tree.

As a generative model, the E-DRM is a mixture of evolutionary paths, where each path starts at the root and ends at a leaf species in the tree. Each leaf species is associated with a rendered template $\mu(c^L, g^L, \ldots, g^1)$.

4.2 Inference with the E-DRM Yields a Decision Tree

Since the E-DRM is an RM with a hierarchical prior on the rendered templates, we can use Eq. 7 to derive the E-DRM inference algorithm as:

$$\hat{c}_{MS}(I) = \text{argmax}_{c^L \in C^L} \max_{g \in G} \langle \eta(c^L, g) | I^0 \rangle \quad (39)$$

$$= \text{argmax}_{c^L \in C^L} \max_{g \in G} \langle \Lambda(g)\mu(c^L) | I^0 \rangle$$

$$= \text{argmax}_{c^L \in C^L} \max_{g^1 \in G^1} \ldots \max_{g^L \in G^L} \langle \mu(c^L) +$$

$$\alpha(g^L) + \ldots + \alpha(g^1) | I^0 \rangle$$

$$= \text{argmax}_{c^L \in C^L} \max_{g^1 \in G^1} \ldots \max_{g^{L-1} \in G^{L-1}}$$

$$\langle \mu(c^L) + \alpha(g^{L*}) + \ldots + \alpha(g^1) | I^0 \rangle$$

$$= \text{argmax}_{c^L \in C^L} \max_{g^1 \in G^1} \ldots \max_{g^{L-1} \in G^{L-1}}$$

$$\langle \mu(c^{L-1}) + \alpha(g^{L-1}) + \ldots + \alpha(g^1) | I^0 \rangle$$

$$\ldots$$

$$= \text{argmax}_{c^L \in C^L} \langle \mu(c^L, g^*) | I^0 \rangle$$

(Note: $\mu(c^L) + \alpha(g^{L*})) \equiv \mu(c^L, g^{L*}) = \mu(c^{L-1}))$

Note that we have explicitly shown the bias terms here, since they represent the additive mutations. In the last lines, we repeatedly use the distributivity of max over sums, resulting in the iteration $$g^{\ell+1}(c^{\ell+1})^* \equiv \text{argmax}_{g^{\ell+1} \in G^{\ell+1}} \langle \mu(c^{\ell+1}, g^{\ell+1}) | I^0 \rangle \quad (40)$$

$$W^{\ell+1} \equiv \mu(c^{\ell+1}, g^{\ell+1})$$

$$g^{\ell+1}(c^{\ell+1})^* = \text{argmax}_{g^{\ell+1} \in G^{\ell+1}} \langle W^{\ell+1}(c^{\ell+1}, g^{\ell+1}) | I^0 \rangle$$

$$\equiv \text{ChooseChild}(\text{Filter}(I^0))$$

Note the key differences from the DRN/DCN inference derivation in Eq. 13: (i) the input to each layer is always the input image $I^0$, (ii) the iterations go from coarse-to-fine (from root ancestor to leaf species) rather than fine-to-coarse, and (iii) the resulting network is not a neural network but rather a deep decision tree of single-layer neural networks. These differences are due to the special additive structure of the mutational nuisances and the evolutionary tree process underlying the generation of category templates.

4.2.1 What about the Leaf Histograms?

The mapping to a single decision tree is not yet complete; the leaf label histograms (5, 38) are missing. Analogous to the missing SoftMax regression layers with DCNs (Sec 2.4.1), the high-level representation class label $c^L$ inferred by the E-DRM in Eq. 39 need not be the training data class label $\tilde{c}$. For clarity, we treat the two as separate in general.

But then how do we understand $c^L$? We can interpret the inferred configuration $\tau^* = (c^{L*}, g^*)$ as a disentangled representation of the input, wherein the different factors in $\tau^*$, including $c^L$, vary independently in the world. In contrast to DCNs, the class labels $\tilde{c}$ in a decision tree are instead inferred from the discrete evolutionary path variable $\tau^*$ through the use of the leaf histograms $p(\tilde{c}|\tau^*)$. Note that decision trees also have label histograms at all internal (non-leaf) nodes, but that they are not needed for inference. However, they do play a critical role in learning, as we will see below.

We are almost finished with our mapping from inference in Gaussian E-DRMs to decision trees. To finish the mapping, we need only apply the discriminative relaxation (Eq. 34) in order to allow the weights and biases that define the decision functions in the internal nodes to be free. Note that this is exactly analogous to steps in Section 2.7 for mapping from the Gaussian DRM to DCNs.

4.3 Bootstrap Aggregation to Prevent Overfitting Yields a Decision Forest

Thus far we have derived the inference algorithm for the E-DRM and shown that its discriminative counterpart is indeed a single decision tree. But how to relate to this result to the entire forest? This is important, since it is well known that individual decision trees are notoriously good at overfitting data. Indeed, the historical motivation for introducing a forest of decision trees has been in order to prevent such overfitting by averaging over many different models, each trained on a randomly drawn subset of the data. This technique is known as bootstrap aggregation or bagging for short, and was first introduced by Breiman in the context of decision trees (38). For completeness, in this section we review bagging, thus completing our mapping from the E-DRM to the RDF.

In order to derive bagging, it will be necessary in the following to make explicit the dependence of learned inference parameters $\theta$ on the training data $D_{CI} \equiv \{(c_n, I_n)\}_{n=1}^N$, i.e., $\theta = \theta(D_{CI})$. This dependence is typically suppressed in most work, but is necessary here as bagging entails training different decision trees t on different subsets $D_t \subset D$ of the full training data. In other words, $\theta_t = \theta_t(D_t)$.

Mathematically, we perform inference as follows: Given all previously seen data $D_{CI}$ and an unseen image I, we classify I by computing the posterior distribution $$p(c|I, \mathcal{D}_{CI}) = \sum_A p(c, A | I, \mathcal{D}_{CI}) \quad (41)$$

$$= \sum_A p(c|I, \mathcal{D}_{CI}, A) p(A)$$

$$\equiv \mathbb{E}_A [p(c|I, \mathcal{D}_{CI}, A)]$$

$$\overset{(a)}{\approx} \frac{1}{T} \sum_{t \in T} p(c|I, \mathcal{D}_{CI}, A_t)$$

$$\overset{(b)}{=} \frac{1}{T} \sum_{t \in T} \int d\theta_t p(c|I, \theta_t) p(\theta_t | \mathcal{D}_{CI}, A_t)$$

$$\overset{(c)}{\approx} \frac{1}{T} \sum_{t \in T} \underbrace{p(c|I, \theta_t^*)}_{\text{Decision Forest Classifier}}, \theta_t^* \equiv \max_\theta p(\theta | \mathcal{D}_{CI}(A_t)).$$

Here $A_t \equiv (a_m)_{n=1}^N$ is a collection of switching variables that indicates which data points are included, i.e., $a_m = 1$ if data point n is included in dataset $D_t = D_{CI}(A_t)$. In this way, we have randomly subsampled the full dataset $D_{CI}$ (with replacement) T times in line (a), approximating the true marginalization over all possible subsets of the data. In line (b), we perform Bayesian Model Averaging over all possible values of the E-DRM/decision tree parameters $\theta_t$. Since this is intractable, we approximate it with the MAP estimate $\theta_t^*$ in line (c). The overall result is that each E-DRM (or decision tree) t is trained separately on a randomly drawn subset $D_t = D_{CI}(A_t) \subset D_{CI}$ of the entire dataset, and the final output of the classifier is an average over the individual classifiers.

4.4 EM Learning for the E-DRM Yields the InfoMax Principle

One approach to train an E-DRM classifier is to maximize the mutual information between the given training labels $\tilde{c}$ and the inferred (partial) rendering path $\tau^\ell \equiv (c^L, g^L, \ldots, g^\ell)$ at each level. Note that $\tilde{c}$ and $\tau^\ell$ are both discrete random variables.

This Mutual Information-based Classifier (MIC) plays the same role as the Softmax regression layer in DCNs, predicting the class labels c given a good disentangled representation $\tau^{l*}$ of the input I. In order to train the MIC classifier, we update the classifier parameters $\theta_{MIC}$ in each M-step as the solution to the optimization:

$$\max_{\theta} MI(\tilde{c}, (c^L, g^L, \ldots, g^1)) = \max_{\theta^1} \ldots \max_{\theta^L} \sum_{l=L}^{1} MI(\tilde{c}, g_n^l \mid g_n^{l+1}; \theta^l) = \quad (42)$$

$$\sum_{l=L}^{1} \max_{\theta^l} MI(\tilde{c}, g_n^l \mid g_n^{l+1}; \theta^l) = \sum_{l=L}^{1} \max_{\theta^l} \underbrace{H[\tilde{c}] - H[\tilde{c}\mid g_n^l; \theta^l]}_{\equiv \text{Information Gain}}$$

Here MI(•,•) is the mutual information between two random variables, H[•] is the entropy of a random variable, and $\theta^l$ are the parameters at layer l. In the first line, we have used the layer-by-layer structure of the E-DRM to split the mutual information calculation across levels, from coarse to fine. In the second line, we have used the max-sum algorithm (dynamic programming) to split up the optimization into a sequence of optimizations from l=L→l=1. In the third line, we have used the information-theoretic relationship MI(X,Y)=H[X]−H[Y|X]. This algorithm is known as Info-Max in the literature (5).

5 Relation to Prior Work

5.1 Relation to Mixture of Factor Analyzers

As mentioned above, on a high level, the DRM is related to hierarchical models based on the Mixture of Factor Analyzers (MFA) (22). Indeed, if we add noise to each partial rendering step from level l to l−1 in the DRM, then Eq. 12 becomes $$I^{l-1} \sim N(\Lambda^l(g^l)\mu^l(c^l) + \alpha^l(g^l), \Psi^l), \quad (43)$$

where we have introduced the diagonal noise covariance $\Psi^l$. This is equivalent to the MFA model. The DRM and DMFA both employ parameter sharing, resulting in an exponential reduction in the number of parameters, as compared to the collapsed or shallow version of the models. This serves as a strong regularizer to prevent overfitting.

Despite the high-level similarities, there are several essential differences between the DRM and the MFA-based models, all of which are critical for reproducing DCNs. First, in the DRM the only randomness is due to the choice of the $g^l$ and the observation noise after rendering. This naturally leads to inference of the most probable configuration via the max-sum algorithm, which is equivalent to max-pooling in the DCN. Second, the DRM's affine transformations $\Lambda^l$ act on multi-channel images at level l+1 to produce multi-channel images at level l. This structure is important, because it leads directly to the notion of (multi-channel) feature maps in DCNs. Third, a DRM's layers vary in connectivity from sparse to dense, as they give rise to convolutional, locally connected, and fully connected layers in the resulting DCN. Fourth, the DRM has switching variables that model (in)active renderers (Section 2.1). The manifestation of these variables in the DCN are the ReLUs (Eq. 9). Thus, the critical elements of the DCN architecture arise directly from aspects of the DRM structure that are absent in MFA-based models.

5.2 i-Theory: Invariant Representations Inspired by Sensory Cortex

Representational Invariance and selectivity (RI) are important ideas that have developed in the computational neuroscience community. According to this perspective, the main purpose of the feedforward aspects of visual cortical processing in the ventral stream are to compute a representation for a sensed image that is invariant to irrelevant transformations (e.g., pose, lighting etc.) (40, 41). In this sense, the RI perspective is quite similar to the DRM in its basic motivations. However, the RI approach has remained qualitative in its explanatory power until recently, when a theory of invariant representations in deep architectures—dubbed i-theory—was proposed (42, 43). Inspired by neuroscience and models of the visual cortex, it is the first serious attempt at explaining the success of deep architectures, formalizing intuitions about invariance and selectivity in a rigorous and quantitatively precise manner.

The i-theory posits a representation that employs group averages and orbits to explicitly insure invariance to specific types of nuisance transformations. These transformations possess a mathematical semi-group structure; as a result, the invariance constraint is relaxed to a notion of partial invariance, which is built up slowly over multiple layers of the architecture.

At a high level, the DRM shares similar goals with i-theory in that it attempts to capture explicitly the notion of nuisance transformations. However, the DRM differs from i-theory in two critical ways. First, it does not impose a semi-group structure on the set of nuisance transformations. This provides the DRM the flexibility to learn a representation that is invariant to a wider class of nuisance transformations, including non-rigid ones. Second, the DRM does not fix the representation for images in advance. Instead, the representation emerges naturally out of the inference process. For instance, sum- and max-pooling emerge as probabilistic marginalization over nuisance variables and thus are necessary for proper inference. The deep iterative nature of the DCN also arises as a direct mathematical consequence of the DRM's rendering model, which comprises multiple levels of abstraction.

This is the most important difference between the two theories. Despite these differences, i-theory is complementary to our approach in several ways, one of which is that it spends a good deal of energy focusing on questions such as: How many templates are required for accurate discrimination? How many samples are needed for learning? We plan to pursue these questions for the DRM in future work.

5.3 Scattering Transform: Achieving Invariance Via Wavelets

We have used the DRM, with its notion of target and nuisance variables, to explain the power of DCN for learning selectivity and invariance to nuisance transformations. Another theoretical approach to learning selectivity and invariance is the Scattering Transform (ST) (44, 45), which comprises a series of linear wavelet transforms interleaved by nonlinear modulus-pooling of the wavelet coefficients. The goal is to explicitly hand-design invariance to a specific set of nuisance transformations (translations, rotations, scalings, and small deformations) by using the properties of wavelet transforms.

If we ignore the modulus-pooling for a moment, then the ST implicitly assumes that images can be modeled as linear combinations of pre-determined wavelet templates. Thus the ST approach has a maximally strong model bias, in that there is no learning at all. The ST performs well on tasks that are consistent with its strong model bias, i.e., on small datasets for which successful performance is therefore contingent on strong model bias. However, the ST will be more challenged on difficult real-world tasks with complex nuisance structure for which large datasets are available. This contrasts strongly with the approach presented here and that of the machine learning community at large, where hand-designed features have been outperformed by learned features in the vast majority of tasks.

5.4 Learning Deep Architectures Via Sparsity

What is the optimal machine learning architecture to use for a given task? This question has typically been answered by exhaustively searching over many different architectures. But is there a way to learn the optimal architecture directly from the data? Arora et al. (46) provide some of the first theoretical results in this direction. In order to retain theoretical tractability, they assume a simple sparse neural network as the generative model for the data. Then, given the data, they design a greedy learning algorithm that reconstructs the architecture of the generating neural network, layer-by-layer.

They prove that their algorithm is optimal under a certain set of restrictive assumptions. Indeed, as a consequence of these restrictions, their results do not directly apply to the DRM or other plausible generative models of natural images. However, the core message of the paper has nonetheless been influential in the development of the Inception architecture, which has recently achieved the highest accuracy on the ImageNet classification benchmark.

How does the sparse reconstruction approach relate to the DRM? The DRM is indeed also a sparse generative model: the act of rendering an image is approximated as a sequence of affine transformations applied to an abstract high-level class template. Thus, the DRM can potentially be represented as a sparse neural network. Another similarity between the two approaches is the focus on clustering highly correlated activations in the next coarser layer of abstraction. Indeed the DRM is a composition of sparse factor analyzers, and so each higher layer l+1 in a DCN really does decorrelate and cluster the layer l below, as quantified by Eq. (drm19).

But despite these high-level similarities, the two approaches differ significantly in their overall goals and results. First, our focus has not been on recovering the architectural parameters; instead we have focused on the class of architectures that are well-suited to the task of factoring out large amounts of nuisance variation. In this sense the goals of the two approaches are different and complementary. Second, we are able to derive the structure of DCNs and RDFs exactly from the DRM. This enables us to bring to bear the full power of probabilistic analysis for solving high-nuisance problems; moreover, it will enable us to build better models and representations for hard tasks by addressing limitations of current approaches in a principled manner.

5.5 Google FaceNet: Learning Useful Representations with DCNs

Recently, Google developed a new face recognition architecture called FaceNet (47) that illustrates the power of learning good representations. It achieves state-of-the-art accuracy in face recognition and clustering on several public benchmarks. FaceNet uses a DCN architecture, but crucially, it was not trained for classification. Instead, it is trained to optimize a novel learning objective called triplet finding that learns good representations in general.

The basic idea behind their new representation-based learning objective is to encourage the DCN's latent representation to embed images of the same class close to each other while embedding images of different classes far away from each other, an idea that is similar to the NuMax algorithm (48). In other words, the learning objective enforces a well-separatedness criterion. In light of our work connecting DRMs to DCNs, we will next show how this new learning objective can be understood from the perspective of the DRM.

The correspondence between the DRM and the triplet learning objective is simple. Since rendering is a deterministic (or nearly noise-free) function of the global configuration (c,g), one explanation should dominate for any given input image I=R(c,g), or equivalently, the clusters (c,g) should be well-separated. Thus, the noise-free, deterministic, and well-separated DRM are all equivalent. Indeed, we implicitly used the well-separatedness criterion when we employed the Hard EM algorithm to establish the correspondence between DRMs and DCNs/RDFs.

5.6 Renormalization Theory

Given the DRM's notion of irrelevant (nuisance) transformations and multiple levels of abstraction, we can interpret a DCN's action as an iterative coarse-graining of an image, thus relating our work to another recent approach to understanding deep learning that draws upon an analogy from renormalization theory in physics. This approach constructs an exact correspondence between the Restricted Boltzmann Machine (RBM) and block-spin renormalization—an iterative coarse-graining technique from physics that compresses a configuration of binary random variables (spins) to a smaller configuration with less variables. The goal is to preserve as much information about the longer-range correlations as possible, while integrating out shorter-range fluctuations.

Our work here shows that this analogy goes even further as we have created an exact mapping between the DCN and the DRM, the latter of which can be interpreted as a new real-space renormalization scheme. Indeed, the DRM's main goal is to factor out irrelevant features over multiple levels of detail, and it thus bears a strong resemblance to the core tenets of renormalization theory. As a result, we believe this will be an important avenue for further research.

5.7 Summary of Distinguishing Features of the DRM

A number of features that distinguish the DRM approach from others in the literature can be summarized as: (i) The DRM explicitly models nuisance variation across multiple levels of abstraction via a product of affine transformations. This factorized linear structure serves dual purposes: it enables (ii) exact inference (via the max-sum/max-product algorithm) and (iii) it serves as a regularizer, preventing overfitting by a novel exponential reduction in the number of parameters. Critically, (iv) the inference is not performed for a single variable of interest but instead for the full global configuration. This is justified in low-noise settings, i.e., when the rendering process is nearly deterministic, and suggests the intriguing possibility that vision is less about probabilities and more about inverting a complicated (but deterministic) rendering transformation.

6 New Directions

We have shown that the DRM is a powerful generative model that underlies both DCNs and RDFs, the two most powerful vision paradigms currently employed in machine learning. Despite the power of the DRM/DCN/RDF, it has limitations, and there is room for improvement. (Since both DCNs and RDFs stein from DRMs, we will loosely refer to them both as DCNs in the following, although technically an RDF corresponds to a kind of tree of DCNs.)

In broad terms, most of the limitations of the DCN framework can be traced back to the fact that it is a discriminative classifier whose underlying generative model was not known. Without a generative model, many important tasks are very difficult or impossible, including sampling, model refinement, top-down inference, faster learning, model selection, and learning from unlabeled data. With a generative model, these tasks become feasible. Moreover, the DCN models rendering as a sequence of affine transformations, which severely limits its ability to capture many important real-world visual phenomena, including figure-ground segmentation, occlusion/clutter, and refraction. It also lacks several operations that appear to be fundamental in the brain: feed-back, dynamics, and 3D geometry. Finally, it is unable to learn from unlabeled data and to generalize from few examples. As a result, DCNs require enormous amounts of labeled data for training.

These limitations can be overcome by designing new deep networks based on new model structures (extended DRMs), new message-passing inference algorithms, and new learning rules, as summarized in Table 2 (i.e., FIG. 8). We now explore these solutions in more detail.

6.1 More Realistic Rendering Models

We can improve DCNs by designing better generative models incorporating more realistic assumptions about the rendering process by which latent variables cause images. These assumptions may include symmetries of translation, rotation, scaling, perspective, and non-rigid deformations, as rendered by computer graphics and multi-view geometry.

In order to encourage more intrinsic computer graphics-based representations, we can enforce these symmetries on the parameters during learning. Initially, we could use local affine approximations to these transformations. For example, we could impose weight tying based on 3D rotations in depth. Other nuisance transformations are also of interest, such as scaling (i.e., motion towards or away from a camera). Indeed, scaling-based templates are already in use by the state-of-the-art DCNs such as the Inception architectures developed by Google (13), and so this approach has already shown substantial promise.

We can also perform intrinsic transformations directly on 3D scene representations. For example, networks may be trained with depth maps, in which a subset of channels in input feature maps encode pixel z-depth. These augmented input features will help define useful higher-level features for 2D image features, and thereby transfer representational benefits even to test images that do not provide depth information (53). With these richer geometric representations, learning and inference algorithms can be modified to account for 3D constraints according to the equations of multi-view geometry (53).

Another important limitation of the DCN is its restriction to static images. There is no notion of time or dynamics in the corresponding DRM model. As a result, DCN training on large-scale datasets requires millions of images in order to learn the structure of high-dimensional nuisance variables, resulting in a glacial learning process. In contrast, learning from natural videos should result in an accelerated learning process, as typically only a few nuisance variables change from frame to frame. This property should enable substantial acceleration in learning, as inference about which nuisance variables have changed will be faster and more accurate (54). See Section 6.3.2 below for more details.

6.2 New Inference Algorithms 6.2.1 Soft Inference

We showed above in Section 2.4 that DCNs implicitly infer the most probable global interpretation of the scene, via the max-sum algorithm (55). However, there is potentially a major component missing in this algorithm: max-sum message passing only propagates the most likely hypothesis to higher levels of abstraction, which may not be the optimal strategy, in general, especially if uncertainty in the measurements is high (e.g., vision in a fog or at nighttime). Consequently, we can consider a wider variety of softer inference algorithms by defining a temperature parameter that enables us to smoothly interpolate between the max-sum and sum-product algorithms, as well as other message-passing variants such as the approximate Variational Bayes EM (56). To the best of our knowledge, this notion of a soft DCN is novel.

6.2.2 Top-Down Convolutional Nets: Top-Down Inference Via the DRM

The DCN inference algorithm lacks any form of top-down inference or feedback. Performance on tasks using low-level features is then suboptimal, because higher-level information informs low-level variables neither for inference nor for learning. We can solve this problem by using the DRM, since it is a proper generative model and thus enables us to implement top-down message passing properly.

Employing the same steps as outlined in Section 2, we can convert the DRM into a top-down DCN, a neural network that implements both the bottom-up and top-down passes of inference via the max-sum message passing algorithm. This kind of top-down inference should have a dramatic impact on scene understanding tasks that require segmentation such as target detection with occlusion and clutter, where local bottom-up hypotheses about features are ambiguous. To the best of our knowledge, this is the first principled approach to defining top-down DCNs.

6.3 New Learning Algorithms 6.3.1 Derivative-Free Learning

Back propagation is often used in deep learning algorithms due to its simplicity. We have shown above that back propagation in DCNs is actually an inefficient implementation of an approximate EM algorithm, whose E-step comprises bottom-up inference and whose M-step is a gradient descent step that fails to take advantage of the underlying probabilistic model (the DRM). To the contrary, our above EM algorithm (Eqs. drm19-drm24) is both much faster and more accurate, because it directly exploits the DRM's structure. Its E-step incorporates bottom-up and top-down inference, and its M-step is a fast computation of sufficient statistics (e.g., sample counts, means, and covariances). The speed-up in efficiency should be substantial, since generative learning is typically much faster than discriminative learning due to the bias-variance tradeoff (32); moreover, the EM-algorithm is intrinsically more parallelizable (57). Armed with a generative model, we can perform hybrid discriminative-generative training (26) that enables training to benefit from both labeled and un-labeled data in a principled manner.

6.3.2 Dynamics: Learning from Video

Although deep NNs have incorporated time and dynamics for auditory tasks (58-60), DCNs for visual tasks have remained predominantly static (images as opposed to videos) and are trained on static inputs. Latent causes in the natural world tend to change little from frame-to-frame, such that previous frames serve as partial self-supervision during learning (61). A dynamic version of the DRM would train without external supervision on large quantities of video data (using the corresponding EM algorithm). We can supplement video recordings of natural dynamic scenes with synthetically rendered videos of objects traveling along smooth trajectories, which will enable the training to focus on learning key nuisance factors that cause difficulty (e.g., occlusion).

6.3.3 Learning Architectures: Model Selection in the DRM

Thus far, we have talked about estimating the right parameters of fixed architectures. But another problem is actually finding good architectures—i.e. structure learning.

Currently, determining the right deep architectures quite difficult, typically requiring exhaustive search over a large space (e.g. number of layers, filters per layer, filter sizes, layer types) and lots of intuition. In this section, armed with the DRM, we show how to infer such parameters using the EM algorithm.

Learning the Number of Filters in a Layer.

For instance, consider the problem of determining the number of filters in a convolutional layer for a DCN. We know from the generative model—the RM—that this choice corresponds to the choice of the number of clusters in the RM, a classic problem for which there are many well-established algorithms, including those based on Dirichlet process mixtures (DPMs) and Chinese restaurant processes (CRP). For our first prototypes, we will focus on the AIC and BIC scoring algorithms (45), which reward a trained model's goodness-of-fit (e.g log-likelihood) and penalize its complexity (e.g. number of parameters).

Learning the Filter Sizes in a Layer.

We will use AIC criterion to score models with different filter sizes per layer and pick the best one.

Learning the Number of Layers.

Another difficult problem is to determine the number of layers or depth of the architecture. How deep is deep enough? Again, we can leverage the existence of simple probabilistically principled rules for building hierarchical generative models; once we pass to the discriminative analog, the procedures amount to model selection scoring.

6.3.4 Training from Labeled and Unlabeled Data

DCNs are purely discriminative techniques and thus cannot benefit from unlabeled data. However, armed with a generative model we can perform hybrid discriminative-generative training (31) that enables training to benefit from both labeled and unlabeled data in a principled manner. This should dramatically increase the power of pre-training, by encouraging representations of the input that have disentangled factors of variation. This hybrid generative-discriminative learning is achieved by the optimization of a novel objective function for learning, that relies on both the generative model and its discriminative relaxation. In particular, the learning objective will have terms for both, as described in (31). Recall from Section 2.7 that the discriminative relaxation of a generative model is performed by relaxing certain parameter constraints during learning, according to $$\max_\theta L_{gen}(\theta; \mathcal{D}_{CI}) = \max_{\eta:\eta=\rho(\theta)} L_{nat}(\eta; \mathcal{D}_{CI}) \le \max_{\eta:\eta=\rho(\theta)} L_{cond}(\eta; \mathcal{D}_{C|I}) \le \max_\eta L_{dis}(\eta; \mathcal{D}_{C|I}), \quad (44)$$

where the L's are the model's generative, naturally parametrized generative, conditional, and discriminative likelihoods. Here $\eta$ are the natural parameters expressed as a function of the traditional parameters $\theta$, $D_{CI}$ is the training dataset of labels and images, and $D_{C|I}$ is the training dataset of labels given images. Although the discriminative relaxation is optional, it is very important for achieving high performance in real-world classifiers as discriminative models have less model bias and, therefore, are less sensitive to model mis-specifications (32). Thus, we will design new principled training algorithms that span the spectrum from discriminative (e.g., Stochastic Gradient Descent with Back Propagation) to generative (e.g., EM Algorithm).

7 Other Architectures: Autoencoders and LSTM/Gated RNNs 7.1 From Gaussian-Bernoulli RBMs to Autoencoders In this section, we will develop a new understanding of the autoencoder, by linking it to the Restricted Boltzmann Machine (RBM) as a generative model. Specifically, we will show that the autoencoder training algorithm, i.e., back-propagation algorithm, can be recast as a discriminately relaxed approximate EM algorithm for the Gaussian-Binary RBM. The line of reasoning used here is the same as used in earlier sections, where similar arguments are used to derive deep convolutional nets and random decision forests from the Deep Rendering Model.

A Gaussian-Bernoulli RBM (GB-RBM) is probabilistic graphical model that has a joint probability distribution $$p(y,x|\theta) \propto \exp(-E(y,x|\theta)),$$

where the energy function E is defined as $$E(y, x | \theta) \equiv -y^T \Lambda \sum^{-1} x + \frac{1}{2}(y-\alpha)^T \sum^{-1} (y-\alpha) - c^T x. \quad (45)$$

Here $x \in \{0, 1\}^d$ is a vector of latent binary variables and $y \in \mathbb{R}^D$ is a real-valued vector of measurements. One of the most important properties of RBMs is that the conditional distributions $p(x_i|y)$ and $p(y_j|x)$ are independent. Conditioned on the latent variables, the measurements y|x are Gaussian with mean $\mu = \Lambda x + \alpha = \Sigma_i \Lambda_i x_i + \alpha$ and isotropic covariance $\sigma^2 I_N$, where the collection of parameters is $$\theta = \theta_{GB\text{-}RBM} \equiv \{\Lambda, \alpha, \sigma^2\}.$$

Conditioned on the observed variables, the latent variables x|y are Bernoulli with success probability $\rho = \sigma(\Lambda \Sigma^{-1} y + c)$.

In order to learn the parameters, we define an approximate EM algorithm as follows. In the E-step, given visible measurements y we can infer the joint posterior over the latent variables x by Bayes Rule $$p(x|y;\theta) \propto p(y|x)p(x).$$

However, this is intractable since there are exponentially many possible values of x and so we approximate the true posterior $p(x|y; \theta)$ by the product of posterior marginals $q(x; \theta) \equiv \Pi_i p(x_i|y;\theta)$. This is the so-called mean-field approximation and it is optimal in the following sense: of all fully factorized approximations, the distribution $q(x; \theta)$ has the least KL-distance to the true posterior. (KL is an acronym for Kullback-Leibler distance.) Fortunately, for the Gaussian RBM the posterior marginals are exactly computable as $$p(x_i=1|y;\theta)=F(w_i^T y + b),$$

where $w_i \equiv \Lambda_i/\sigma^2$ and F is the sigmoid function as before. This completes the approximate E-step; note the similarity with the input-to-hidden mapping in an autoencoder neural network.

In the M-step, we maximize the expected complete-data log-likelihood $$l(\theta) \equiv E_{x|y} \Sigma_n \ln p(x_n, y_n | \theta),$$

where the expectation is over all latent variables $x_n$ given all measurements $y_n$. Recall that the latent variables $x_n|y_n$ were inferred approximately in the E-step. Since $y_n|x_n$ is Gaussian, the M-step maximization simplifies to $$\max_\theta \Sigma_n \| \Lambda \hat{x}_n + \alpha - y_n \|^2,$$

where $$\hat{x}_{ni} \equiv E[x_{ni}|y_n; \hat{\theta}^{old}] = p(x_{ni}=1|y_n; \hat{\theta}^{old}) = F(w_i^T y_n + b_i)$$

is the latent posterior marginal computed in the E-step above.

Note that the resulting optimization is quite similar to the training objective for an autoencoder neural net, except for the parameters θ being optimized are not the layer weights and biases; instead they are the parameters $\theta_{GB-RBM}$ of the generative GB-RBM model.

In order to complete the mapping from the directed GB-RBM to the autoencoder NN training objective, we perform a discriminative relaxation as defined earlier in Section 2.7.1. This results in a gradient descent M-step that optimizes parameters $$\theta_{AENN} = \{W_1 \equiv \Lambda, \; b_1 \equiv \alpha, \; W_2 \equiv W, \; b_2 \equiv b\}$$

instead of the generative parameters of the Gaussian RBM $$\theta_{GB-RBM} = \{\Lambda, \alpha, \sigma^2\}.$$

These are the weights and biases of the input-to-hidden and hidden-to-output layers of an autoencoder neural network. Thus the discriminative relaxation transforms the GB-RBM model with latent variables into a discriminative autoencoder NN model with latent variables. (Discriminative relaxation is a many-to-one mapping: many distinct generative models map to the same discriminative model.) This completes the definition of the (gradient descent) M-step, which is equivalent to back propagation.

In sum, we have shown that the autoencoder NN is equivalent to discriminative approximate EM training for a directed GB-RBM with a uniform prior of the latent variables and an isotropic noise covariance. The approximation employed in the E-step is the well-known mean field approximation.

7.1.1 EM Algorithm for the Gaussian-Binary RBM

Here we provide a more detailed derivation of the EM algorithm for the GB-RBM from the last section. This derivation makes explicit the connection between GB-RBMs and Autoencoders.

The EM algorithm is derived by maximizing the expected complete-data log-likelihood where the expectation is over all latent variables $x_n$ given all measurements $y_n$. Mathematically we have $$\max_\theta f(\theta) \equiv \max_\theta \mathbb{E}_{x|y} \sum_n \ln p(x_n, y_n | \theta)$$

$$= \max_\theta \sum_n \mathbb{E}_{p(x_n|y_n;\theta^{old})} \ln p(x_n, y_n | \theta)$$

$$\stackrel{(a)}{\approx} \max_\theta \sum_n \mathbb{E}_{q(x_n|y_n;\theta^{old})} \ln p(x_n, y_n | \theta)$$

$$= \max_\theta \sum_n \mathbb{E}_{q(x_n|y_n)} \ln p(x_n | \theta) + \ln p(y_n | x_n; \theta)$$

$$\stackrel{(b)}{\leq} \max_\theta \sum_n \mathbb{E}_{q(x_n|y_n)} \ln \mathcal{N}(y_n | \Lambda x_n +, \sigma^2) + C_1$$

$$= \max_\theta \sum_n -\frac{1}{2\sigma^2} \mathbb{E}_{q(x_n|y_n)} \|\Lambda x_n + \alpha - y_n\|^2$$

$$\stackrel{(c)}{=} \min_\theta \sum_n \left\| \Lambda \underbrace{\mathbb{E}_{q(x_n|y_n)}[x_n]}_{\equiv \hat{x}_n} + \alpha - y_n \right\|^2$$

$$\stackrel{(d)}{=} \min_\theta \sum_n \|\Lambda \hat{x}_n + \alpha - y_n\|^2$$

$$= \min_\theta J_{AENN}(\theta)$$

$$\stackrel{(e)}{\geq} \min_{\theta_{AENN}} J_{AENN}(\theta_{AENN}).$$

In line (a) we have employed the mean-field approximation for the true joint posterior p, approximating it by its product of marginals q. In line (b) we have employed a relaxation that effectively ignores the prior over the latent binary variables x. Importantly, this is necessary in order to recover the autoencoder training objective. We leave an exploration of this term for future work. In line (c) we do some straightforward algebra, utilizing the linearity of expectations. Finally, in line (d), we have defined and used the latent posterior marginal $$\hat{x}_{ni} \equiv \mathbb{E}_q[x_{ni} | y_n; \hat{\theta}^{old}]$$

$$= p(x_{ni} = 1 | y_n; \hat{\theta}^{old})$$

$$= \mathcal{F}(w_i^T y_n + b_i)$$

which was computed in the E-step of the algorithm.

Note that the resulting optimization is quite similar to the training objective for an autoencoder neural net, except for the parameters θ being optimized are not the layer weights and biases; instead they are the parameters of the generative directed GB-RBM model $$\theta = \theta_{GB-RBM} = \{\Lambda, \alpha, \sigma^2\}.$$

As described in the present disclosure, we apply a discriminative relaxation (line (e)) in order to exactly recover the autoencoder training objective, properly optimized over the autoencoder weights and biases $$\theta_{AENN} = \{W_1, b_1, W_2, b_2\}.$$

The mapping from $\theta_{GB-RBM} \to \theta_{AENN}$ is simply $$W_1 = \Lambda, \; b_1 = \alpha, \; W_2 = \Lambda \Sigma^{-1}, \; b_2 = \ln p(x_i = 1).$$

7.2 from Two-Time Hidden Markov Models to LSTM/Gated RNNs

In this section we derive the structure of long memory architectures such as LSTM or Gated Recurrent Neural Networks (RNNs). (LSTM is an acronym for Long Short-Term Memory.) Both of these architectures have been successful in tasks requiring long-term memory, i.e. tasks that are implicitly non-Markovian in time.

How does one deal with such non-Markovianity? Most of machine learning and stochastic processes rely critically on Markovianity or stationarity. We deal with this problem by posing a generative model that contains two different times or clocks τ and t. The clock τ represents the latent or intrinsic time under with respect to which the latent process $z_\tau$ is Markov. The clock t represents measurement time, with respect to which the measurements $x_t \equiv z_{\tau_t}$ are taken. Note that $x_t$ will be non-Markovian in general, as the transformation τ(t) between the two clocks is non-uniform in general.

With this motivation, let's formalize a generative model, which we will call a 2-time HMM. A clock is defined as a stochastic counting process with respect to physical time $t_{wall}$. Let $z_\tau$ to be a latent stochastic process that is Markov with respect to a latent clock τ that ticks every time $z_\tau$ updates (e.g. a Hidden Markov Model if z is discrete or a Kalman Filter if z is real). Let $x_t$ be the observed/measured stochastic process with respect to a measurement clock t. Let $\tau_t$ be the time change i.e. the mapping from the measurement clock to the latent clock. Intuitively, $\tau_t$ counts the number of ticks of the latent clock τ with respect to the measurement time t. Note that $x_t$ is just the latent process $z_\tau$ expressed with respect to the measurement time t. In order to generate a sample from the 2-time HMM, we simply execute the following:

$$z_{\tau+1} \sim p(z_{\tau+1} | z_{\leq \tau}; \theta) = p(z_{\tau+1} | z_{\tau-M:\tau}; \theta)$$

$$x_t = z_{\tau_t}.$$

Note that we have assumed a measurement process with no noise or linear transformation for simplicity. Given this generative model for the measurements $x_t$, we will now show how to do inference of the latent variables $z_\tau$ and the latent clock $\tau_t$.

7.2.1 Update/Forget/Remember Gate

In order to derive the update gate (or equivalently the LSTM forget gate), we first need to re-express the generative model recursively in the measurement time. We can do this by noting that $$x_{t+1} = \mathcal{Z}_{\tau_{t+1}} = \mathcal{Z}_{\tau_t + a_{t+1}} \tag{46}$$

$$= \begin{cases} \mathcal{Z}_{\tau_t+1} & a_{t+1} = 1 \\ \mathcal{Z}_{\tau_t} & a_{t+1} = 0 \end{cases} = \begin{cases} \mathcal{Z}_{\tau_t+1} & a_{t+1} = 1 \\ x_t & a_{t+1} = 0 \end{cases}$$

$$= (1 - a_{t+1})x_t + a_{t+1}\eta_{t+1}, \tag{47}$$

where the switching process $a_{t+1} \equiv \tau_{t+1} - \tau_t \in \{0, 1\}$ indicates whether an event occurred or equivalently, whether the latent clock $\tau$ ticked in the measurement time interval (t, t+1]. The process $\eta_{t+1} \equiv \eta_{t+1}(z_{\tau_t})$ is the updated value of latent process $z_\tau$ at measurement time t+1, right after an event has occurred.

Note that the series $(\tau_t)_{t \in \mathbb{N}}$ and $(a_t)_{t \in \mathbb{N}}$ both encode the same information and thus are equivalent specifications of a time change. This is important because learning $\tau_t$ is tantamount to learning $a_t$, which in turn will correspond to learning how to turn on/off the update/forget gates in an RNN.

Next, we wish to derive the inference algorithm for the 2-time HMM. Analogous to a HMM or a Kalman Filter (KF), we will compute a recursive update by taking the expectation of both sides of Eq. 47. This yields $$\hat{x}_t \equiv \mathbb{E}[x_{t+1} | \leq t] \tag{48}$$

$$= (1 - \mathbb{E}[a_{t+1} | \leq t])\mathbb{E}[x_t | \leq t] + \mathbb{E}[a_{t+1} | \leq t]\eta_{t+1}$$

$$= (1 - p(a_{t+1} = 1 | \leq t))\mathbb{E}[x_t | \leq t] + p(a_{t+1} = 1 | \leq t)\eta_{t+1}$$

$$\equiv (1 - \hat{u}_{t+1|\leq t}) \cdot \hat{x}_t + \hat{u}_{t+1|\leq t} \cdot \eta_{t+1},$$

where $\hat{u}_{t+1|\leq t} \equiv p(a_{t+1} = 1|\leq t)$ represents the state of the update/forget gate and $\leq t \equiv \{x_{\leq t}\}$ represents all past measurements. Since the latent process is assumed Markov, the relevant information from past measurements $\{x_{\leq t-1}\}$ can be summarized in a finite-dimensional latent state $h_{t-1}$ and the update/forget gate inference can be written as $$\hat{u}_{t+1|\leq t} \equiv p(a_{t+1}=1|\leq t) = \sigma(Wx_t + Uh_{t-1}), \tag{49}$$

where W, U are matrices that depend on the generative parameters $\theta$ of the 2-time HMM.

8 BrainFactory: New Generative Models Induce New Deep Neural Networks

8.1 Recap of the DRM→DCN Derivation

In Section 2, we derived from first principles a structured multi-layer neural network (DCN) where the different layers perform different computational roles. The first layer performs template matching using a convolution operation, and the second layer performs a marginalization over nuisance variables by a max-pooling operation.

The developments relied on the analysis of the class posterior of the DRM generative model. Different subexpressions of the posterior correspond to different layer types and activations in the corresponding neural network.

Can this correspondence between the DRM generative model and the DCN neural network be generalized? In this section, we show that the answer is yes, and we define a general procedure for mapping generative models to structured neural networks.

8.2 BrainFactory: A General Compilation Procedure for Constructing Deep Neural Networks The exact correspondence between the max-sum message passing algorithm for inference in the DRM and the DCN suggests a generalization of the procedure that connects a generative model to a structured neural network. Indeed, we can view the above derivation as one specific embodiment of a more general procedure, which we call BrainFactory.

BrainFactory is a general procedure that takes an arbitrary generative model (from the exponential family) as input and constructs a trainable inference engine (a structured neural network) as output. The resulting NN is a message passing network (MPN): it implements a message passing inference algorithm for the generative model. Thus it is specialized for the task at hand and is also ready to be trained. As shown in FIG. 9, the construction of the MPN is a multi-step process that parallels that of the DRM→DCN mapping derived above.

1. Define a generative model for the task or data that uses random variables from the exponential family (8).
2. Construct the factor graph for the generative model (24).
3. Decide on an inference task (e.g., inference of the marginal posterior or the most probable configuration). This choice determines the kind of message-passing algorithm to be used (e.g., sum-product vs. max-sum) since different inference tasks require different kinds of computation (8).
4. Depending on the choice of inference task and message passing algorithm, expand the factor nodes into lower-level arithmetic operations (typically sum, product, max, min, evaluate). Since all conditional distributions are from the exponential family (Step 1), each factor node will compute log-posteriors (or energy functions) that are simple affine transformations of the input: dot products between a vector of natural parameters and a vector of sufficient statistics. This will be followed by a nonlinearity: for example, log-sum-exp or max-sum-log, depending on whether the inference task is to compute a marginal posterior or the most probable global configuration. The resulting message passing circuit is thus a message passing network (MPN).
5. (Optional) Replace generative posteriors with their discriminative counterparts by relaxing the generative constraints on the natural parameters (see Section 2.7). This step is optional, but typically quite useful in practice, since it relaxes the strong model bias that generative models typically impose, thus enabling the data to drive learning more. The resulting network is a discriminative message passing network (d-MPN).
6. Choose the learning algorithm to be used for the MPN or d-MPN, depending on the generative/discriminative mode chosen above. If generative, use the EM algorithm (typically when a large amount of training data is available) from Eqs. 16 or the VBEM algorithm (62) (typically when a large amount of training data is not available). If discriminative, use the gradient descent M-step (e.g., SGD Backprop (63)) or another optimization method (e.g., Newton-Raphson or Conjugate Gradient), optionally employing momentum-based acceleration to speed up optimization.

7. Learn the parameters of the MPN or d-MPN by applying the learning algorithm in Step 6 to the training dataset.

This completes the definition of the BrainFactory procedure. In the next sections, we review factor graphs and message passing algorithms for inference as they are important for understanding Steps 2, 3 and 4.

8.2.1 Inference: Message Passing in the Factor Graph Representation

Let $M_{gen}$ be a generative probabilistic model (e.g., DRM) and consider its joint distribution $p(v)$ where $v \in V$ are random variables of interest. If these variables have conditional independence relationships (e.g., if they stein from a graphical model), then the joint distribution can be factorized as $$p(v) = \prod_{f \in \mathcal{F}} \psi_f(v_f)$$

where $F \subseteq 2^V$ is a set of factors, $v_f$ is the set of variables in factor f, and $\psi_f$ are the factor potentials. The factorization can be encoded in a factor graph $G_F = (V, F, E)$, a bipartite graph with a set of edges $\subseteq V \times F$ that represent the variable-factor relation: $(v,f) \in E \Leftrightarrow v \in f$.

Message Passing Algorithms.

The factor graph is important, because it encodes the same information as the generative model $M_{gen}$, but organizes the information in a manner that simplifies the definition and execution of algorithms for statistical inference. These algorithms are called message passing algorithms, because they work by passing real-valued functions called messages along the edges between nodes. Intuitively, the messages encode the influence that one random variable exerts upon another. If the factor graph is a tree, then after a finite number of iterations the messages will converge, and the algorithm will terminate with an inferred estimate of the variable(s) of interest (24).

The particular message passing algorithm used depends on the kind of inference that is desired. For estimation of the marginal posterior distribution of a single variable (or subset of variables), the sum-product algorithm is the appropriate choice (8), whereas for the estimation of the most probable joint configuration of all variables (including latent variables), the appropriate choice is the max-sum algorithm (8).

We now review two of the most prominent message passing algorithms for exact inference: the sum-product and max-sum algorithms. When given a set of observations/measurements of a subset of variables, the sum-product algorithms will compute the exact posterior distribution for the variables of interest, while the max-sum algorithm will compute the exact most probable configuration of variables along with its probability.

Sum-Product Algorithm. Message passing algorithms employ two kinds of messages: those sent from variables nodes to factor nodes, and those sent from factor nodes to variables nodes. For the posterior estimation problem, the associated sum-product message passing algorithm is $$\lambda_{v \to f}(v) = \prod_{f' \in N_v \setminus f} \lambda_{f' \to v}(v) \quad (36)$$

$$\lambda_{f \to v}(v) = \sum_{\vec{v}_f \in -\{v\}} p(\vec{v}_f) \prod_{v' \in N_f \setminus v} \lambda_{v' \to f}(v') \quad (37)$$

where $-\{v\}$ is defined as the set of all configurations $\vec{v}_f$ for factor f where variable v is frozen. Note that messages at leaf nodes are computed according to the convention $\prod_{a \in A} \lambda_a = 1$ when A is the empty set.

Max-Sum Algorithm.

For the MAP configuration problem, the associated max-sum message passing algorithm is similar to the sum-product algorithm except for the replacements $\Sigma \to \max$, $\Pi \to \Sigma$, $\lambda \to \ln \lambda$:

$$\lambda_{v \to f}(v) = \sum_{f' \in N_v \setminus f} \lambda_{f' \to v}(v) \quad (38)$$

$$\lambda_{f \to v}(v) = \max_{\vec{v}_f \in -\{v\}} \left\{ \ln p(\vec{v}_f) + \prod_{v' \in N_f \setminus v} \lambda_{v' \to f}(v') \right\}. \quad (39)$$

8.2.2 Inference Via Message Passing in the Neural Network Representation

Recall the key point from Sections 2-5: that the structure of DCNs (i.e., the max-pooling and convolutional layers) emerges naturally from a message passing formulation of the inference problem. Indeed, we can see the choice of max-pooling combined with a convolutional layer is neither arbitrary nor heuristic; it is the only choice that preserves probabilistic semantics and consistency for the MAP configuration problem.

Inspired by this special case, we now generalize the DRM to DCN mapping to arbitrary generative models (from the exponential family (51)). We accomplish this by converting conventional message passing in a factor graph representation to message passing in a neural network representation, analogous to our derivation earlier for DCNs. We show that shifting to this neural network representation has significant benefits for inference and learning.

8.3 Example Applications of the BrainFactory Procedure

We now illustrate the BrainFactory procedure by deriving a new MPN that is natural for solving a certain inference problem.

8.3.1 Example 1: Shifted Rectified Linear Unit

In Section 2.2, we derived the ReLU (Eq. 9) by assuming that the prior $\pi_{cg}$ was uniform. However, in real-world datasets this is not always the case. Indeed, certain configurations c, g are typically more common than others. For example, in natural images right-side-up faces are far more common than up-side-down faces. In order to account for this non-uniformity, we use the BrainFactory to construct a new kind of Rectified Linear Unit, which we call the Shifted Rectified Linear Unit (Shifted ReLU), by relaxing the assumption that the prior $\pi_{cg}$ is uniform. The generative model, factor graph and inference task (corresponding to Steps 1, 2 and 3 in the BrainFactory procedure) are the same as in Section 2.2. In order to infer the most probable configuration, we use Eq. 9 with a modification:

$$\hat{c}(I) = \operatorname{argmax}_c \max_{g \in G} \max_{a \in A} \left\{ \begin{array}{l} \left\langle \frac{1}{\sigma_x^2} a \mu_{cg} \mid I \right\rangle - \\ \frac{1}{2\sigma_x^2}(\|a\mu_{cg}\|_2^2 + \|I\|_2^2) + \\ \ln \pi_{cg} \pi_a \end{array} \right\} \quad (40)$$

$$\equiv \operatorname{argmax}_c \max_{g \in G} \max_{a \in A} a(\langle w_{cg} \mid I \rangle + b_{cg}) + b_{cga}$$

$$= \operatorname{argmax}_c \max_{g \in G} ReLU(\langle w_{cg} \mid I \rangle + b_{cg}) + b'_{cg}$$

where $b_{cg}$ and $b_{cg}' \equiv \ln \pi_{cg} \pi_{OFF}$ are bias terms, $\pi_{OFF} \equiv \pi_{a=0}$ and ReLU(u)≡(u)$_+$=max{u,0} denotes the Rectified Linear Unit as described earlier. Note that the arithmetic operations in this MPN (Step 4) are slightly different from those of a standard DCN. In particular, since the prior $\pi_{cg}$ is not uniform, the bias $b_{cg}'$ depends on c, g and therefore is taken into account when max-marginalizing. This extra term effectively shifts the standard ReLU output by an amount depending on the prior probability of the configuration c, g, hence the name. If we wish to use a discriminative relaxation, then we can replace $b_{cg}'$ with a new parameter $\beta_{cg}$ that is free from the generative constraints $b_{cg}'=\ln \pi_{cg}+\ln \pi_{OFF}$, resulting in the form $$\hat{c}(I) = \mathrm{argmax}_c \max_{g\in G} ReLU(\langle w_{cg}|I\rangle + b_{cg}) + \beta_{cg}.$$

Steps 6 and 7 can be completed in the same way as in the derivation of the DCN in Section 2.7.2. This completes the definition of the Shifted ReLU unit (Eq. 41).

8.3.2 Example 2: 3D Rotational Layer

Traditional DCNs assume translational nuisances and thus acquire insensitivity to translations in the input, at all layers. However, many real-world nuisances are not translational, e.g., changes in pose or lighting or deformations. When faced with these nuisances, DCNs are forced to approximate them with translations, thus requiring a large number of extra training examples (data augmentation) and increasing the sample complexity of learning. Here we address this problem directly by building a new DCN layer that explicitly handles three-dimensional (3D) rotations of an object as its nuisance transformation (e.g. changes in yaw, pitch, and roll).

We will follow the derivation of the convolutional layer in Section 2.2, but instead of imposing a translational nuisance we will impose a rotational one, i.e., $$g = (\theta, \phi, \psi) \in SU(2)$$

is a set of Euler angles that parameterizes a rotation matrix $R(g)$ according to $$R(g) \equiv R(\theta, \phi, \psi) = \exp(i\theta R_z)\exp(i\phi R_y)\exp(i\psi R_z) \quad (42)$$

where $R_i$ are infinitesimal generators of rotations about axis $i\in\{x, y, z\}$ and exp(*) is the matrix exponential. The resulting rotation matrix $R(g)\in\mathbb{C}^{3\times 3}$ is called a group representation for the group element $g\in SU(2)$ (64).

Such a group representation will encourage the filters in a MPN to represent such intrinsic computer graphics-type transformations by constraining the parameters, and thus defining a new layer type for DCNs (or MPNs in general). Note that this generalizes the convolutional layer type, which comes from an assumption of a translational nuisance transformation.

8.4 Beyond Classification: Generalizing BrainFactory to Other Inference Tasks

Thus far, we have focused on classification tasks. However, our framework goes far beyond classification to other important inference tasks such as regression, density estimation, and representation learning. In this section, we focus on representation learning, as it is a core capability that enables many kinds of tasks (65, 66).

In order to learn good representations, we can build off of our success with the DRM for classification, with a few modifications:
1. The inference algorithm to process an input signal/image.
2. The learning objective (or performance metric) we are trying to optimize.
3. The learning algorithm: the E and M steps.

8.4.1 Learning a Representation that is Useful for Many Tasks

One approach to learning a useful representation is to train a DRM a large set of labeled and unlabeled natural images. Then, given a trained DRM, each input can be assigned a representation by passing it in as input into a trained MPN and executing a feedforward pass (as well as a feedback pass if needed) to yield a set of hidden activations a(I) in the penultimate layer of the MPN. Mathematically, we have $$a(I) \equiv \ln p(c^L, g \mid I; \theta_{DRM}) \quad (43)$$

$$= f_{MPN}(I; \theta_{MPN}) + const \quad (44)$$

Here the constant is an overall normalization that is independent of the latent configuration. Recall that the equivalence between inference in the DRM and feedforward propagation in the DCN were established earlier. Thus the output pattern is defined as the vector of activations a(I), and this will be the representation used throughout the rest of this section. Given such a representation, we can accomplish a wide variety of important inference tasks, a few of which we describe next.

8.4.2 Inference Task 1: Similarity Metric

Given a useful representation, we can define a similarity metric between inputs according to $$s(I_1, I_2) \equiv \mathrm{dist}(a(I_1), a(I_2)) \equiv \|a(I_1) - a(I_2)\|_2^2, \quad (45)$$

where we have used the Euclidean distance here, but any distance metric can be used. A good similarity metric is a prerequisite to solving many interesting tasks. We will discuss an example below for the facial verification task, for which Google recently achieved state-of-the-art superhuman accuracies (47).

8.4.3 Inference Task 2: One-Shot Learning

Another important task is that of One-Shot Learning (67), wherein the goal is to learn a novel class from only a single example instance. For example, viewing just a single example often suffices for humans to understand a new category and make meaningful generalizations. Such generalization requires very strong inductive biases. Success at one-shot learning thus requires learning abstract knowledge—a good representation—that supports transfer of knowledge from previously learned concepts/categories to novel ones.

Thus our inference task in One-Shot Learning is: Given an example image I* from a novel class c*, we will estimate a new template for c* by using the representation a*≡a(I*) defined above. As a result, the high-level features of the novel class will be defined in terms of image similarities between the novel image and all previously seen images. Equivalently, a new high-level cluster is created in the DRM (at level L), whose cluster center is initialized to the representation a*. Then, to classify an unseen test image I, we will compute the similarity metric between a(I) and a*.

8.4.4 Inference Task 3: Clustering Unseen Images

Consider a task that is more difficult than One-Shot Learning, clustering unseen images. In this task, we are given a set of images without any category labels, and we must cluster them into meaningful/useful categories. Unlike One Shot Learning, we are not given information about which images belong to which novel categories. An example of this is facial clustering, the task of taking a user's personal photos and clustering them into groups defined by the identity of the person in the photo. This example will be discussed below in the context of Google's new FaceNet representation learning algorithm (47).

In order to solve this task, we can use the DRM representation from above. First, we can compute the abstract representations a(I) for all unseen images I. Then, we can perform unsupervised clustering on these abstract representations by fitting a traditional clustering model such as a GMM. If the abstract representation is good, then test patterns belonging to the distinct categories should be well-separated in the representational space, and so a GMM with diagonal or isotropic covariance should suffice. Given such a trained GMM, we assign clusters to the test patterns by posterior inference over the clusters of the GMM. All together, we have $$\hat{k}(I) = \max_{k \in GMM} p(k|a(I; \theta_{DRM}); \theta_{GMM}) \quad (46)$$

where k indexes the clusters of the GMM (not the DRM).

9 Supplemental Information

9.1 Generative and Discriminative Classifiers: An Intuitive Discussion

We will begin with an intuitive discussion, after which we will formalize concepts mathematically. In machine learning (ML), a common task is to predict the value of a variable c given a vector x of input features. In a classification problem, c represents a class label, whereas in a regression problem c can be a vector of continuous variables. In order to classify an input x, we'd like to estimate the conditional distribution p(c|x) and then pick the most likely label c as our estimate. But how do we find this conditional distribution?

9.1.1 Discriminative Classifiers

One approach to solving this problem proceeds by parametrically modeling $p(c|x) = p(c|x; \theta_d)$ and then training on a dataset of input-output pairs $\{(x_n, c_n)\}_{n=1}^N$ in order to estimate the parameter $\theta_d$. This is known as discriminative learning, since we directly discriminate between different labels c given an input feature x. Therefore, a discriminative classifier learns a direct map from input features x to labels c, by directly modeling the conditional distribution p(c|x) of the labels given the features.

9.1.2 Generative Classifiers

An alternative approach is to model the joint distribution p(c,x) of the input features and labels, and then make predictions by using Bayes Rule to calculate $p(c|x) \propto p(x|c) p(c)$ and then picking the most likely label c. This is known as generative learning, since one can generate synthetic features x by sampling the joint distribution p(c,x). Therefore, a generative classifier learns an indirect map from input features x to labels c, by modeling the joint distribution p(c,x) of the labels and the features.

9.2 Formalizing Generative and Discriminative Classifiers

Definition 9.1 (Generative Model).

A generative model $p(x|\theta_g)$ is a joint probability distribution over features $x \in X$ with a set of generative parameters $\theta_g$. If the features x contain class labels c, then we can define a generative model for labels and features $p(c,x|\theta_g)$, where x contains all features except the class labels.

Definition 9.2 (Generative Classifier).

Every generative model for labels and features $p(c, x|\theta_g)$ is naturally associated with a generative classifier defined by its class posterior, namely $\mathrm{argmax}_c\, p(c|x, \theta_g)$. Therefore, a generative classifier uses the conditional probability distribution over class labels $c \in C$ given features $x \in X$ and picks the most likely class. In particular, it can be computed from the underlying generative model for labels and features via Bayes Rule $$p(c|x, \theta_g) = \frac{p(c, x|\theta_g)}{p(x|\theta_g)}$$
$$= \frac{1}{Z(\theta_g)} p(x|c, \theta_g) p(c|\theta_g),$$

where the normalization $$Z(x, \theta_g) \equiv p(x|\theta_g) = \Sigma_{c'} p(x|c', \theta_g) p(c'|\theta_g)$$

is independent of the class label c.

Remark 9.3 (Generative Classifiers Imply a Model for the Features).

A generative classifier requires an explicit, underlying model for the features $p(x|\theta_g)$ (e.g. natural images).

Definition 9.4 (Discriminative Classifier).

A discriminative classifier $\mathrm{argmax}_c\, p\ (c|x,\ \theta_d)$ uses the conditional probability distribution over class labels $c \in C$ given input features $x \in X$, with a set of discriminative parameters $\theta_d$.

Remark 9.5 (Discriminative Classifiers Need not imply a Model for the Features).

A discriminative classifier does not require an explicit, underlying model for the features $p\ (x|\theta_g)$ (e.g. natural images).

Note that we will employ a slight abuse of terminology and refer to the distributions p (c|x; θ) as classifiers, omitting the $\mathrm{argmax}_c$ for brevity. It is understood that the classifier's choice is always the most likely hypothesis for c as computed by the conditional distribution p(c|x; θ).

Definition 9.6 (Discriminative Relaxations of Generative Classifiers).

Suppose that a set of parameters $\theta_d = \rho(\theta_g)$ is sufficient for computing the class posterior: i.e. the function $p(c|x, \theta_g)$ depends on $\theta_g$ only through the (potentially smaller) set of parameters $\theta_d$. Then we call the discriminative classifier $\tilde{p}(c|x, \theta_d = \rho(\theta_g))$ a discriminative counterpart (or relaxation) of the generative classifier $p(c,x|\theta_g)$. We denote the relationship between the generative classifier and its discriminative relaxation as $p \rightarrow_d \tilde{p}$.

Remark 9.7.

Note that the functions $p(c|x, \theta_g)$ and $\tilde{p}(c|x, \theta_d)$ are distinct in general.

Example 9.8 (2-Class GNBC$\rightarrow_d$ Logistic Regression).

The Gaussian Naive Bayes Classifier (with two classes) is a simple but quite successful generative classifier. The discriminative relaxation of a GNBC is a Logistic Regression, i.e., 2-GNBC$\rightarrow_d$ LR.

9.3 Learning Generative and Discriminative Classifiers

Proposition 9.9.

When the data come from a generative model, the corresponding generative classifier will learn it, given enough data.

Proof.

Maximum likelihood learning insures that the sequence of classifiers based on the parameter estimates $\hat{\theta}(D_N)$ will approach the true classifier in the infinite data limit $N \rightarrow \infty$.

Proposition 9.10.

When the data come from a generative model, the corresponding discriminative relaxation of the generative classifier will learn it, given enough data.

Proof.

Since the discriminative classifier is a relaxation of the generative classifier associated with the generative model, it can certainly approximate the original generative classifier, given enough data. Note that it may require far more data than the generative classifier would, as it must "re-learn" the generative constraints $\theta_d = \rho(\theta_g)$ (68). More formally, we have $$L_G(\hat{\theta}_g) \equiv \max_{\theta_g} L(\theta_g)$$
$$= \max_{\theta_g} p(\mathcal{D} \mid \theta_g)$$
$$= \max_{\theta_g} p(\mathcal{D}_{C\mid X} \mid \theta_g) p(\mathcal{D}_X \mid \theta_g)$$
$$= \max_{\theta_g, \theta_d : \theta_d = \rho(\theta_g)} p(\mathcal{D}_{C\mid X} \mid \theta_d) p(\mathcal{D}_X \mid \theta_g) \leq$$
$$\max_{\theta_g, \theta_d} \{ p(\mathcal{D}_{C\mid X} \mid \theta_d) p(\mathcal{D}_X \mid \theta_g) \}$$
$$= \max_{\theta_d} \{ p(\mathcal{D}_{C\mid X} \mid \theta_d) \} \max_{\theta_g} \{ p(\mathcal{D}_X \mid \theta_g) \}$$
$$\equiv L_D(\hat{\theta}_d) L_U(\hat{\theta}_u)$$

Here $\rho$ is a discriminative re-parametrization of the generative parameters analogous to the case of the GNBC→Logistic Regression wherein $\theta_g \equiv \{\pi_c, \mu_c, \sigma_0^2\}_{c \in C}$ and $\theta_d \equiv \rho(\theta_g) = \{W_c, b_c\}_{c \in C}$. The key observation is that the computation of the class posterior given an input x depends on the generative parameters only through the sufficient parameters $\rho(\theta_g)$, i.e. the discriminative parameters $\theta_d$:

$$p(c \mid x, \theta_g) = \tilde{p}(c \mid x, \rho(\theta_g)).$$

As such, if the generative classifier model the true model for the data-generating process, the discriminative classifier will approach the generative classifier in the infinite-data limit (i.e. the two classifiers will converge to the same function as $N \to \infty$).

9.4 Deep Convolutional Nets: A Quick Primer

Every neural network is a sequence of affine transformations, interleaved with nonlinearities. Deep convolutional neural networks (DCNs) distinguish themselves by the particular affine transformation and nonlinearity used. The affine transformation employed by a DCN is called a DCN convolution, and it is the workhorse of a DCN, taking up most of the computation time. The DCN convolution is a generalized convolution operation that is defined in terms of the familiar 2D image convolution, and intuitively, is a form of exhaustive template matching between an input image and a set of templates. Mathematically, the DCN convolution maps a multi-channel input image $I = (I^{f'})$ to a multi-channel output 'image' $A = (A^f)$, where f' and f index the input and output channels, respectively. In particular, the input image is convolved against a set of templates $W = (W^{ff'})$ as follows:

$$A^f = W^f_{\star DCN} I$$
$$\equiv \sum_{f'} W^{ff'}_{\star 2D} I^{f'}, f \in \mathcal{F}_{out}, f' \in \mathcal{F}_{in},$$

Here $\star_{2D}$ is the usual 2D convolution between a single-channel D×D image $I^{f'}$ and a d×d filter $W^{ff'}$, for d≤D. It is common to use a strided convolution operation, where the filter is only convolved with the image every s pixels in the horizontal and vertical directions. All together, a multi-channel image $I = (I^{f'})$ is convolved with a set of filters/templates $W = (W^{ff'})$, resulting in another multi-channel 'image' $A = (A^f)$. In the literature, these multi-channel images are most commonly referred to as feature maps.

A.1 From the Gaussian Rendering Model Classifier to Deep DCNs

Proposition A.1 (MaxOut NNs).

The discriminative relaxation of a noise free GRM classifier is a single layer NN comprising a local template matching operation followed by a piecewise linear activation function (also known as a MaxOut NN (10)).

Proof.

In order to teach the reader, we prove this claim exhaustively. Later claims will have simple proofs that exploit the fact that the RM's distribution is from the exponential family.

$$\hat{c}(I) \equiv \operatorname{argmax}_{c \in C} p(c \mid I)$$
$$= \operatorname{argmax}_{c \in C} \{ p(I \mid c) p(c) \}$$
$$= \operatorname{argmax}_{c \in C} \left\{ \sum_{h \in \mathcal{H}} p(I \mid c, h) p(c, h) \right\}$$
$$\stackrel{(a)}{=} \operatorname{argmax}_{c \in C} \left\{ \max_{h \in \mathcal{H}} p(I \mid c, h) p(c, h) \right\}$$
$$= \operatorname{argmax}_{c \in C} \left\{ \max_{h \in \mathcal{H}} \exp(\ln p(i \mid c, h) + \ln p(c, h)) \right\}$$
$$\stackrel{(b)}{=} \operatorname{argmax}_{c \in C} \left\{ \max_{h \in \mathcal{H}} \exp\left( \sum_{\omega} \ln p(I^{\omega} \mid c, h) + \ln p(c, h) \right) \right\}$$
$$\stackrel{(c)}{=} \operatorname{argmax}_{c \in C} \left\{ \max_{h \in H} \exp\left( \begin{array}{c} -\frac{1}{2} \sum_{\omega} \left\langle I^{\omega} - \mu^{\omega}_{ch} \sum_{ch}^{-1} | I^{\omega} - \mu^{\omega}_{ch} \right\rangle + \\ \ln p(c, h) - \frac{D}{2} \ln |\sum_{ch}| \end{array} \right) \right\}$$
$$= \operatorname{argmax}_{c \in C} \left\{ \max_{h \in \mathcal{H}} \exp\left( \sum_{\omega} \langle w^{\omega}_{ch} \mid I^{\omega} \rangle + b^{\omega}_{ch} \right) \right\}$$
$$\stackrel{(d)}{=} \operatorname{argmax}_{c \in C} \left\{ \exp\left( \max_{h \in \mathcal{H}} \{ w_{ch} \star_{LC} I \} \right) \right\}$$
$$= \operatorname{argmax}_{c \in C} \left\{ \max_{h \in \mathcal{H}} \{ w_{ch} \star_{LC} I \} \right\}$$
$$= \text{Choose } \{ MaxOutPool(LocalTemplateMatch(I)) \}$$
$$= MaxOut - NN(I; \theta).$$

In line (a), we take the noise-free limit of the GRM, which means that one hypothesis (c,h) dominates all others in likelihood. In line (b), we assume that the image I includes a plurality of channels $\omega \in \Omega$, that are conditionally independent given the global configuration (c,h). Typically, for input images these are color channels and $\Omega \equiv \{r, g, b\}$ but in general $\Omega$ can be more abstract (e.g. as in feature maps). In line (c), we assume that the pixel noise covariance is isotropic and conditionally independent given the global configuration (c,h), so that $\Sigma_{ch} = \sigma_x^2 1_D$ is proportional to the D×D identity matrix $1_D$. In line (d), we defined the locally connected template matching operator $\star_{LC}$, which is a location-dependent template matching operation.

Note that the nuisance variables $h \in H$ are (max-)marginalized over, after the application of a local template matching operation against a set of filters/templates $W \equiv \{w_{ch}\}_{c \in C, h \in H}$.

Lemma A.2 (Translational Nuisance→$_d$ DCN Convolution).

The MaxOut template matching and pooling operation (from Proposition A.1) for a set of translational nuisance variables $H = G_T$ reduces to the traditional DCN convolution and max-pooling operation.

Proof.

Let the activation for a single output unit be $y_c(I)$. Then we have $$y_c(I) \equiv \max_{h \in \mathcal{H}} \{w_{ch} \star_{LC} I\}$$
$$= \max_{g \in \mathcal{G}_T} \{\langle w_{cg} | I \rangle\}$$
$$= \max_{g \in \mathcal{G}_T} \{\langle T_g w_c | I \rangle\}$$
$$= \max_{g \in \mathcal{G}_T} \{\langle w_c | T_{-g} I \rangle\}$$
$$= \max_{g \in \mathcal{G}_T} \{(w_c \star_{DCN} I)_g\}$$
$$= MaxPool(w_c \star_{DCN} I).$$

Finally, vectorizing in c gives us the desired result $$y(I) = \text{Max Pool}(\mathcal{W} \star_{DCN} I).$$

Proposition A.3 (Max Pooling DCNs with ReLU Activations).

The discriminative relaxation of a noise free GRM with translational nuisances and random missing data is a single convolutional layer of a traditional DCN. The layer comprises a generalized convolution operation, followed by a ReLU activation function and a Max-Pooling operation.

Proof.

We will model completely random missing data as a nuisance transformation $a \in A \equiv \{keep, drop\}$, where a=keep=1 leaves the rendered image data untouched, while a=drop=0 throws out the entire image after rendering. Thus, the switching variable a models missing data. Critically, whether the data is missing is assumed to be completely random and thus independent of any other task variables, including the measurements (i.e. the image itself). Since the missingness of the evidence is just another nuisance, we can invoke Proposition A.1 to conclude that the discriminative relaxation of a noise-free GRM with random missing data is also a MaxOut-DCN, but with a specialized structure which we now derive.

Mathematically, we decompose the nuisance variable $h \in H$ into two parts $h=(g,a) \in H=G \times A$, and then, following a similar line of reasoning as in Proposition A.1, we have $$\hat{c}(I) = \operatorname*{argmax}_{c \in C} \max_{h \in \mathcal{H}} p(c, h | I)$$
$$= \operatorname*{argmax}_{c \in C} \{\max_{h \in \mathcal{H}} \{w_{ch} \star_{LC} I\}\}$$
$$\stackrel{(a)}{=} \operatorname*{argmax}_{c \in C} \{\max_{g \in \mathcal{G}} \max_{a \in \mathcal{A}} \{a(\langle w_{cg} | I \rangle + b_{cg}) + b'_{cg} + b_a + b'_I\}\}$$
$$\stackrel{(b)}{=} \operatorname*{argmax}_{c \in C} \{\max_{g \in \mathcal{G}} \{\max\{(w_c \star_{DCN} I)_g, 0\} + b'_{cg} + b'_{drop} + b'_I\}\}$$
$$\stackrel{(c)}{=} \operatorname*{argmax}_{c \in C} \{\max_{g \in \mathcal{G}} \{\max\{(w_c \star_{DCN} I)_g, 0\} + b'_{cg}\}\}$$
$$\stackrel{(d)}{=} \operatorname*{argmax}_{c \in C} \{\max_{g \in \mathcal{G}} \{\max\{(w_c \star_{DCN} I)_g, 0\}\}\}$$
$$= \text{Choose } \{MaxPool(ReLu(DCNConv(I)))\}$$
$$= DCN(I; \theta).$$

In line (a) we calculated the log-posterior $$\ln p(c, h | I) = \ln p(c, g, a | I)$$
$$= \ln p(I | c, g, a) + \ln p(c, g, a)$$
$$= \frac{1}{2\sigma_x^2}\langle a\mu_{cg} | I \rangle - \frac{1}{2\sigma_x^2}(\|a\mu_{cg}\|_2^2 + \|I\|_2^2)) + \ln p(c, g, a)$$
$$\equiv a(\langle w_{cg} | I \rangle + b_{cg}) + b'_{cg} + b_a + b'_I,$$

where $a \in \{0, 1\}$, $b_a \equiv \ln p(a)$, $b_{cg}' \equiv \ln p(c,g)$, $$b'_I \equiv -\frac{1}{2\sigma_x^2}\|I\|_2^2.$$

In line (b), we use Lemma A.2 to write the expression in terms of the DCN convolution operator, after which we invoke the identity $$\max\{u,v\} = \max\{u-v, 0\} + v \equiv ReLu(u-v) + v$$

for real numbers $u, v \in \mathbb{R}$. Here we have defined $b_{drop}' \equiv \ln p(a=keep)$ and we have used a slightly modified DCN convolution operator $\star_{DCN}$ defined by $$w_{cg} \star_{DCN} I \equiv w_{cg} \star I + \ln\left(\frac{p(a = \text{keep})}{p(a = \text{drop})}\right).$$

Also, we observe that all the primed constants are independent of a and so can be pulled outside of the $\max_a$. In line (c), the two primed constants that are also independent of c,g can be dropped due to the $\operatorname{argmax}_{cg}$. Finally, in line (d), we assume a uniform prior over c,g. The resulting sequence of operations corresponds exactly to those applied in a single convolutional layer of a traditional DCN.

Remark A.4 (The Probabilistic Origin of the Rectified Linear Unit).

Note the origin of the ReLU in the proof above: it compares the relative (log-)likelihood of two hypotheses a=keep and a=drop, i.e. whether the current measurements (image data I) are available/relevant/important or instead missing/irrelevant/unimportant for hypothesis (c,g). In this way, the ReLU also promotes sparsity in the activations.

Proposition 7.15.

The discriminative relaxation of an iterative noise-free GRM is a deep DCN with Max-Pooling.

Consider the iterative GRM, defined as follows. Inference of the root class amounts to bottom-up message passing. The input to the next layer up is an 'image' whose channels correspond to class hypotheses c and whose 'pixel intensities' correspond log-probabilities for those class hypotheses $\max_h \ln p(c, h|I_l)$.

$$I_{l+1}{}^c = \text{Soft Max}(ReLu(\text{Pool Max}(Conv(I))))$$

$$I_{l+1} \equiv (I_{l+1}{}^c)_{c \in C}$$

A.2 Generalizing to Arbitrary Mixtures of Exponential Family Distributions

In the last section, we showed that the GRM—a mixture of Gaussian Nuisance Classifiers—has as its discriminative relaxation a MaxOut NN. In this section, we generalize this result to an arbitrary mixture of Exponential family Nuisance classifiers. For example, consider a Laplacian RM (LRM) or a Poisson RM (PRM).

Definition A.5 (Exponential Family Distributions).

A distribution $p(x; \theta)$ is in the exponential family if it can be written in the form $$p(x;\theta)=h(x)\exp(\langle \eta(\theta)|T(x)\rangle -A(\eta)),$$

where $\eta(\theta)$ is the vector of natural parameters, $T(x)$ is the vector of sufficient statistics, $A(\eta(\theta))$ is the log-partition function.

By generalizing to the exponential family, we will see that derivations of the discriminative relations will simplify greatly, with the key roles being played by familiar concepts such as natural parameters, sufficient statistics and log-partition functions. Furthermore, most importantly, we will see that the resulting discriminative counter parts are still MaxOut NNs. Thus, MaxOut NNs are quite a robust class, as most E-family mixtures have MaxOut NNs as d-counterparts.

Theorem A.6 (Discriminative Counterparts to Exponential Family Mixtures are MaxOut Neural Nets).

Let $M_g$ be a Nuisance Mixture Classifier from the Exponential Family. Then the discriminative counterpart $M_d$ of $M_g$ is a MaxOut NN.

Proof.

The proof is analogous to the proof of Proposition A.1, except we generalize by using the definition of an exponential family distribution (above). We simply use the fact that all exponential family distributions have a natural or canonical form as described above in the Definition A.5. Thus the natural parameters will serve as generalized weights and biases, while the sufficient statistic serves as the generalized input. Note that this may require a non-linear transformation, e.g., quadratic or logarithmic, depending on the specific exponential family.

A.3 Regularization Schemes: Deriving the DropOut Algorithm

Despite the large amount of labeled data available in many real-world vision applications of deep DCNs, regularization schemes are still a critical part of training, essential for avoiding overfitting the data. The most important such scheme is DropOut (30) and it comprises training with unreliable neurons and synapses. Unreliability is modeled by a 'dropout' probability $p_d$ that the neuron will not fire (i.e. output activation is zero) or that the synapse won't send its output to the receiving neuron. Intuitively, downstream neurons cannot rely on every piece of data/evidence always being there, and thus are forced to develop a robust set of features. This prevents the co-adaptation of feature detectors that undermines generalization ability.

In this section, we answer the question: Can we derive the DropOut algorithm from the generative modeling perspective? Here we show that the answer is yes. Dropout can be derived from the GRM generative model via the use of the EM algorithm under the condition of (completely random) missing data.

Proposition A.7.

The discriminative relaxation of a noise free GRM with completely random missing data is a DropOut DCN (18) with Max-Pooling.

Proof.

Since we have data that is missing completely at random, we can use the EM algorithm to train the GRM (56). Our strategy is to show that a single iteration of the EM-algorithm corresponds to a full epoch of DropOut DCN training (i.e., one pass thru the entire dataset). Note that typically an EM-algorithm is used to train generative models; here we utilize the EM-algorithm in a novel way, performing a discriminative relaxation in the M-step. In this way, we use the generative EM algorithm to define a discriminative EM algorithm (d-EM).

The d-E-step is equivalent to usual generative E-step. Given the observed data X and the current parameter estimate $\hat{\theta}^t$, we will compute the posterior of the latent variables $Z=(H,A)$ where A is the missing data indicator matrix, i.e., $A_{np}=1$ if the p-th feature (e.g. pixel intensity) of the input data $I_n$ (e.g. natural image) is available. H contains all other latent nuisance variables (e.g. pose) that are important for the classification task. Since we assume a noise-free GRM, we will actually execute a hybrid E-step: hard in H and soft in A. The hard-E step will yield the Max-Sum Message Passing algorithm, while the soft E-step will yield the ensemble average that is the characteristic feature of DropOut (18).

In the d-M-step, we will start out by maximizing the complete-data log-likelihood $l(\theta;H,A,X)$, just as in the usual generative M-step. However, near the end of the derivation we will employ a discriminative relaxation that will free us from the rigid distributional assumptions of the generative model $\theta_g$ and instead leave us with a much more flexible set of assumptions, as embodied in the discriminative modeling problem for $\theta_d$.

Mathematically, we have a single E-step and M-step that leads to a parameter update as follows:

$$\begin{aligned}
\ell(\hat{\theta}_{new}) &\equiv \max_\theta \{\mathbb{E}_{Z|X}[\ell(\theta; Z, X)]\} \\
&= \max_\theta \{\mathbb{E}_A \mathbb{E}_{H|X}[\ell(\theta; H, A, X)]\} \\
&= \max_\theta \{\mathbb{E}_A \mathbb{E}_{H|X}[\ell(\theta; C, H\,|\,I, A) + \ell(\theta; I) + \ell(\theta; A)]\} \\
&= \max_{\theta_d \sim^d \theta_g} \{\mathbb{E}_A \mathbb{E}_{H|X}[\ell(\theta_d; C, H\,|\,I, A) + \ell(\theta_g; I)]\} \le \\
&\quad \max_{\theta_d} \{\mathbb{E}_A \mathbb{E}_{H|X}[\ell(\theta_d; C, H\,|\,I, A)]\} \\
&= \max_{\theta_d} \{\mathbb{E}_A M_{H|X}[\ell(\theta_d; C, H\,|\,I, A)]\} \\
&\equiv \max_{\theta_d} \{\mathbb{E}_A [\ell(\theta_d; C, H^*\,|\,I, A)]\} \\
&= \max_{\theta_d} \left\{ \sum_A p(A) \cdot \ell(\theta_d; C, H^*\,|\,I, A) \right\} \\
&\approx \max_{\theta_d} \left\{ \sum_{A \in \mathcal{E}} p(A) \cdot \ell(\theta_d; C, H^*\,|\,I, A) \right\} \\
&= \max_{\theta_d} \left\{ \sum_{A \in \mathcal{E}} p(A) \cdot \sum_{n \in \mathcal{D}_{CI}^{dropout}} \ln p(c_n, h_n^*\,|\,I_n^{dropout}; \theta_d) \right\}.
\end{aligned}$$

Here we have defined the conditional likelihood $l(\theta; D_1|D_2) \equiv \ln p(D_1|D_2; \theta)$, and $D=(D_1,D_2)$ is some partition of the data. This definition allows us to write $l(\theta; D)=l(\theta; D_1|D_2)+l(\theta; D_2)$ by invoking the conditional probability law $p(D|\theta)=p(D_1|D_2; \theta)\cdot p(D_2|\theta)$. The symbol $$M_{H|X}[f(H)] \equiv \max_H \{p(H|X) f(H)\}$$

and the reduced dataset $D_{CI}^{dropout}(A)$ is simply the original dataset of labels and features less the missing data (as specified by A).

The final objective function left for us to optimize is a mixture of exponentially-many discriminative models, each trained on a different random subset of the training data, but all sharing parameters (weights and biases). Since the sum over A is intractable, we approximate the sums by Monte Carlo sampling of A (the soft part of the E-step), yielding an ensemble $\varepsilon \equiv \{A^{(i)}\}$. The resulting optimization corresponds exactly to the DropOut algorithm.

REFERENCES

1. J. Schmidhuber, "Deep learning in neural networks: An overview," Neural Networks, vol. 61, pp. 85-117, 2015.
2. M. D. Zeiler and R. Fergus, "Visualizing and understanding convolutional networks," in Computer Vision-ECCV 2014. Springer, 2014, pp. 818-833.
3. A. Hannun, C. Case, J. Casper, B. Catanzaro, G. Diamos, E. Elsen, R. Prenger, S. Satheesh, S. Sengupta, A. Coates et al., "Deepspeech: Scaling up end-to-end speech recognition," arXiv preprint arXiv:1412.5567, 2014.
4. H. Schmid, "Part-of-speech tagging with neural networks," in Proceedings of the 15th Conference on Computational Linguistics—Volume 1, ser. COLING '94. Stroudsburg, Pa., USA: Association for Computational Linguistics, 1994, pp. 172-176. [Online]. Available: http://dx.doi.org/10.3115/991886.991915.
5. A. Criminisi and J. Shotton, Decision Forests for Computer Vision and Medical Image Analysis, ser. Advances in Computer Vision and Pattern Recognition. Springer London, 2013.
6. D. Griffiths and M. Tenenbaum, "Hierarchical topic models and the nested chinese restaurant process," Advances in neural information processing systems, vol. 16, p. 17, 2004.
7. J. H. Searcy and J. C. Bartlett, "Inversion and processing of component and spatialrelational information in faces." Journal of experimental psychology. Human perception and performance, vol. 22, no. 4, pp. 904-915, August 1996.
8. M. I. Jordan and T. J. Sejnowski, Graphical models: Foundations of neural computation. MIT press, 2001.
9. Y. Bengio, A. Courville, and P. Vincent, "Representation learning: A review and new perspectives," Pattern Analysis and Machine Intelligence, IEEE Transactions on, vol. 35, no. 8, pp. 1798-1828, 2013.
10. I. J. Goodfellow, D. Warde-Farley, M. Mirza, A. Courville, and Y. Bengio, "Maxout networks," arXiv preprint arXiv:1302.4389, 2013.
11. A. Krizhevsky, I. Sutskever, and G. Hinton, "ImageNet Classification with Deep Convolutional Neural Networks," NIPS, pp. 1-9, November 2012. 52
12. K. Jarrett, K. Kavukcuoglu, M. Ranzato, and Y. LeCun, "What is the best multi-stage architecture for object recognition?" in Computer Vision, 2009 IEEE 12th International Conference on. IEEE, 2009, pp. 2146-2153.
13. C. Szegedy, W. Liu, Y. Jia, P. Sermanet, S. Reed, D. Anguelov, D. Erhan, V. Vanhoucke, and A. Rabinovich, "Going deeper with convolutions," arXiv preprint arXiv:1409.4842, 2014.
14. Y. LeCun, L. Bottou, Y. Bengio, and P. Haffner, "Gradient-based learning applied to document recognition," Proceedings of the IEEE, vol. 86, no. 11, pp. 2278-2324, 1998.
15. Y. Taigman, M. Yang, M. Ranzato, and L. Wolf, "Deepface: Closing the gap to human-level performance in face verification," in Computer Vision and Pattern Recognition (CVPR), 2014 IEEE Conference on. IEEE, 2014, pp. 1701-1708.
16. J. Lucke and A.-S. Sheikh, "Closed-form em for sparse coding and its application to source separation," in Latent Variable Analysis and Signal Separation. Springer, 2012, pp. 213-221.
17. I. Goodfellow, A. Courville, and Y. Bengio, "Large-scale feature learning with spike-andslab sparse coding," arXiv preprint arXiv:1206.6407, 2012.
18. G. E. Dahl, T. N. Sainath, and G. E. Hinton, "Improving deep neural networks for lvcsr using rectified linear units and dropout," in Acoustics, Speech and Signal Processing (ICASSP), 2013 IEEE International Conference on. IEEE, 2013, pp. 8609-8613.
19. J. B. Tenenbaum, C. Kemp, T. L. Griffiths, and N. D. Goodman, "How to grow a mind: Statistics, structure, and abstraction," science, vol. 331, no. 6022, pp. 1279-1285, 2011.
20. Y. Tang, R. Salakhutdinov, and G. Hinton, "Deep mixtures of factor analysers," arXiv preprint arXiv: 1206.4635, 2012.
21. A. van den Oord and B. Schrauwen, "Factoring variations in natural images with deep gaussian mixture models," in Advances in Neural Information Processing Systems, 2014, pp. 3518-3526.
22. Z. Ghahramani, G. E. Hinton et al., "The em algorithm for mixtures of factor analyzers," Technical Report CRG-TR-96-1, University of Toronto, Tech. Rep., 1996.
23. A. Hyvarinen, J. Karhunen, and E. Oja, Independent component analysis. John Wiley & Sons, 2004, vol. 46. 53
24. F. R. Kschischang, B. J. Frey, and H.-A. Loeliger, "Factor graphs and the sum-product algorithm," Information Theory, IEEE Transactions on, vol. 47, no. 2, pp. 498-519, 2001.
25. S. Ioffe and C. Szegedy, "Batch normalization: Accelerating deep network training by reducing internal covariate shift," arXiv preprint arXiv:1502.03167, 2015.
26. P. F. Felzenszwalb and D. P. Huttenlocher, "Efficient belief propagation for early vision," International journal of computer vision, vol. 70, no. 1, pp. 41-54, 2006.
27. G. Hinton, "What's wrong with convolutional nets?" 2014, available from the MIT TechTV website.
28. S. Roweis and Z. Ghahramani, "Learning nonlinear dynamical systems using the expectation-maximization algorithm," Kalman filtering and neural networks, p. 175, 2001.
29. T. Vamos, "Judea pearl: Probabilistic reasoning in intelligent systems," Decision Support Systems, vol. 8, no. 1, pp. 73-75, 1992.
30. G. E. Hinton, N. Srivastava, A. Krizhevsky, I. Sutskever, and R. R. Salakhutdinov, "Improving neural networks by preventing co-adaptation of feature detectors," arXiv preprint arXiv:1207.0580, 2012.
31. C. M. Bishop, J. Lasserre et al., "Generative or discriminative? getting the best of both worlds," Bayesian Statistics, vol. 8, pp. 3-24, 2007.
32. A. Jordan, "On discriminative vs. generative classifiers: A comparison of logistic regression and naive Bayes," Advances in neural information processing systems, vol. 14, p. 841, 2002.
33. B. M. Wilamowski, S. Iplikci, O. Kaynak, and M. O. Efe, "An algorithm for fast convergence in training neural networks," in Proceedings of the international joint conference on neural networks, vol. 2, 2001, pp. 1778-1782.
34. O. Cappe and E. Moulines, "Online EM algorithm for latent data models," Journal of the Royal Statistical Society, 2008.
35. Michael I. Jordan, "Learning in Graphical Models (Adaptive computation and machine learning)", A Bradford Book, London, 1998.
36. D. L. Yamins, H. Hong, C. F. Cadieu, E. A. Solomon, D. Seibert, and J. J. DiCarlo, "Performance-optimized hierarchical models predict neural responses in higher visual cortex," Proceedings of the National Academy of Sciences, vol. 111, no. 23, pp. 8619-8624, 2014. 54

37. K. Simonyan, A. Vedaldi, and A. Zisserman, "Deep inside convolutional networks: Visualising image classification models and saliency maps," arXiv preprint arXiv:1312.6034, 2013.
38. L. Breiman, "Random forests," Machine learning, vol. 45, no. 1, pp. 5-32, 2001.
39. N.-Q. Pham, H.-S. Le, D.-D. Nguyen, and T.-G. Ngo, "A study of feature combination in gesture recognition with Kinect," in Knowledge and Systems Engineering. Springer, 2015, pp. 459-471.
40. N. Pinto, D. D. Cox, and J. J. DiCarlo, "Why is Real-World Visual Object Recognition Hard?" PLoS Computational Biology, vol. 4, no. 1, p. e27, 2008.
41. J. J. DiCarlo, D. Zoccolan, and N. C. Rust, "Perspective," Neuron, vol. 73, no. 3, pp. 415-434, February 2012.
42. F. Anselmi, J. Mutch, and T. Poggio, "Magic Materials," Proceedings of the National Academy of Sciences, vol. 104, no. 51, pp. 20 167-20 172, December 2007.
43. F. Anselmi, L. Rosasco, and T. Poggio, "On invariance and selectivity in representation learning," arXiv preprint arXiv:1503.05938, 2015.
44. J. Bruna and S. Mallat, "Invariant scattering convolution networks," Pattern Analysis and Machine Intelligence, IEEE Transactions on, vol. 35, no. 8, pp. 1872-1886, 2013.
45. S. Mallat, "Group invariant scattering," Communications on Pure and Applied Mathematics, vol. 65, no. 10, pp. 1331-1398, 2012.
46. S. Arora, A. Bhaskara, R. Ge, and T. Ma, "Provable bounds for learning some deep representations," arXiv preprint arXiv:1310.6343, 2013.
47. F. Schroff, D. Kalenichenko, and J. Philbin, "Facenet: A unified embedding for face recognition and clustering," arXiv preprint arXiv:1503.03832, 2015.
48. C. Hegde, A. Sankaranarayanan, W. Yin, and R. Baraniuk, "A convex approach for learning near-isometric linear embeddings," preparation, August, 2012.
49. P. Mehta and D. J. Schwab, "An exact mapping between the variational renormalization group and deep learning," arXiv preprint arXiv:1410.3831, 2014.
50. X. Miao and R. P. Rao, "Learning the lie groups of visual invariance," Neural computation, vol. 19, no. 10, pp. 2665-2693, 2007. 55
51. F. Anselmi, J. Z. Leibo, L. Rosasco, J. Mutch, A. Tacchetti, and T. Poggio, "Unsupervised learning of invariant representations in hierarchical architectures," arXiv preprint arXiv:1311.4158, 2013.
52. J. Sohl-Dickstein, J. C. Wang, and B. A. Olshausen, "An unsupervised algorithm for learning lie group transformations," arXiv preprint arXiv:1001.1027, 2010.
53. R. Hartley and A. Zisserman, Multiple view geometry in computer vision. Cambridge university press, 2003.
54. V. Michalski, R. Memisevic, and K. Konda, "Modeling sequential data using higher-order relational features and predictive training," arXiv preprint arXiv:1402.2333, 2014.
55. J. Pearl, "Probabilistic reasoning in intelligent systems: Networks of plausible inference. Morgan Kauffman pub," 1988.
56. C. M. Bishop et al., Pattern recognition and machine learning. springer New York, 2006, vol. 4, no. 4.
57. N. Kumar, S. Satoor, and I. Buck, "Fast parallel expectation maximization for Gaussian mixture models on gpus using cuda," in High Performance Computing and Communications, 2009. HPCC'09. 11th IEEE International Conference on. IEEE, 2009, pp. 103-109.
58. S. Hochreiter and J. Schmidhuber, "Long short-term memory," Neural computation, vol. 9, no. 8, pp. 1735-1780, 1997.
59. A. Graves, A.-R. Mohamed, and G. Hinton, "Speech recognition with deep recurrent neural networks," in Acoustics, Speech and Signal Processing (ICASSP), 2013 IEEE International Conference on. IEEE, 2013, pp. 6645-6649.
60. A. Graves, N. Jaitly, and A.-R. Mohamed, "Hybrid speech recognition with deep bidirectional lstm," in Automatic Speech Recognition and Understanding (ASRU), 2013 IEEE Workshop on. IEEE, 2013, pp. 273-278.
61. L. Wiskott, "How does our visual system achieve shift and size invariance," J L van Hemmen and T J Sejnowski, editors, vol. 23, pp. 322-340, 2006. 56
62. A. Corduneanu, C. M. Bishop, Artificial intelligence and Statistics (Morgan Kaufmann Waltham, Mass., 2001), vol. 2001, pp. 27-34.
63. S.-I. Amari, Neurocomputing 5, 185 (1993).
64. A. Altland, B. Simons, Condensed Matter Field Theory (Cambridge University Press, 2010).
65. K. Q. Weinberger, L. K. Saul, The Journal of Machine Learning Research 10, 207 (2009).
66. R. Salakhutdinov, G. E. Hinton, International Conference on Artificial Intelligence and Statistics (2007), pp. 412-419.
67. One-Shot Learning with a Hierarchical Nonparametric Bayesian Model, Ruslan Salakhutdinov, Josh Tenenbaum, and Antonio Torralba, MIT Technical Report MIT-CSAIL-TR-2010-052, 2010.
68. A. Jordan, Advances in neural information processing systems 14, 841 (2002).

Method 1000

In one set of embodiments, a method 1000 may include the operations shown in FIG. 10. (The method 1000 may also include any subset of the features, elements and embodiments described above.) The method 1000 may be executed to compile an arbitrary generative description of an inference task into a neural network (or more generally, a data processing system specification), e.g., a neural network that is optimized for performing the inference task. Thus, the method 1000 may eliminate the laborious trial-and-error process of designing neural networks for targeted tasks.

While FIG. 10 shows a particular set of operations, it should be understood that various embodiments of method 1000 are contemplated, e.g., embodiments in which one or more of the illustrated operations are omitted, embodiments in which the illustrated operations are augmented with one or more additional operations, embodiments in which one or more of the illustrated operations are parallelized, etc. The method 1000 may be implemented by a computer system (or more generally, by a set of one or more computer systems), by one or more programmable hardware elements such as FPGAs, by dedicated digital circuitry such as one or more ASICs, or by any combination of the foregoing.

At 1010, model input is received, where the model input specifies a generative probabilistic model that characterizes a conditional probability distribution for measurement data given a set of latent variables. The measurement data may be represented by a random vector variable whose components are elements or features of interest in a given application. The model input may be supplied by a user. The generative probabilistic model may be an arbitrary user-specified model for a desired target application associated with the measurement data. The generative probabilistic model may be a model belonging to the exponential family.

At 1015, a factor graph corresponding to the generative probabilistic model may be generated, wherein the factor graph includes a measurement data node, latent variable nodes and factor nodes. Mechanisms for generating a factor graph from a generative probabilistic model are well known in the theory of probability, and thus, need not be elaborated here. As their names imply, the measurement data node corresponds to the measurement data, and the latent variable nodes correspond respectively to the latent variables.

At 1020, each factor node of the factor graph may be processed (e.g., expanded) based on a specified inference task and a specified kind of message passing algorithm, wherein each factor node is processed to determine (or expanded into) a corresponding sequence of arithmetic operations, e.g., as variously described above. The factor graph and the sequences of arithmetic operations specify a structure of a neural network for performance of the inference task. Each arithmetic operation of each node-specific sequence may correspond to a respective layer of the neural network. For example, the "max" element of a given node may correspond to a max pooling layer. As another example, the "sum" element of a given node may correspond to a convolutional layer of the neural network. In some embodiments, the method 1000 may also include receiving task input that specifies the inference task, e.g., input from a user. The specification of the inference task may include an identification of a subset of the latent variables as target variables of the inference task. Remaining ones of the latent variables may be treated as nuisance variables.

In some embodiments, the inference task may be the inference of the marginal posterior of the target variables, or the inference of a most probable configuration (MPC) of the latent variables, or a combination of marginal posterior interference and MPC inference.

At 1025, a learning algorithm (also referred to as a training algorithm) may be executed to determine values of parameters of the neural network. The learning algorithm may, e.g., be implemented as variously described above.

At 1030, information specifying a trained state of the neural network may be stored in memory, where the information includes the sequences of arithmetic operations and the determined parameter values. The information may also include structural information specifying the structure of the factor graph.

In some embodiments, prior to the action of expanding each factor node, the generative posteriors of the generative probabilistic model are replaced with corresponding discriminative posteriors, e.g., as variously described above. In these embodiments, the neural network is a discriminative message passing network.

In some embodiments, the method 1000 may also include executing the neural network based on the stored information. The action of executing the neural network may include: providing operational measurement data as input to the neural network; and outputting inference data generated at an output of the neural network.

In some embodiments, the operational measurement data represents an image, and inference data represents at least one of:
  a classification of an object present within the image;
  an image location of an object present within the image;
  an orientation or pose of an object present within the image;
  an identity of a person present within the image;
  a classification of an emotional state of a person present in the image;
  a text of a message (e.g., a handwritten message) contained in the image;
  a compressed data representation of the image;
  a coded representation of a printed or handwritten mathematical expression in the image;
  an identification of an earth location where the image was captured;
  an identification of a biological organism present in the image.

In some embodiments, the operational measurement data represents a temporal sequence of images, e.g., a video sequence.

In some embodiments, the operational measurement data includes a text written in a first human language, and the inference data includes a translated text in a second human language.

In some embodiments, the operational measurement data represents a measured audio signal, and the inference data represents at least one of the following:
  a category to which the audio signal belongs;
  phonemes of a speech signal present in the audio signal;
  words being spoken in the audio signal;
  a determination of a language being spoken in the audio signal;
  an identity of a person speaking in the audio signal;
  an emotional state of a person speaking in the audio signal;
  a set of control signals for output to a set of traducers for realization of a user command embedded in the audio signal.

In some embodiments, the operational measurement data includes at least one of the following:
  sensor data captured by one or more sensors;
  pixel data captured by a camera;
  audio data captured by one or more microphones;
  spectral data captured by one or more spectrometers;
  network performance measurements captured by a server in a computer network.

In some embodiment, the one or more sensors include chemical sensors and/or spectral sensors.

In some embodiments, the above-described action of outputting the inference data comprises displaying a visual representation of the inference data on a display device, and/or outputting an audio signal corresponding to the inference data via one or more speakers.

In some embodiments, the learning algorithm is an expectation maximization (EM) algorithm or a Variational Bayes EM algorithm.

In some embodiments, a subset of the latent variables are designated as target variables of the inference task, and remaining ones of the latent variables are designated as nuisance variables. A user may identify the subset (or alternatively, the number of latent variables in the subset).

The action of executing the learning algorithm is based on a set of training data pairs, where each training data pair includes a sample of the measurement data and a corresponding sample of the subset of latent variables. (In some embodiments, the sample of the subset of latent variables may include missing data values, e.g., as variously described above.) The parameter values determined in step 1025 may define affine transformations associated respectively with the nuisance variables. Thus, by executing the learning algorithm, a meaning for each of nuisance variables is derived (i.e., learned) from the set of training data.

In some embodiments, the neural network includes one or more convolutional layers and one or more max pooling layers.

In some embodiments the neural network includes at least N layers, where N is selected from the set {4, 8, 16, 32, 64, 128, 256, 512, 1024, 2048}.

In some embodiments, the kind of message passing algorithm is a sum-product algorithm or a max-sum algorithm.

In some embodiments, the arithmetic operations are selected from a set of operations including sum, product, max, min and evaluate.

In some embodiments, the neural network is a recurrent neural network, wherein the kind of message passing algorithm is a sum-product algorithm or a max-sum algorithm, wherein the generative probabilistic model has dynamical structure (i.e., models changes in time). For example, a recurrent neural network may be used to perform inference on a video stream, or a speech signal, or a time sequence of measurements, or any combination of the foregoing.

In some embodiments, method 1000 may operate on a server, to which clients connect via a computer network such as the Internet. A user operating a client computer may connect to the server in order to invoke execution of method 1000. A client computer may send the model input and a specification (or identification) of the inference task to the server via the computer network. The server may send said information that specifies the trained state of the neural network to the client computer via the computer network. The client computer may execute the trained neural network in order to perform the target inference task, e.g., on signals/images/features captured/measured/calculated by the client computer.

The Utility of Neural Network Specifications

The specification of a trained neural network configured for an inference task is an entity of tremendous practical and economic value because that specification may be used to perform the inference task simply by: submitting an operational input (e.g., a set of measurements) to an input layer(s) of the neural network; and executing the neural network on the operational input in a feed forward fashion to obtain an inference output from an output layer (or a set of output layers) of the neural network. Thus, the specification of a trained neural network may be interpreted as the specification of a machine ready for performance of the inference task.

The action of executing a neural network based on a neural network specification is well understood in the field of machine learning. There exist standard formats for the specification of a neural network. Some embodiments of the present invention may generate a neural network specification in one or more of these standard formats.

Furthermore, the specification of an untrained neural network structurally configured for an inference task is of tremendous practical and economic value because the untrained neural network is only one step removed from a trained neural network, i.e., lacking only the training step to make it immediately ready for application.

Computer System

FIG. 11 illustrates one embodiment of a computer system 1100 that may be used to perform any of the method embodiments described herein, or, any combination of the method embodiments described herein, or any subset of any of the method embodiments described herein, or, any combination of such subsets.

Computer system 1100 may include a processing unit 1110, a system memory 1112, a set 1115 of one or more storage devices, a communication bus 1120, a set 1125 of input devices, and a display system 1230.

System memory 1112 may include a set of semiconductor devices such as RAM devices (and perhaps also a set of ROM devices).

Storage devices 1115 may include any of various storage devices such as one or more memory media and/or memory access devices. For example, storage devices 1115 may include devices such as a CD/DVD-ROM drive, a hard disk, a magnetic disk drive, a magnetic tape drive, semiconductor-based memory, etc.

Processing unit 1110 is configured to read and execute program instructions, e.g., program instructions stored in system memory 1112 and/or on one or more of the storage devices 1115. Processing unit 1110 may couple to system memory 1112 through communication bus 1120 (or through a system of interconnected busses, or through a computer network). The program instructions configure the computer system 1100 to implement a method, e.g., any of the method embodiments described herein, or, any combination of the method embodiments described herein, or, any subset of any of the method embodiments described herein, or any combination of such subsets.

Processing unit 1110 may include one or more processors (e.g., microprocessors).

One or more users may supply input to the computer system 1100 through the input devices 1125. Input devices 1125 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), an accelerometer (or set of accelerometers), an electric field sensor (or a set of electric field sensors), a magnetic field sensor (or a set of magnetic field sensors), a pressure sensor (or a set of pressure sensors), a spectrometer, a compressive sensing camera (or other compressive sensing device), a radio receiver, a data acquisition system, a radiation sensor, or any combination thereof.

The display system 1130 may include any of a wide variety of display devices representing any of a wide variety of display technologies. For example, the display system may be a computer monitor or display screen, a head-mounted display, a projector system, a volumetric display, or a combination thereof. In some embodiments, the display system may include a plurality of display devices. In one embodiment, the display system may include a printer and/or a plotter.

In some embodiments, the computer system 1100 may include other devices, e.g., devices such as one or more graphics accelerators, one or more speakers, a sound card, a video camera and a video card, a data acquisition system.

In some embodiments, computer system 1100 may include one or more communication devices 1135, e.g., a network interface card for interfacing with a computer network (e.g., the Internet). As another example, the communication device 1135 may include one or more specialized interfaces and/or radios for communication via any of a variety of established communication standards, protocols and physical transmission media.

In some embodiments, the computer system 1100 may include one or more actuators such as digitally controlled motors. In some embodiments, the computer system 1100 may be included in a robot.

The computer system 1100 may be configured with a software infrastructure including an operating system, and perhaps also, one or more graphics APIs (such as OpenGL®, Direct3D, Java 3D™).

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable device, a computer embedded in a living organism, etc.

Any of the various embodiments described herein may be combined to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for constructing a neural network, the method comprising:
   performing operations on a computer, wherein the operations include:
     receiving model input that specifies a generative probabilistic model, wherein the generative probabilistic model characterizes a conditional probability distribution for measurement data given a set of latent variables;
     generating a factor graph corresponding to the generative probabilistic model, wherein the factor graph includes a measurement data node, latent variable nodes and factor nodes;
     expanding each factor node based on a specified inference task and a message passing algorithm, wherein each factor node is expanded into a corresponding sequence of arithmetic operations, wherein the factor graph and the sequences of arithmetic operations specify a structure of a neural network for performance of the inference task;
     executing a learning algorithm to determine values of parameters of the neural network;
     storing information specifying a trained state of the neural network, wherein the information includes the sequences of arithmetic operations and the determined parameter values.

2. The method of claim 1, further comprising:
   prior to said expanding each factor node, replacing generative posteriors of the generative probabilistic model with corresponding discriminative posteriors, wherein the neural network is a discriminative message passing network.

3. The method of claim 1, further comprising, executing the neural network based on the stored information, wherein said executing includes:
   providing operational measurement data as input to the neural network; and
   outputting inference data generated at an output of the neural network.

4. The method of claim 3, wherein the operational measurement data represents an image, wherein the inference data represents at least one of:
   a classification of an object present within the image;
   an image location of an object present within the image;
   an orientation or pose of an object present within the image;
   an identity of a person present within the image;
   a classification of an emotional state of a person present in the image;
   a text of a message embedded in the image.

5. The method of claim 3, wherein the operational measurement data represents a measured audio signal, wherein the inference data represents at least one of the following:
   a category to which the audio signal belongs;
   phonemes of a speech signal present in the audio signal;
   words being spoken in the audio signal;
   a determination of a language being spoken in the audio signal;
   an identity of a person speaking in the audio signal;
   an emotional state of a person speaking in the audio signal;
   a set of control signals for output to a set of traducers for realization of a user command embedded in the audio signal.

6. The method of claim 3, wherein the operational measurement data includes at least one of the following:
   sensor data captured by one or more sensors;
   pixel data captured by a camera;
   audio data captured by one or more microphones;
   spectral data captured by one or more spectrometers;
   network performance measurements captured by a server in a computer network.

7. The method of claim 3, wherein said outputting the inference data comprises displaying a visual representation of the inference data on a display device.

8. The method of claim 1, further comprising:
   receiving task input that specifies the inference task, wherein specification of the inference task includes an identification of a subset of the latent variables as target variables of the inference task, wherein remaining ones of the latent variables are treated as nuisance variables.

9. The method of claim 8, wherein the inference task includes:
   inference of the marginal posterior of the target variables; or
   inference of a most probable configuration of the latent variables.

10. The method of claim 1, wherein the learning algorithm is an Expectation Maximization (EM) algorithm or a Variational Bayes EM algorithm.

11. The method of claim 1, wherein a subset of the latent variables are designated as target variables of the inference task, wherein remaining ones of the latent variables are designated as nuisance variables, wherein said executing the learning algorithm is based on a set of training data pairs, wherein each training data pair includes a sample of the measurement data and a corresponding sample of the subset of latent variables, wherein said parameter value define affine transformations associated respectively with the nuisance variables.

12. The method of claim 1, wherein the neural network includes one or more convolutional layers and one or more max pooling layers.

13. The method of claim 1, wherein the message passing algorithm is a sum-product algorithm or a max-sum algorithm.

14. The method of claim 1, wherein the arithmetic operations are selected from a set of operations including sum, product, max, min and evaluate.

15. The method of claim 1, wherein the neural network is a recurrent neural network, wherein the message passing algorithm is a sum-product algorithm or a max-sum algorithm, wherein the generative probabilistic model has dynamical structure.

16. The method of claim 1 wherein the model input that specifies the generative probabilistic model includes user input.

17. The method of claim 1, wherein the inference task is specified by user input.

18. A computer system for constructing a neural network, the computer system comprising:
  a processor; and
  a memory storing program instructions, wherein the program instructions, when executed by the processor, cause the processor to:
    receive model input that specifies a generative probabilistic model, wherein the generative probabilistic model characterizes a conditional probability distribution for measurement data given a set of latent variables;
    generate a factor graph corresponding to the generative probabilistic model, wherein the factor graph includes a measurement data node, latent variable nodes and factor nodes;
    expand each factor node based on a specified inference task and a message passing algorithm, wherein each factor node is expanded into a corresponding sequence of arithmetic operations, wherein the factor graph and the sequences of arithmetic operations specify a structure of a neural network for performance of the inference task;
    execute a learning algorithm to determine values of parameters of the neural network; and
    store information specifying a trained state of the neural network, wherein the information includes the sequences of arithmetic operations and the determined parameter values.

19. The computer system of claim 18, wherein the program instructions, when executed by the processor, cause the processor to:
  prior to said expanding each factor node, replacing generative posteriors of the generative probabilistic model with corresponding discriminative posteriors, wherein the neural network is a discriminative message passing network.

20. A non-transitory memory medium for constructing a data processing system, the memory medium storing program instructions, wherein the program instructions, when executed by a processor, cause the processor to implement:
  receiving model input that specifies a generative probabilistic model, wherein the generative probabilistic model characterizes a conditional probability distribution for measurement data given a set of latent variables;
  generating a factor graph corresponding to the generative probabilistic model, wherein the factor graph includes a measurement data node, latent variable nodes and factor nodes;
  expanding each factor node based on a specified inference task and a message passing algorithm, wherein each factor node is expanded into a corresponding sequence of arithmetic operations, wherein the factor graph and the sequences of arithmetic operations specify a structure of a data processing system for performance of the inference task;
  executing a learning algorithm to determine values of parameters of the data processing system;
  storing information specifying a trained state of the data processing system, wherein the information includes the sequences of arithmetic operations and the determined parameter values.

* * * * *